(12) United States Patent
Saha et al.

(10) Patent No.: US 11,979,104 B2
(45) Date of Patent: May 7, 2024

(54) ROTARY ELECTRIC MACHINE CONTROL APPARATUS

(71) Applicants: AISIN CORPORATION, Aichi (JP); NAGOYA INSTITUTE OF TECHNOLOGY, Nagoya (JP)

(72) Inventors: Subrata Saha, Kariya (JP); Hiroki Iwai, Kariya (JP); Takashi Kosaka, Nagoya (JP); Hiroaki Matsumori, Nagoya (JP)

(73) Assignees: AISIN CORPORATION, Aichi (JP); NAGOYA INSTITUTE OF TECHNOLOGY, Nagoya (JP)

( * ) Notice: Subject to any disclaimer, the term of this patent is extended or adjusted under 35 U.S.C. 154(b) by 156 days.

(21) Appl. No.: 17/784,817

(22) PCT Filed: Sep. 29, 2020

(86) PCT No.: PCT/JP2020/036898
§ 371 (c)(1),
(2) Date: Jun. 13, 2022

(87) PCT Pub. No.: WO2021/145029
PCT Pub. Date: Jul. 22, 2021

(65) Prior Publication Data
US 2023/0006594 A1    Jan. 5, 2023

(30) Foreign Application Priority Data

Jan. 14, 2020    (JP) .................................. 2020-003674

(51) Int. Cl.
*H02M 7/501*    (2007.01)
*H02P 25/22*    (2006.01)
*H02P 27/08*    (2006.01)

(52) U.S. Cl.
CPC .............. *H02P 25/22* (2013.01); *H02P 27/08* (2013.01)

(58) Field of Classification Search
CPC ........ H02P 25/22; H02P 27/08; H02M 7/501; H02J 7/0024
See application file for complete search history.

(56) References Cited

U.S. PATENT DOCUMENTS

2020/0195032 A1* 6/2020 Shimizu ................. H02J 7/0024
2020/0389115 A1* 12/2020 Saha ...................... H02M 7/501

FOREIGN PATENT DOCUMENTS

WO    2019/142877 A1    7/2019

OTHER PUBLICATIONS

V. Oleschuk et al., "Dual Inverter-Fed Traction Drive with DC Sources Power Balancing Based on Synchronized PWM", IEEE, Conference Paper/Jun. 2007, 1-4244-0743-5/07, pp. 260-265.

(Continued)

*Primary Examiner* — Cortez M Cook
(74) *Attorney, Agent, or Firm* — Sughrue Mion, PLLC

(57) ABSTRACT

A rotary electric machine control apparatus (1) suitably controls two inverters (10) connected to associated ends of open windings (8). The rotary electric machine control apparatus (1) performs target control involving: controlling a first one of the inverters (10), which is selected from a first inverter (11) and a second inverter (12), by rectangular wave control; and controlling a second one of the inverters (10) by special pulse width modulation control that is one type of pulse width modulation control. The special pulse width modulation control is a control method to produce a switching pattern (Su2+) that is based on a difference between a switching pattern resulting from the pulse width modulation control and a switching pattern (Su1+) resulting from the (Continued)

rectangular wave control when a target voltage is to be generated in the open windings (8).

15 Claims, 30 Drawing Sheets

(56) References Cited

OTHER PUBLICATIONS

International Search Report for PCT/JP2020/036898, dated Nov. 2, 2020.
Extended European Search Report dated May 26, 2023 in Application No. 20914585.3.

\* cited by examiner

ROTARY ELECTRIC MACHINE CONTROL APPARATUS

CROSS REFERENCE TO RELATED APPLICATIONS

This application is a National Stage of International Application No. PCT/JP2020/036898 filed Sep. 29, 2020, claiming priority based on Japanese Patent Application No. 2020-003674 filed Jan. 14, 2020, the contents of which are incorporated by reference.

TECHNICAL FIELD

The present disclosure relates to rotary electric machine control apparatuses each of which controls, through two inverters, driving of a rotary electric machine including open windings.

BACKGROUND ART

The IEEE paper "Dual Inverter-Fed Traction Drive with DC Sources Power Balancing Based on Synchronized PWM" written by V. Oleschuk et al. and published in 2007 discloses a control apparatus to control driving of a rotary electric machine by performing switching control on inverters each connected to associated ends of three-phase open windings included in a three-phase alternating-current rotary electric machine. A well-known mode of control involves, for example, controlling driving of a rotary electric machine by performing switching control on a single inverter connected to first ends of three-phase Y windings whose second ends are connected to each other. When a direct-current voltage is equal, a system including open windings and two inverters is able to make a line voltage of a winding alternating-current voltage higher and allow a rotary electric machine to operate with a higher output than a system including Y windings and a single inverter.

The introduction of the paper written by V. Oleschuk et al. states that causing carrier signals, which generate pulses for switching control of two inverters, to be different in phase enables a reduction in the magnitude of ripples of currents flowing through windings. V. Oleschuk et al. further mention that generating pulses by a synchronous system instead of a non-synchronous system that uses carrier signals enables more suitable control also for a middle/high output application. The non-synchronous system and the synchronous system both involve performing switching control on two inverters by the same control method at all times.

RELATED ART DOCUMENTS

Non-Patent Documents

Non-Patent Document 1: V. Oleschuk, R. Bojoi, G Griva, F. Profumo, "Dual Inverter-Fed Traction Drive with DC Sources Power Balancing Based on Synchronized PWM", Conference Paper/June 2007, 1-4244-0743-5/07, IEEE, p. 260-265

SUMMARY OF THE DISCLOSURE

Problem to be Solved by Various Aspects of the Disclosure

A switching control method is preferably decided such that a rotary electric machine is operable at higher system efficiency in accordance with various factors (or operating conditions), such as a torque, a rotation speed, and a direct-current side voltage required for the rotary electric machine. The technique discovered by V. Oleschuk et al. is excellent but still has room for improvement in suitably controlling two inverters each connected to associated ends of open windings.

In view of the above circumstances, what is desired is to provide a technique for suitably controlling two inverters each connected to associated ends of open windings.

Means for Solving the Problem

In view of the above, one aspect of the present disclosure provides a rotary electric machine control apparatus to control, through a first inverter and a second inverter, driving of a rotary electric machine including multiphase open windings independent of each other. The first inverter is connected to first ends of the multiphase open windings so as to perform conversion of electric power between a direct current and a multiphase alternating current. The second inverter is connected to second ends of the multiphase open windings so as to perform conversion of electric power between a direct current and a multiphase alternating current. The rotary electric machine control apparatus is able to control the first inverter and the second inverter by different control methods that produce different switching patterns and are independent of each other. The control methods include: pulse width modulation control involving outputting a plurality of pulses different in pattern in each electrical angle cycle; and rectangular wave control involving outputting a single pulse in each electrical angle cycle. The rotary electric machine control apparatus performs target control involving: controlling a first one of the inverters, which is selected from the first inverter and the second inverter, by the rectangular wave control; and controlling a second one of the inverters by special pulse width modulation control that is one type of the pulse width modulation control. The special pulse width modulation control is the control method to produce a switching pattern that is based on a difference between a switching pattern resulting from the pulse width modulation control and a switching pattern resulting from the rectangular wave control when a target voltage is to be generated in the open windings.

In this aspect, rectangular wave control is performed on the first one of the inverters, which is selected from the two inverters. This enables a reduction in the number of times switching is performed by the first one of the inverters, leading to a reduction in switching loss. The second one of the inverters, on which no rectangular wave control is to be performed, is controlled by special pulse width modulation control. Special pulse width modulation control involves controlling the second one of the inverters in accordance with a switching pattern that is based on a difference between a switching pattern resulting from pulse width modulation control and a switching pattern resulting from rectangular wave control when a target voltage is to be generated in the open windings. Accordingly, if the first one of the inverters is controlled by rectangular wave control, the rotary electric machine would be driven smoothly by performing pulse width modulation control on the second one of the inverters concurrently. This typically enables a reduction in system loss and smooth control of the rotary electric machine in a relatively high rotation operating region for which rectangular wave control is to be used. Consequently, the rotary electric machine control apparatus according to this aspect is able to suitably control the two inverters each connected to the associated ends of the open windings.

Further features and advantages of the rotary electric machine control apparatus will be apparent from the description of embodiments given below with reference to the drawings.

MODES FOR CARRYING OUT THE VARIOUS ASPECTS OF THE DISCLOSURE

Figure 1:
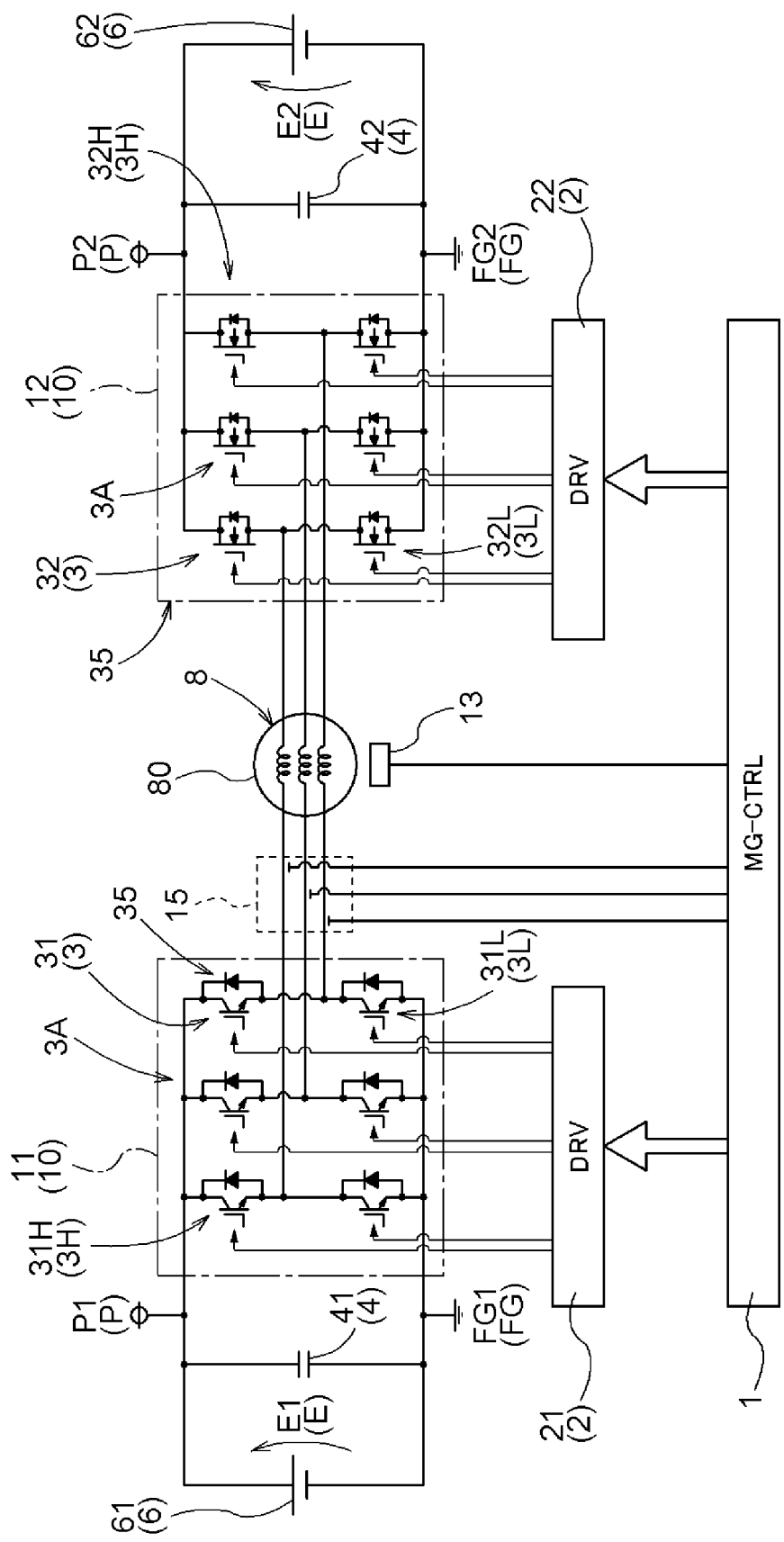
FIG. 1 is a schematic block diagram illustrating an exemplary rotary electric machine driving system.

An embodiment of a rotary electric machine control apparatus to control, through two inverters, driving of a rotary electric machine including multiphase open windings independent of each other will be described below with reference to the drawings. FIG. 1 is a schematic block diagram of a rotary electric machine driving system including a rotary electric machine control apparatus 1 (MG-CTRL). A rotary electric machine 80 serves as, for example, a wheel driving force source for a vehicle, such as an electric vehicle or a hybrid vehicle. The rotary electric machine 80 is an open winding type rotary electric machine including multiphase (or three-phase in the present embodiment) stator coils 8 (open windings) independent of each other. Inverters 10 are each connected to associated ends of the stator coils 8. The inverters 10 are controlled independently of each other so as to perform conversion of electric power between a direct current and a multiphase (or three-phase in this embodiment) alternating current. A first inverter 11 (INV1) is connected to first ends of the stator coils 8. A second inverter 12 (INV2) is connected to second ends of the stator coils 8. In the following description, the first inverter 11 and the second inverter 12 will each be simply referred to as an "inverter 10" when no distinction is necessary between the first inverter 11 and the second inverter 12.

The inverters 10 each include a plurality of switching elements 3. Insulated gate bipolar transistors (IGBTs) and/or power metal oxide semiconductor field effect transistors (power MOSFETs) are used as the switching elements 3. FIG. 1 illustrates a mode in which Si-IGBTs are used as first switching elements 31 of the first inverter 11 and SiC-MOSFETs are used as second switching elements 32 of the second inverter 12. The first switching elements 31 may be Si-MOSFETs instead of Si-IGBTs. The second switching elements 32 may be, for example, SiC-static induction transistors (SiC-SITs) or gallium nitride-MOSFETs (GaN-MOSFETs) instead of SiC-MOSFETs. In the present embodiment, the second switching elements 32 included in the second inverter 12 are preferably relatively smaller in switching loss than the first switching elements 31 included in the first inverter 11 during transition between an OFF state and an ON state.

Figure 36:
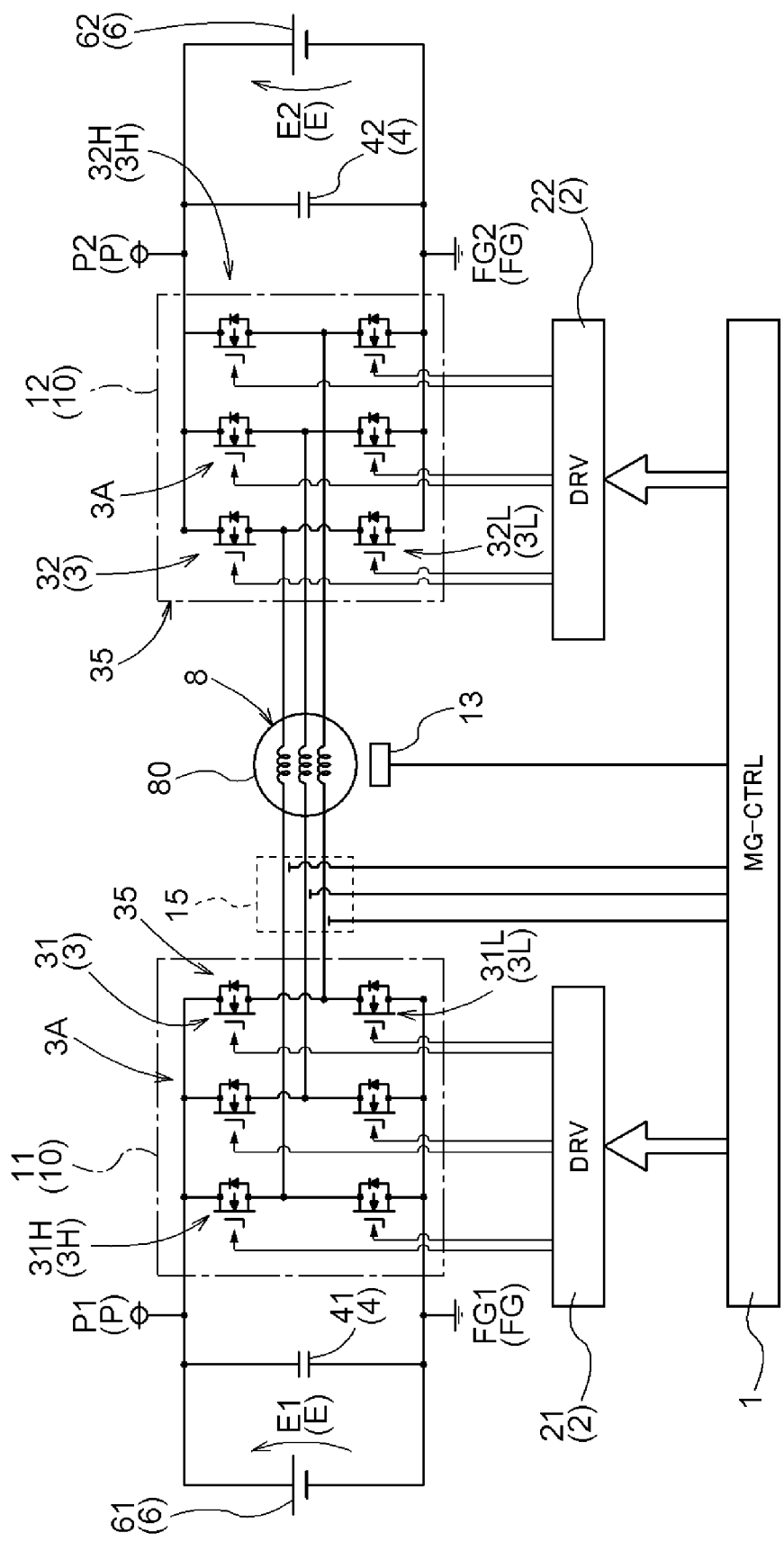
FIG. 36 is a schematic block diagram illustrating another exemplary rotary electric machine driving system.
Figure 37:
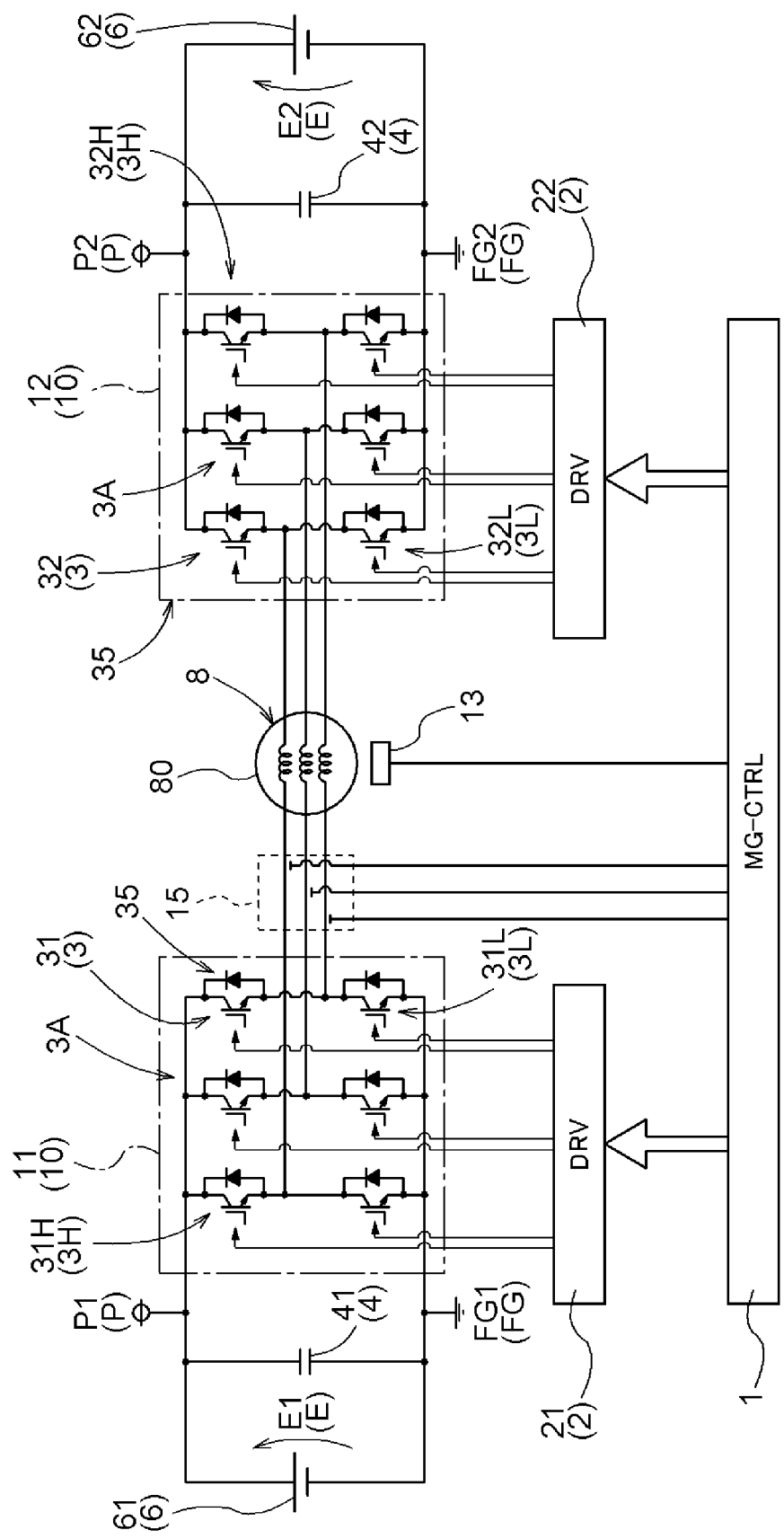
FIG. 37 is a schematic block diagram illustrating still another exemplary rotary electric machine driving system.

SiC semiconductor and GaN semiconductor are usually more expensive than Si semiconductor. The present embodiment illustrates a mode in which SiC semiconductor is used for the switching elements 3 that are included in one of the two inverters 10. When mass production, for example, has reduced the price of SiC semiconductor or GaN semiconductor, both of the inverters 10 may be provided using SiC semiconductor (e.g., SiC-MOSFETs) as illustrated in FIG. 36. As illustrated in FIG. 37, both of the inverters 10 may be provided using Si semiconductor (e.g., Si-IGBTs) in accordance with required specifications, such as the magnitude of allowable switching loss.

The two inverters 10 each include arms 3A each associated with one of alternating-current phases. The arms 3A each include a series circuit of an upper side switching element 3H and a lower side switching element 3L. Each switching element 3 includes a freewheel diode 35 connected in parallel, assuming that a direction from a negative terminal FG to a positive terminal P (i.e., a direction from the lower side to the upper side) is a forward direction. In the present embodiment, the two inverters 10 are each connected to an associated one of direct-current power supplies 6 independent of each other. A first floating ground FG1, which is the negative terminal FG for the first inverter 11, and a second floating ground FG2, which is the negative terminal FG for the second inverter 12, are independent of each other. A direct-current link capacitor 4 (smoothing capacitor) to smooth a direct-current voltage is provided between each inverter 10 and the associated direct-current power supply 6.

Specifically, the first inverter 11, the arms 3A of which are each associated with one of the alternating-current phases and each include a series circuit of a first upper side switching element 31H and a first lower side switching element 31L, is connected at its direct-current side to a first direct-current link capacitor 41 (first smoothing capacitor), connected at its direct-current side to a first direct-current power supply 61, and connected at its alternating-current side to the first ends of the multiphase stator coils 8 so as to perform conversion of electric power between a direct current and a multiphase alternating current. The second inverter 12, the arms 3A of which are each associated with one of the alternating-current phases and each include a series circuit of a second upper side switching element 32H and a second lower side switching element 32L, is connected at its direct-current side to a second direct-current link capacitor 42 (second smoothing capacitor), connected at its direct-current side to a second direct-current power supply 62, and connected at its alternating-current side to the second ends of the multiphase stator coils 8 so as to perform conversion of electric power between a direct current and a multiphase alternating current.

In the present embodiment, the first direct-current power supply 61 and the second direct-current power supply 62 are equal in ratings, such as a voltage rating. A rated voltage "E1" of the first direct-current power supply 61 and a rated voltage "E2" of the second direct-current power supply 62 are equal to each other and will each be simply referred to as a rated voltage "E" when no distinction is made therebetween. Accordingly, a direct-current side voltage (direct-current link voltage) "Vdc1" of the first inverter 11 and a direct-current side voltage (direct-current link voltage) "Vdc2" of the second inverter 12 are equal to each other. The first direct-current link capacitor 41 and the second direct-current link capacitor are equal in ratings, such as a capacity rating. The rated voltage of each direct-current power supply 6 is between about 48 volts and about 400 volts. Each direct-current power supply 6 includes, for example, a secondary battery (battery), such as a nickel metal hydride battery or a lithium ion battery, and/or an electric double layer capacitor. The rotary electric machine 80 is able to function not only as an electric motor but also as a generator. The rotary electric machine 80 converts electric power, which has been supplied thereto from the direct-current power supplies 6 through the inverters 10, into motive power so as to carry out power running. Alternatively, the rotary electric machine 80 converts rotative driving force, which has been transmitted thereto from, for example, wheel(s), into electric power and charges the direct-current power supplies 6 with the electric power through the inverters 10 so as to carry out regeneration.

As illustrated in FIG. 1, the inverters 10 are controlled by the rotary electric machine control apparatus 1. The rotary electric machine control apparatus 1 is able to control the first inverter 11 and the second inverter 12 by control methods independent of each other. The control methods will be described below in detail. The rotary electric machine control apparatus 1 is created using as its core component a logic circuit, such as a microcomputer. In one example, the rotary electric machine control apparatus 1 controls the rotary electric machine 80 through the inverters 10 by performing current feedback control using a vector control method in accordance with a target torque (or a torque command) for the rotary electric machine 80, which is provided from, for example, a different control apparatus, such as a vehicle control apparatus (not illustrated).

Actual currents flowing through the stator coils 8 of the respective phases of the rotary electric machine 80 are detected by a current sensor 15. The magnetic pole position of a rotor of the rotary electric machine 80 at each point in time is detected by a rotation sensor 13, such as a resolver. The rotary electric machine control apparatus 1 performs current feedback control using detection results obtained by the current sensor 15 and the rotation sensor 13. The rotary electric machine control apparatus 1 includes various functional parts for current feedback control. The functional parts are implemented by cooperation between hardware, such as a microcomputer, and software (program).

Figure 2:
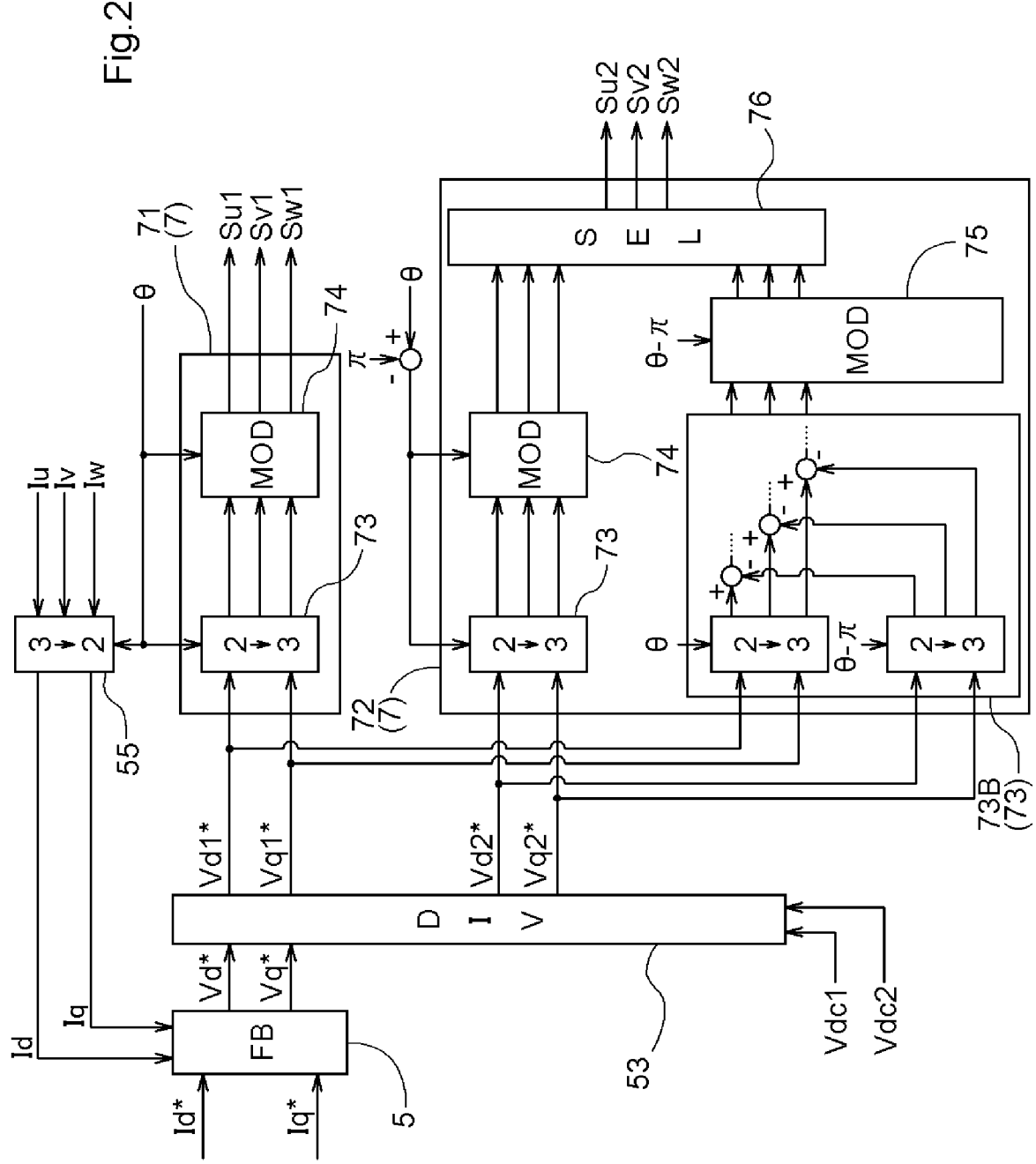
FIG. 2 is a simple partial block diagram of a rotary electric machine control apparatus.

The block diagram of FIG. 2 illustrates some of the functional parts of the rotary electric machine control apparatus 1 in a simple manner. The vector control method involves exercising feedback control by performing coordinate transformation by which actual currents (i.e., a U phase current Iu, a V phase current Iv, and a W phase current Iw) flowing through the rotary electric machine 80 are converted into a vector component along a d axis (i.e., a d-axis current Id) and a vector component along a q axis (i.e., a q-axis current Iq). The d axis extends in the direction of a magnetic field (or magnetic flux) generated by permanent magnet(s) disposed in the rotor of the rotary electric machine 80. The q axis extends in a direction perpendicular to the d axis (or a direction advanced by an electrical angle of $\pi/2$ with respect to the orientation of the magnetic field). A three-phase/two-phase coordinate transformer 55 of the rotary electric machine control apparatus 1 performs coordinate transformation in accordance with detection results (which include a magnetic pole position and an electrical angle represented by $\theta$) obtained by the rotation sensor 13.

A current feedback controller 5 (FB) exercises feedback control for the rotary electric machine 80 in accordance with differences between current commands (i.e., a d-axis current command Id* and a q-axis current command Iq*), which are based on a torque command for the rotary electric machine 80, and actual currents (i.e., the d-axis current Id and the q-axis current Iq) in a dq-axis orthogonal vector coordinate system, thus calculating voltage commands (i.e., a d-axis voltage command Vd* and a q-axis voltage command Vq*). The rotary electric machine 80 is driven through the two inverters 10, i.e., the first inverter 11 and the second inverter 12. A divider 53 (DIV) thus divides the d-axis voltage command Vd* and the q-axis voltage command Vq* into: a first d-axis voltage command Vd1* and a first q-axis voltage command Vq1* for the first inverter 11; and a second d-axis voltage command Vd2* and a second q-axis voltage command Vq2* for the second inverter 12. In the present embodiment, the direct-current link voltage "Vdc1" of the first inverter 11 and the direct-current link voltage "Vdc2" of the second inverter 12 are equal to each other as previously mentioned (which means that Vc1=Vdc2). Accordingly, the voltage commands divided have the following relationships: "Vd1*=Vd2*", "Vq1*=Vq2*".

As previously described, the rotary electric machine control apparatus 1 is able to control the first inverter 11 and the second inverter 12 by control methods independent of each other. The rotary electric machine control apparatus 1 includes two voltage controllers 7 each including a three-phase voltage command calculator 73 and a modulator 74 (MOD). More specifically, the rotary electric machine control apparatus 1 includes: a first voltage controller 71 to generate switching control signals (Su1, Sv1, Sw1) for the U, V, and W phases of the first inverter 11; and a second voltage controller 72 to generate switching control signals (Su2, Sv2, Sw2) for the U, V, and W phases of the second inverter 12. Although described in detail below with reference to, for example, FIGS. 9 and 10, voltage commands (Vu1, Vv1, Vw1) for the first inverter 11 are different in phase from voltage commands (Vu2, Vv2, Vw2) for the second inverter 12 by "n". The second voltage controller 72 thus receives values calculated by subtracting "n" from the detection results ($\theta$) obtained by the rotation sensor 13.

As illustrated in FIG. 2, the second voltage controller 72 includes the three-phase voltage command calculator 73 and the modulator 74 connected thereto similarly to the first voltage controller 71, and further includes another three-phase voltage command calculator 73 (which is a special modulation three-phase voltage command calculator 73B), another modulator (which is a special modulation modulator 75), and a selector 76. The selector 76 of the second voltage controller 72 selects normal modulation switching control signals generated by the modulator 74 and special modulation switching control signals generated by the special modulation modulator 75. The second voltage controller 72 thus outputs the switching control signals (Su2, Sv2, Sw2) for the second inverter 12. As used herein, the term "special modulation" refers to special pulse width modulation (which will be described below). Special modulation will be described in detail below with reference to, for example, FIGS. 8 to 19. Control blocks are not limited to this configuration. In one example, a selector may select normal modulation three-phase voltage commands and special modulation three-phase voltage commands generated by the special modulation modulator 75, and the switching control signals (Su2, Sv2, Sw2) for the second inverter 12 may be generated by a shared modulator in accordance with the voltage commands selected.

As will be described below, modulation methods include: synchronous modulation synchronous with rotation of the rotary electric machine 80; and non-synchronous modulation independent of rotation of the rotary electric machine 80. A block (which is a procedure in the case of software) for generating switching control signals by synchronous modulation usually differs from a block for generating switching control signals by non-synchronous modulation. The voltage controllers 7 described above generate switching control signals in accordance with: voltage commands; and carriers non-synchronous with rotation of the rotary electric machine 80. For the sake of simplification of description, the present embodiment is described based on the assumption that switching control signals resulting from synchronous modulation (e.g., switching control signals in the case of rectangular wave control, which will be described below) are also generated by the voltage controllers 7.

As previously described, the arms 3A of the inverters 10 each include a series circuit of the upper side switching element 3H and the lower side switching element 3L. The switching control signals for the respective phases are output in the form of two types of switching control signals, which are upper side switching control signals and lower side switching control signals, although no distinction is made therebetween in FIG. 2. In one example, a first U phase switching control signal Su1 for switching control of the U phase of the first inverter 11 is output in the form of two signals, which are a first U phase upper side switching control signal Su1+ with "+" at its end and a first U phase lower side switching control signal Su1− with "−" at its end. If the upper side switching element 3H and the lower side switching element 3L included in each arm 3A have simultaneously entered an ON state, the arm 3A is short-circuited. An approach to preventing such a short circuit involves setting a "dead time" during which the upper side switching control signal and the lower side switching control signal for each arm 3A are both in an ineffective state. Such a dead time is also set in the voltage controllers 7.

As illustrated in FIG. 1, control terminals (which are gate terminals when the switching elements 3 are IGBTs or FETs) of the switching elements 3 included in the inverters 10 are connected to the rotary electric machine control apparatus 1 through drive circuits 2 (DRV) and are thus subjected to switching control on an individual basis. High-voltage circuits (i.e., systems connected to the direct-current power supplies 6), such as the inverters 10, for driving the rotary electric machine 80 greatly differ in operating voltage (or circuit power supply voltage) from low-voltage circuits (i.e., systems operating at a voltage of between about 3.3 volts and about 5 volts), such as the rotary electric machine control apparatus 1 whose core is, for example, a microcomputer. The drive circuits 2 enhance the driving ability (e.g., the ability to cause a subsequent circuit to operate, such as voltage amplitude or output current) of driving signals (or switching control signals) for the switching elements 3, and relay the resulting signals. A first drive circuit 21 relays the switching control signals to the first inverter 11. A second drive circuit 22 relays the switching control signals to the second inverter 12.

The rotary electric machine control apparatus 1 is able to carry out two switching pattern modes (or voltage waveform control modes) for the switching elements 3 included in the first inverter 11 and the second inverter 12. Examples of the modes include: pulse width modulation (PWM) control to output a plurality of pulses different in pattern in each electrical angle cycle; and rectangular wave control (1-Pulse control) to output a single pulse in each electrical angle cycle. Control methods for the first inverter 11 and the second inverter 12 performable by the rotary electric machine control apparatus 1 thus include pulse width modulation control and rectangular wave control. As previously mentioned, the rotary electric machine control apparatus 1 is able to control the first inverter 11 and the second inverter 12 by control methods independent of each other.

Pulse width modulation methods include: continuous pulse width modulation (CPWM or continuous PWM), such as sinusoidal pulse width modulation (SPWM or sinusoidal PWM) and space vector pulse width modulation (SVPWM or space vector PWM); and discontinuous pulse width modulation (DPWM or discontinuous PWM). Accordingly, control methods for pulse width modulation control performable by the rotary electric machine control apparatus 1 include continuous pulse width modulation control and discontinuous pulse width modulation.

Continuous pulse width modulation is a modulation method to continuously perform pulse width modulation on all of the multiphase arms 3A. Discontinuous pulse width modulation is a modulation method to perform pulse width modulation on at least one of the multiphase arms 3A such that a period during which the switching elements are kept in an ON state or an OFF state is included. Specifically, discontinuous pulse width modulation involves, for example, sequentially fixing the signal levels of inverter switching control signals associated with a single phase included in three-phase alternating-current electric power, and changing the signal levels of switching control signals associated with the other two phases. Continuous pulse width modulation involves modulating all the phases without fixing switching control signals associated with any of the phases as just mentioned. Which of the modulation methods is to be used is decided in accordance with operating conditions, such as a rotation speed and a torque required for the rotary electric machine 80, and a modulation factor (which indicates the ratio of an effective value of a line voltage of a three-phase alternating current to a direct-current voltage) required to satisfy the operating conditions.

Figure 7:
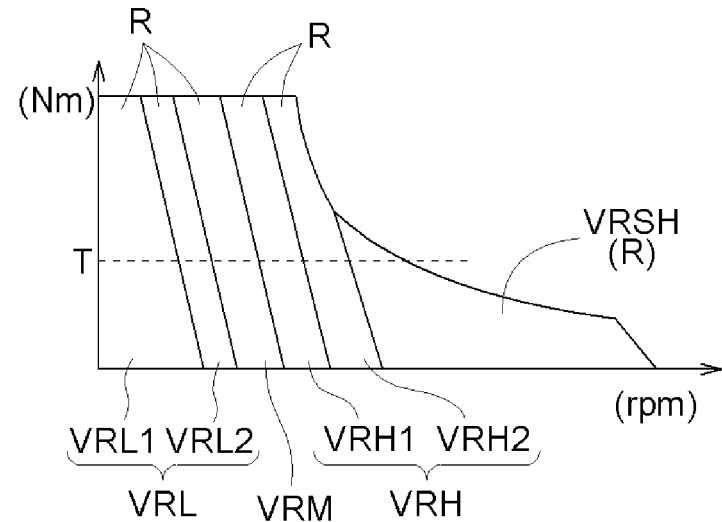
FIG. 7 is a graph illustrating still another exemplary control regions for the rotary electric machine.

Pulse width modulation involves generating pulses in accordance with the magnitude relationship between the amplitude of an alternating-current waveform in the form of a voltage command and the amplitude of a carrier (CA) waveform in the form of a triangular wave, which includes a sawtooth wave (see, for example, FIG. 7). A PWM waveform may be directly generated by digital calculation irrespective of comparison with a carrier. Even in such a case, the amplitude of an alternating-current waveform in the form of a command value and the amplitude of a virtual carrier waveform are correlated with each other.

Pulse width modulation based on digital calculation involves determining a carrier in accordance with, for example, a control cycle of the rotary electric machine control apparatus 1, such as a calculation cycle of a microcomputer or an operating cycle of an electronic circuit. If multiphase alternating-current electric power is used to drive the alternating-current rotary electric machine 80, the carrier has a cycle (or asynchronous cycle) not restricted by a rotation speed or rotation angle (electrical angle) of the rotary electric machine 80. Thus, not only the carrier but also each pulse generated in accordance with the carrier is out of synchronization with rotation of the rotary electric machine 80. Accordingly, modulation methods, such as sinusoidal pulse width modulation and space vector pulse width modulation, may sometimes be referred to as "asynchronous modulation". In contrast, modulation methods to generate pulses in synchronization with rotation of the rotary electric machine 80 are referred to as "synchronous modulation". Rectangular wave control (or rectangular wave modulation), for example, involves outputting a single pulse for each electrical angle cycle of the rotary electric machine 80 and is thus synchronous modulation.

Indices indicating the ratio of conversion from a direct-current voltage to an alternating-current voltage include a modulation factor indicative of the ratio of an effective value of a line voltage of a multiphase alternating-current voltage to a direct-current voltage. Typically, a maximum modulation factor for sinusoidal pulse width modulation is about 0.61 ($\approx$0.612), and a maximum modulation factor for space vector pulse width modulation control is about 0.71 ($\approx$0.707). A modulation method that uses a modulation factor exceeding about 0.71 is referred to as "overmodulation pulse width modulation" because such a modulation method uses a higher-than-normal modulation factor. A maximum modulation factor for "overmodulation pulse width modulation" is about 0.78. The modulation factor of 0.78 is a physical (or mathematical) threshold value for conversion of electric power from a direct current to an alternating current. When a modulation factor has reached 0.78 during overmodulation pulse width modulation, a transition is made to rectangular wave modulation (1-pulse modulation) that involves outputting a single pulse in each electrical angle cycle. A modulation factor for rectangular wave modulation will be fixed at about 0.78, which is a physical threshold value.

Overmodulation pulse width modulation whose modulation factor is less than 0.78 is performable using the principle of any one of a synchronous modulation method and an asynchronous modulation method. A typical modulation method for overmodulation pulse width modulation is discontinuous pulse width modulation. Discontinuous pulse width modulation is performable using the principle of any one of a synchronous modulation method and an asynchronous modulation method. In the case of using a synchronous modulation method, for example, rectangular wave modulation involves outputting a single pulse in each electrical angle cycle, but discontinuous pulse width modulation involves outputting a plurality of pulses in each electrical angle cycle. Presence of a plurality of pulses in each electrical angle cycle reduces a pulse effective period accordingly, resulting in a decrease in modulation factor. Accordingly, a modulation factor does not necessarily have to be fixed at about 0.78, and any modulation factor that is less than 0.78 may be used to perform a synchronous modulation method. In one example, multi-pulse modulation, such as 9-pulse modulation involving outputting nine pulses in each electrical angle cycle or 5-pulse modulation involving outputting five pulses in each electrical angle cycle, may be performed.

The rotary electric machine control apparatus 1 is able to perform fail-safe control, such as shutdown control (SDN) or active short circuit control (ASC), in the event of detecting abnormal condition(s) in the inverter(s) 10 or the rotary electric machine 80. Shutdown control involves causing switching control signals for all the switching elements 3 included in the inverter(s) 10 to enter an inactive state so as to bring the inverter(s) 10 to an OFF state. Active short circuit control involves causing either the upper side switching elements 3H of all of the multiphase arms 3A or the lower side switching elements 3L of all of the multiphase arms 3A to enter an ON state, and causing the other switching elements to enter an OFF state. Active short circuit control that involves causing the upper side switching elements 3H of all of the multiphase arms 3A to enter an ON state and causing the lower side switching elements 3L of all of the multiphase arms 3A to enter an OFF state will be referred to as "upper side active short circuit control". Active short circuit control that involves causing the lower side switching elements 3L of all of the multiphase arms 3A to enter an ON state and causing the upper side switching elements 3H of all of the multiphase arms 3A to enter an OFF state will be referred to as "lower side active short circuit control".

When the inverters 10 are each connected to the associated ends of the stator coils 8 as in the present embodiment, short-circuiting one of the inverters 10 by active short circuit control causes the multiphase stator coils 8 to be short-circuited through the one of the inverters 10. This results in Y-connection of the stator coils 8, with the one of the inverters 10 serving as a neutral point. The rotary electric machine control apparatus 1 is thus able to enable a mode of controlling the open winding type rotary electric machine 80 through the two inverters 10, and a mode of controlling the Y-connection rotary electric machine 80 through one of the inverters 10 (i.e., the inverter 10 that is not subjected to active short circuit control). Accordingly, control modes selectable for not only fail-safe control but also normal control include active short circuit control. In other words, control methods for the first inverter 11 and the second inverter 12 performable by the rotary electric machine control apparatus 1 further include active short circuit control.

In the case of performing vector control on one of the inverters 10, eight space vectors are definable in accordance with the states of the three-phase arms 3A. Specifically, the eight space vectors are definable by three-phase combinations of two types of signal levels of switching control signals for the upper side switching elements 3H ($2^3=8$). The signal levels of three-phase switching control signals for the lower side switching elements 3L are complementary to the signal levels of switching control signals for the upper side switching elements 3H. The space vectors are thus definable in accordance with the signal levels of either the upper side switching control signals or the lower side switching control signals.

Suppose that the signal level of each switching control signal is represented by "1" when the signal level is high and represented by "0" when the signal level is low. In this case, expressing the signal levels of U phase, V phase, and W phase switching control signals in the form of (UVW) provides the following eight space vectors: (000), (001), (010), (011), (100), (101), (110), and (111). The space vectors (000) and (111) included in the eight space vectors will each be referred to as a "zero vector" or a "null vector" and indicate identical coordinates in a dq-axis vector coordinate system because a line voltage is zero and no voltage is applied to the rotary electric machine 80. In contrast, the other six space vectors will each be referred to as an "active vector" and indicate different coordinates in the dq-axis vector coordinate system.

As illustrated in FIG. 1, performing vector control on the two inverters 10 makes it possible to define 64 space vectors in accordance with the signal levels of either upper side or lower side switching control signals ($2^{(3 \cdot 2)}=2^6=64$). Ten of these vectors are null vectors. When the signal levels of U phase (U1 phase), V phase (V1 phase), and W phase (W1 phase) of the first inverter 11 and the signal levels of U phase (U2 phase), V phase (V2 phase), and W phase (W2 phase) of the second inverter 12 are represented as (U1V1W1-U2V2W2), the ten vectors (000-000), (001-001), (010-010), (011-011), (100-100), (101-101), (110-110), (111-111), (000-111), and (111-000) are null vectors that make line voltages zero. The remaining 54 vectors are active vectors the magnitudes of which are effective from an origin point (null vector coordinates) to 18 different coordinates in the dq-axis vector coordinate system.

Figure 3:
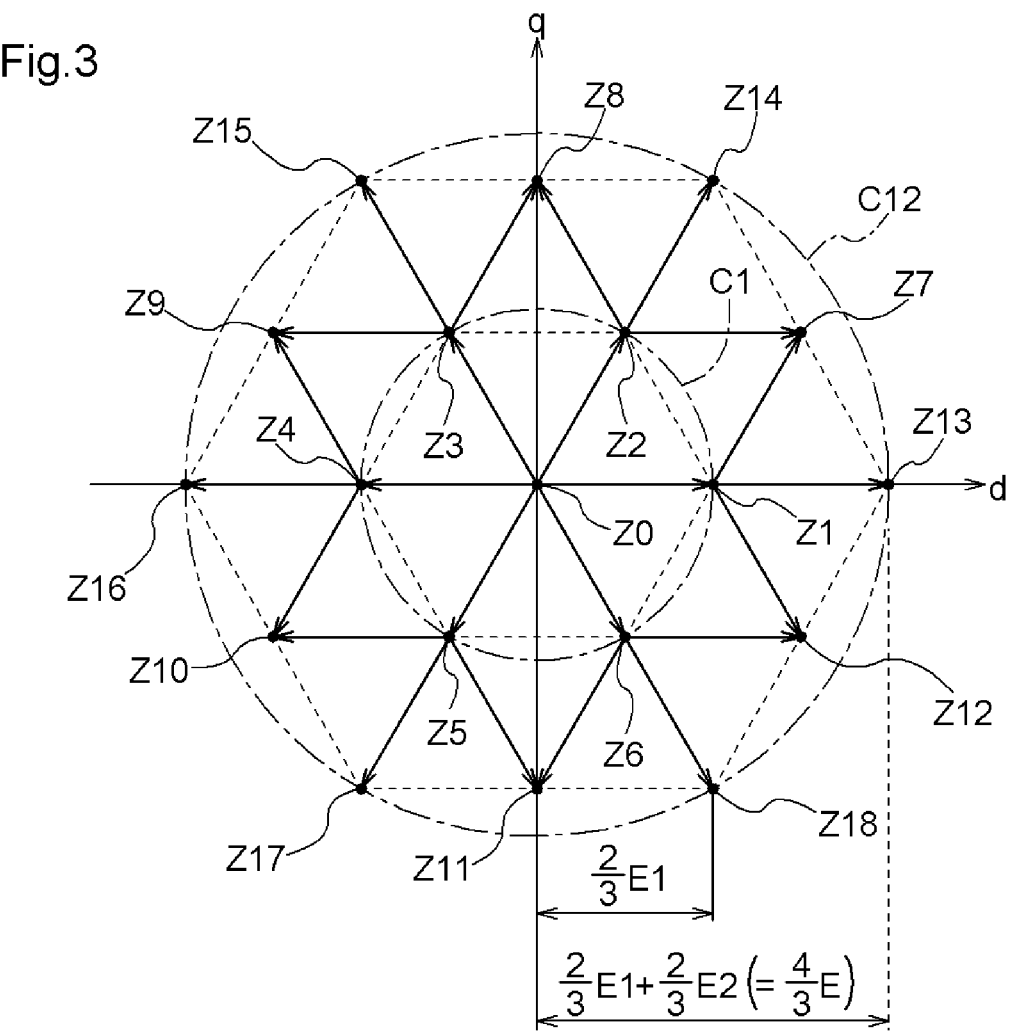
FIG. 3 is a vector diagram of the rotary electric machine driving system including two inverters.

In FIG. 3, the coordinates of the null vectors and the coordinates of the active vectors at 18 locations are plotted. Z0 represents the coordinates of the null vectors in the dq-axis vector coordinate system (which means that the 10 vectors have the same coordinates). Z1 to Z6 represent the coordinates of the active vectors given in the dq-axis vector coordinate system substantially by one of the inverters 10. Z7 to Z18 represent coordinates associated with the active vectors given in the dq-axis vector coordinate system by the two inverters 10.

Z1 is associated with (000-011), (100-000), (100-111), and (111-011). Z2 is associated with (000-001), (110-000), (110-111), and (111-001). Z3 is associated with (000-101), (010-000), (010-111), and (111-101). Z4 is associated with (000-100), (011-000), (011-111), and (111-100). Z5 is associated with (000-110), (001-000), (001-111), and (111-110). Z6 is associated with (000-010), (101-000), (101-111), and (111-010). These 24 space vectors are a combination of null vectors that are the space vectors given by one of the inverters 10, and active vectors that are the space vectors given by the other inverter 10.

Z1 is also associated with (101-001) and (110-010). Z2 is also associated with (010-011) and (100-101). Z3 is also associated with (011-001) and (110-100). Z4 is also associated with (001-101) and (010-110). Z5 is also associated with (011-010) and (101-100). Z6 is also associated with (001-011) and (100-110). These 12 space vectors also represent the coordinates of Z1 to Z6. The 12 space vectors are a combination of active vectors given by both of the two inverters 10, which means that the space vectors given by one of the inverters 10 are not null vectors.

Z7 to Z12 are associated with 12 space vectors. Z7 is associated with (100-001) and (110-011). Z8 is associated with (010-001) and (110-101). Z9 is associated with (010-100) and (011-101). Z10 is associated with (001-100) and (011-110). Z11 is associated with (001-010) and (101-110). Z12 is associated with (100-010) and (101-011). Z13 to Z18 are associated with six space vectors. Z13 is associated with (100-011). Z14 is associated with (110-001). Z15 is associated with (010-101). Z16 is associated with (011-100). Z17 is associated with (001-110). Z18 is associated with (101-010).

Figure 4:
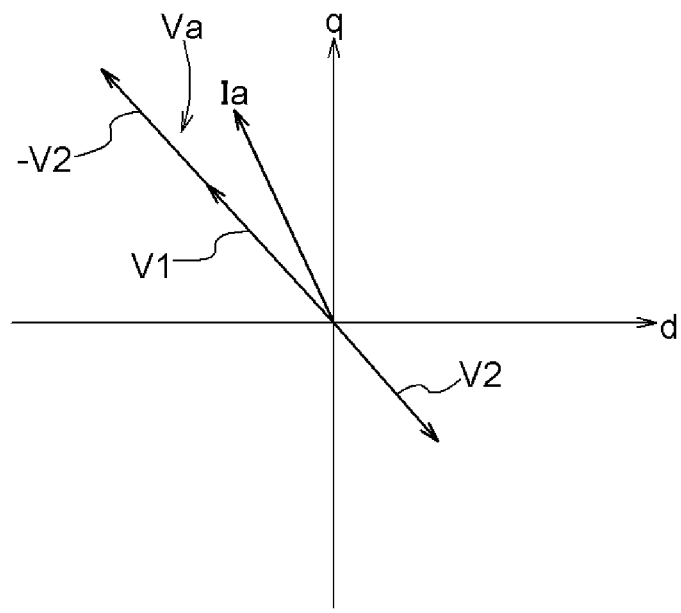
FIG. 4 is a schematic voltage vector diagram of a rotary electric machine in an orthogonal vector space.

FIG. 4 illustrates a vector diagram at a single operating point in the dq-axis vector coordinate system of the rotary electric machine 80. In FIG. 4, "V1" represents a first voltage vector indicative of a voltage generated by the first inverter 11, and "V2" represents a second voltage vector indicative of a voltage generated by the second inverter 12. Voltages applied through the two inverters 10 to the stator coils 8, which are open windings, are each equivalent to a difference "V1−V2" between the first voltage vector V1 and the second voltage vector V2. In FIG. 4, "Va" represents a composite voltage vector present in the stator coils 8. "Ia" represents currents flowing through the stator coils 8 of the rotary electric machine 80. When the first inverter 11 and the second inverter 12 are controlled such that the vector orientations of the first voltage vector V1 and the second voltage vector V2 differ by 180 degrees as illustrated in FIG. 4, the composite voltage vector Va is obtained by adding the magnitude of the second voltage vector V2 to the orientation of the first voltage vector V1.

In the case of controlling, through the two inverters 10, driving of the rotary electric machine 80 including multiphase open windings independent of each other as in the present embodiment, switching control is usually performed on the two inverters 10 by the same control method. A method for switching control, however, is preferably decided such that the rotary electric machine 80 is operable at higher system efficiency in accordance with various factors (or operating conditions), such as a torque, a rotation speed, and a direct-current side voltage required for the rotary electric machine 80. The rotary electric machine control apparatus 1 thus includes a control mode of controlling the first inverter 11 and the second inverter 12 by different control methods in accordance with operating regions (or control regions R) of the rotary electric machine 80. Experiments and simulations conducted by the inventors have confirmed that system efficiency enhancement is enabled by a control mode of controlling the first inverter 11 and the second inverter 12 by different control methods in accordance with operating conditions of the rotary electric machine 80.

In the present embodiment, the rotary electric machine control apparatus 1 includes a control mode of performing target control that involves: controlling one of the inverters 10 selected from the first inverter 11 and the second inverter 12 (which is the first inverter 11 in this embodiment) by rectangular wave control; and controlling the other inverter 10 (which is the second inverter 12 in this embodiment) by special pulse width modulation control (SP-PWM), which is one type of pulse width modulation control. As used herein, the term "special pulse width modulation control" refers to a control method to produce a switching pattern that is based on a difference between a switching pattern resulting from pulse width modulation control and a switching pattern resulting from rectangular wave control when a target voltage is to be generated in the stator coils 8. Special pulse width modulation control will be described in detail below with reference to, for example, FIGS. 8 to 19.

In the present embodiment, as previously described, the second switching elements 32 included in the second inverter 12 are relatively smaller in switching loss than the first switching elements 31 included in the first inverter 11 during transition between an OFF state and an ON state. When the first inverter 11 is controlled by rectangular wave control, the number of times switching is performed by the first inverter 11 is fewer than the number of times switching is performed by the second inverter 12 controlled by special pulse width modulation control. Causing the second inverter 12, which is relatively smaller in switching loss, to perform switching more often than the first inverter 11 makes it possible to reduce or prevent loss in overall system in a high speed region VRH for which a high output is required.

Figure 5:
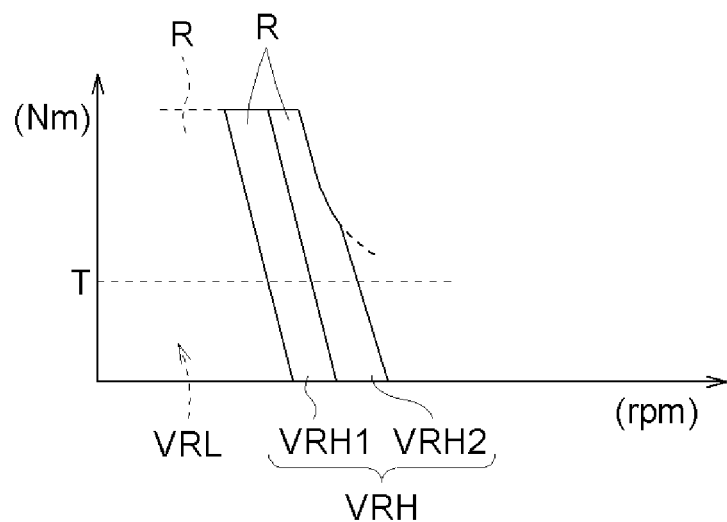
FIG. 5 is a graph illustrating exemplary control regions for the rotary electric machine.

Control modes naturally include modes other than those involving performing target control. Control modes are set in accordance with the control regions R (see, for example, FIG. 5) of the rotary electric machine 80. As illustrated in FIG. 5, the present embodiment involves setting the control regions R of the rotary electric machine 80, which include a low speed region VRL and the high speed region VRH where the rotation speed of the rotary electric machine 80 is higher than that in the low speed region VRL at an equal torque T. Target control is performed in the high speed region VRH.

As illustrated in FIG. 5, the high speed region VRH is dividable such that a first high speed region VRH1 and a second high speed region VRH2 are set within the high speed region VRH. In the second high speed region VRH2, the rotation speed of the rotary electric machine 80 is higher than that in the first high speed region VRH1 at the equal torque T. Target control to be performed in the high speed region VRH may include two types of control, i.e., first target control to be performed in the first high speed region VRH1 and second target control to be performed in the second high speed region VRH2. When the high speed region VRH is undivided, target control to be performed in the entire high speed region VRH is preferably the first target control.

As previously mentioned, control methods for pulse width modulation control include: continuous pulse width modulation control (CPWM) to continuously perform pulse width modulation on all of the multiphase arms 3A; and discontinuous pulse width modulation control (DPWM) to perform pulse width modulation on at least one of the multiphase arms 3A such that a period during which the switching elements 3 are kept in an ON state or an OFF state is included. As previously described, special pulse width modulation control (SP-PWM) is a control method to produce a switching pattern that is based on a difference between a switching pattern resulting from pulse width modulation control and a switching pattern resulting from rectangular wave control when a target voltage is to be generated in the stator coils 8. The pulse width modulation control used in the first target control is continuous pulse width modulation. The pulse width modulation control used in the second target control is discontinuous pulse width modulation.

Target control to be performed in the first high speed region VRH1 by the rotary electric machine control apparatus 1 is the first target control involving: controlling one of the inverters 10 selected from the first inverter 11 and the second inverter 12 (which is the first inverter 11 in this embodiment) by rectangular wave control; and controlling the other inverter 10 (which is the second inverter 12 in this embodiment) by special continuous pulse width modulation control (SP-CPWM) that is special pulse width modulation control (SP-PWM) based on continuous pulse width modulation control (CPWM). Target control to be performed in the second high speed region VRH2 by the rotary electric machine control apparatus 1 is the second target control involving: controlling one of the inverters 10 selected from the first inverter 11 and the second inverter 12 (which is the first inverter 11 in this embodiment) by rectangular wave control; and controlling the other inverter 10 (which is the second inverter 12 in this embodiment) by special discontinuous pulse width modulation (SP-DPWM) that is special pulse width modulation control (SP-PWM) based on discontinuous pulse width modulation control (DPWM).

A maximum modulation factor for discontinuous pulse width modulation control is larger than a maximum modulation factor for continuous pulse width modulation control. The second high speed region VRH2 is the control region R where the rotation speed of the rotary electric machine 80 is higher than that in the first high speed region VRH1 at the equal torque T. In terms of system efficiency, modulation is preferably performed in the second high speed region VRH2 using a modulation factor higher than that used in the first high speed region VRH1. Performing special continuous pulse width modulation control based on continuous pulse width modulation in the first high speed region VRH1 and performing special continuous pulse width modulation control based on discontinuous pulse width modulation in the second high speed region VRH2 makes it possible to suitably drive the rotary electric machine 80 across the entire high speed region VRH.

Figure 6:
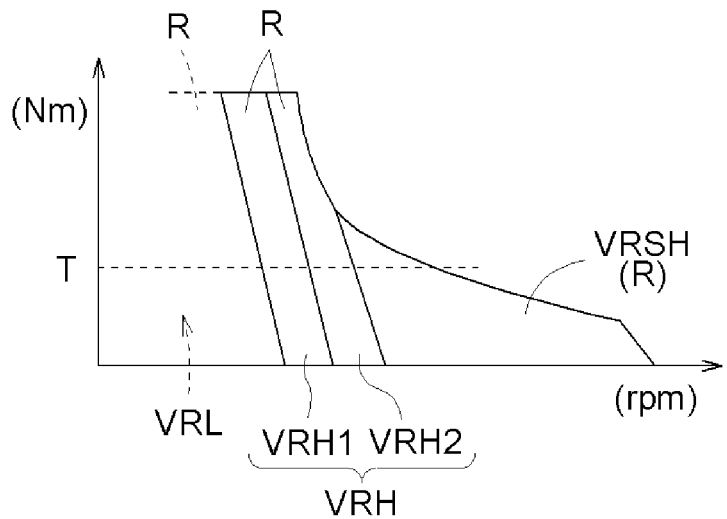
FIG. 6 is a graph illustrating another exemplary control regions for the rotary electric machine.

As illustrated in FIG. 6, the control regions R preferably further include an ultrahigh speed region VRSH where the rotation speed of the rotary electric machine is higher than that in the high speed region VRH at the equal torque T. In the ultrahigh speed region VRSH, both of the inverters 10, i.e., both of the first inverter 11 and the second inverter 12, are controlled by rectangular wave control. In the high speed region VRH where the rotation speed of the rotary electric machine is lower than that in the ultrahigh speed region VRSH at the equal torque T, one of the inverters 10 is controlled by rectangular wave control, and the other inverter 10 is controlled by special discontinuous pulse width modulation. A maximum modulation factor for normal discontinuous pulse width modulation is 0.78, which substantially corresponds to a modulation factor for rectangular wave control, and a maximum modulation factor for special discontinuous pulse width modulation based on discontinuous pulse width modulation is also approximately 0.78. This makes it possible to suitably drive the rotary electric machine 80 across the high speed region VRH and the ultrahigh speed region VRSH.

In the low speed region VRL, the rotary electric machine control apparatus 1 performs target low speed region control involving: controlling one of the inverters 10 selected from the first inverter 11 and the second inverter 12 (which is the first inverter 11 in this embodiment) by active short circuit control; and controlling the other inverter 10 (which is the second inverter 12 in this embodiment) by pulse width modulation control. In this case, the rotary electric machine 80 will be driven substantially by either one of the two inverters 10 (which is, for example, the second inverter 12). Because one of the inverters 10 performs no switching operation, switching loss will be reduced accordingly. Consequently, the rotary electric machine control apparatus 1 is able to drive the rotary electric machine 80 while reducing or preventing loss in overall system.

In the present embodiment, the second inverter 12 includes switching elements relatively smaller in switching loss than those included in the first inverter 11 as previously mentioned. In the case of performing active short circuit control on the first inverter 11, switching loss in the first inverter 11, which is relatively larger in switching loss, becomes approximately zero. Because the second inverter 12 that performs switching is relatively smaller in switching loss, the present embodiment is able to reduce or prevent loss in overall system in the low speed region VRL.

As illustrated in FIG. 7, the low speed region VRL is also dividable such that a first low speed region VRL1 and a second low speed region VRL2 are set within the low speed region VRL. In the second low speed region VRL2, the rotation speed of the rotary electric machine 80 is higher than that in the first low speed region at the equal torque T. Target low speed control to be performed in the low speed region VRL may include two types of control, i.e., first target low speed control to be performed in the first low speed region VRL1 and second target low speed control to be performed in the second low speed region VRL2. When the low speed region VRL is undivided, target control to be performed in the entire low speed region VRL is preferably the first target low speed control.

Control methods for pulse width modulation control include: continuous pulse width modulation control to continuously perform pulse width modulation on all of the multiphase arms 3A; and discontinuous pulse width modulation control to perform pulse width modulation on at least one of the multiphase arms 3A such that a period during which the switching elements 3 are kept in an ON state or an OFF state is included. Continuous pulse width modulation control is used in the first low speed region VRL1. Discontinuous pulse width modulation control is used in the second low speed region VRL2.

Specifically, target low speed region control to be performed in the first low speed region VRL1 by the rotary electric machine control apparatus 1 is first target low speed region control involving: controlling one of the inverters 10 selected from the first inverter 11 and the second inverter 12 (which is the first inverter 11 in this embodiment) by active short circuit control; and controlling the other inverter 10 (which is the second inverter 12 in this embodiment) by continuous pulse width modulation control. Target low speed region control to be performed in the second low speed region VRK2 by the rotary electric machine control apparatus 1 is second target low speed region control involving: controlling one of the inverters 10 selected from the first inverter 11 and the second inverter 12 (which is the first inverter 11 in this embodiment) by active short circuit control; and controlling the other inverter 10 (which is the second inverter 12 in this embodiment) by discontinuous pulse width modulation control.

A maximum modulation factor for discontinuous pulse width modulation control is larger than a maximum modulation factor for continuous pulse width modulation control. The second low speed region VRL2 is the control region R where the rotation speed of the rotary electric machine 80 is higher than that in the first low speed region VRL1 at the equal torque T. In terms of system efficiency, modulation is preferably performed in the second low speed region VRL2 using a modulation factor higher than that used in the first low speed region VRL1. Performing the first target low speed region control using continuous pulse width modulation control in the first low speed region VRL1 and performing the second target low speed region control using discontinuous pulse width modulation in the second low speed region VRL2 makes it possible to suitably drive the rotary electric machine 80 across the entire low speed region VRL.

Figure 31:
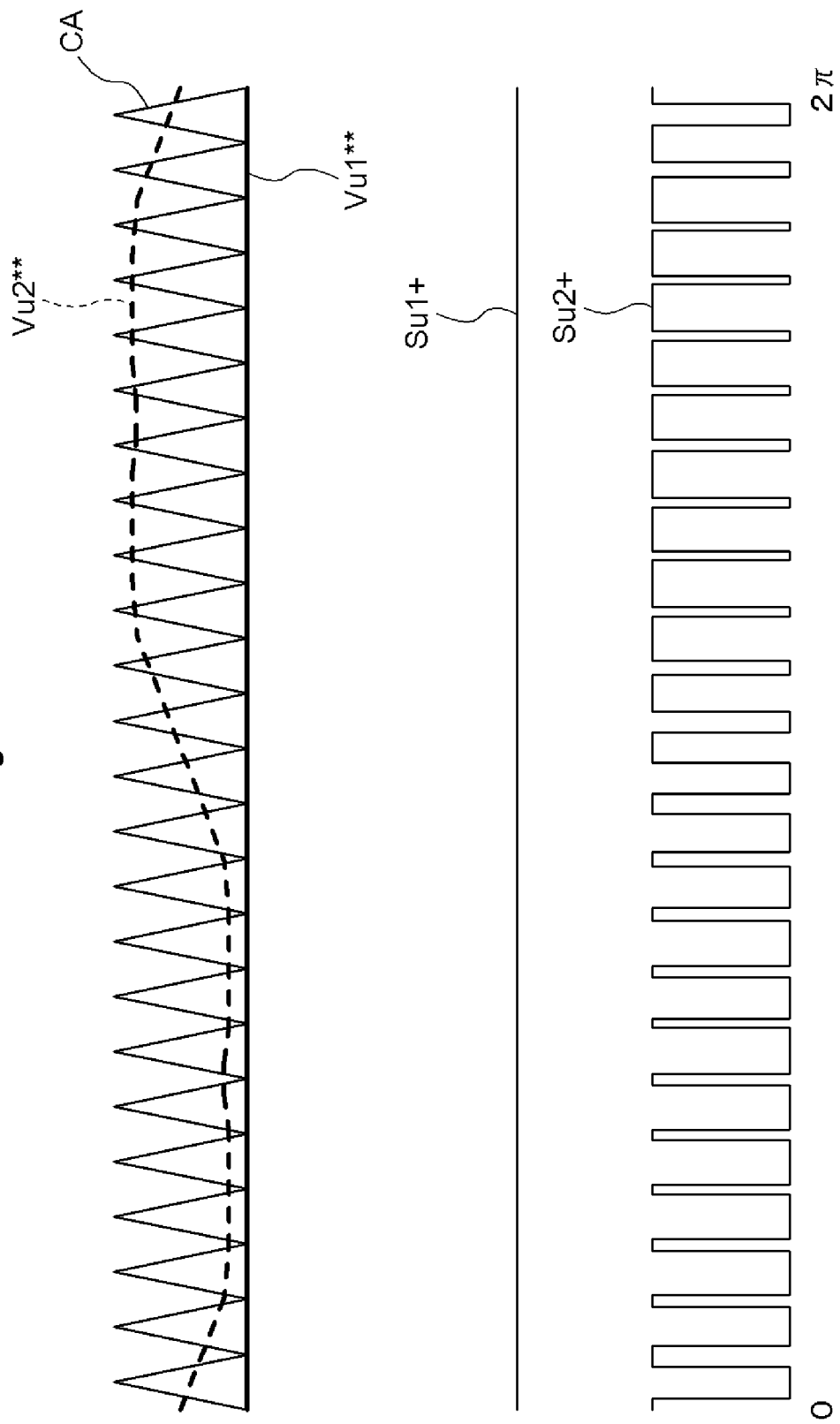
FIG. 31 is a waveform chart illustrating exemplary voltage commands and switching control signals in a low speed region (which is a first low speed region).
Figure 32:
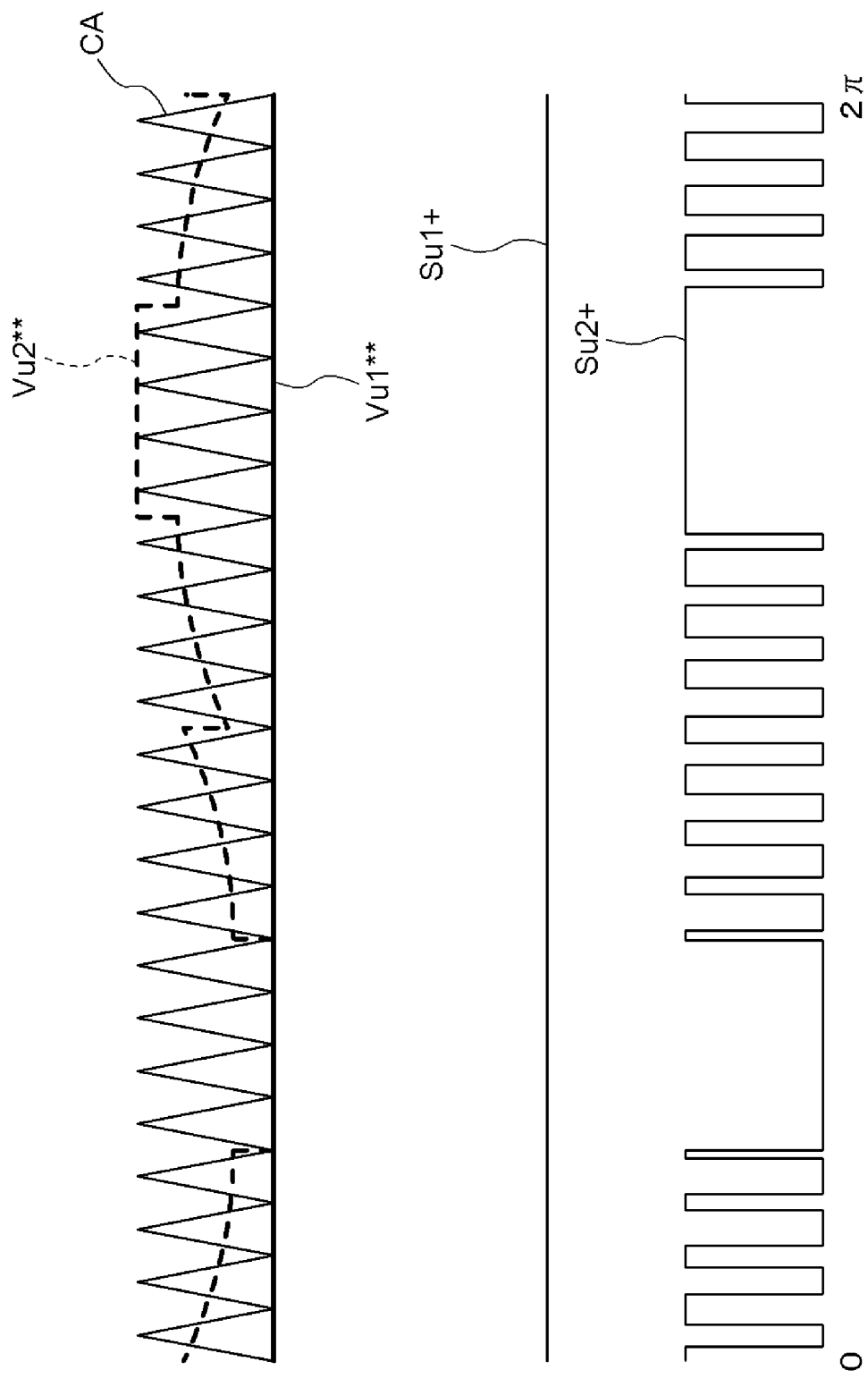
FIG. 32 is a waveform chart illustrating exemplary voltage commands and switching control signals in a second low speed region.

During modulation in the low speed region VRL, audio band noise may occur depending on the frequency of a carrier CA (see, for example, FIGS. 31 and 32). In the low speed region VRL, sounds caused by travel of a vehicle (e.g., travelling sounds, such as sounds caused by contact between tires and a road surface) are low. Thus, when noise output from the inverters 10 is audio frequency band noise, the noise may be easily audible to a user. Increasing the frequency of the carrier CA may allow the frequency of the noise to be out of an audio band. Because the second inverter 12 includes switching elements relatively smaller in switching loss than those included in the first inverter 11, an increase in switching loss would be reduced or prevented if the frequency of the carrier CA is increased.

As illustrated in FIGS. 36 and 37, the first inverter 11 and the second inverter 12 may include identical switching elements 3. If the second inverter 12 includes switching elements relatively smaller in switching loss than those included in the first inverter 11 as illustrated in FIG. 1, the frequency of the carrier CA for the second inverter 12 may not be set at a high level as previously mentioned. The control mode in such a case is not limited to a mode of controlling the first inverter 11 by active short circuit control but may be a mode of controlling the second inverter 12 by active short circuit control.

In such a case, a control method for controlling the first inverter 11 and a control method for controlling the second inverter 12 in the low speed region VRL are preferably interchanged in accordance with predetermined conditions such that only one of the inverters 10 (i.e., the second inverter 12 in this case), which is not subjected to active short circuit control, will not wear out by being switched many times. Interchanging the control methods also makes it possible to prevent either one of the first direct-current power supply 61 and the second direct-current power supply 62 from increasing in the amount of discharge. Examples of the predetermined conditions preferably include a certain period of time and the amount of discharge of each direct-current power supply 6.

As illustrated in FIG. 7, the control regions R may further include an intermediate speed region VRM where the rotation speed of the rotary electric machine 80 is higher than that in the low speed region VRL and lower than that in the high speed region VRH at the equal torque T. In the intermediate speed region VRM, both of the inverters 10, i.e., both of the first inverter 11 and the second inverter 12, are controlled by discontinuous pulse width modulation control.

Assuming that the control regions R include the first low speed region VRL1, the second low speed region VRL2, the intermediate speed region VRM, the first high speed region VRH1, the second high speed region VRH2, and the ultra-high speed region VRSH, examples of control methods to be used for the first inverter 11 and the second inverter 12 are given in Table 1 below.

TABLE 1

| R | INV1 | INV2 |
|---|---|---|
| VRL1 (VRL) | ASC | CPWM (PWM) |
| V-L2 (VRL) | ASC | DPWM (PWM) |
| VRM | DPWM | DPWM |

TABLE 1-continued

| R | INV1 | INV2 |
|---|---|---|
| VRH1 (VRH) | 1-pulse | SP-CPWM (SP-PWM) |
| VRH2 (VRH) | 1-pulse | SP-DPWM (SP-PWM) |
| VRSH | 1-pulse | 1-pulse |

Boundaries between the control regions R are each preferably defined in accordance with at least one of: the rotation speed of the rotary electric machine 80 responsive to a torque of the rotary electric machine 80; and the ratio of an effective value of a line voltage of a multiphase alternating-current voltage to a direct-current voltage. The effective value may be a command value or a value converted from an output voltage.

As illustrated in FIGS. 5 to 7, the operating conditions of the rotary electric machine 80 are often defined on the basis of relationships between rotation speeds and torques. Each control region R may preferably be set in accordance with a rotation speed, which is one of parameters. Although rotation speeds that define the boundaries between the control regions R may be set to be constant irrespective of torques, rotation speeds that define the boundaries between the control regions R are more preferably set to be values varying in accordance with torques. This makes it possible to control driving of the rotary electric machine 80 at high efficiency in accordance with the operating conditions of the rotary electric machine 80.

When the rotary electric machine 80 is required to produce a high output (such as a high rotation speed or a high torque), for example, the use of voltage type inverters satisfies this requirement by increasing a direct-current voltage or increasing the ratio of conversion from a direct-current voltage to an alternating-current voltage. This requirement is satisfiable by increasing the ratio of conversion from a direct-current voltage to an alternating-current voltage when the direct-current voltage is constant. This ratio may be the ratio of an effective value of three-phase alternating-current electric power to direct-current electric power (which is equivalent to the ratio of an effective value of a line voltage of a three-phase alternating-current voltage to a direct-current voltage when the inverters 10 are voltage type inverters). As mentioned above, control methods for controlling the inverters 10 include various methods, such as a method in which the ratio is low and a method in which the ratio is high.

Setting each control region in accordance with the ratio of an effective value of a line voltage of a three-phase alternating-current voltage to a direct-current voltage, which is determined in accordance with requirements for the rotary electric machine 80, makes it possible to control driving of the rotary electric machine 80 at high efficiency in accordance with the operating conditions of the rotary electric machine 80. The ratio may be a modulation factor. Table 2 below corresponds to Table 1 above and gives, by way of example, modulation factors associated with the control regions R. Although described in detail below, "Mi_inv1", "Mi_inv2", and "Mi_sys" in Table 2 respectively represent a modulation factor for the first inverter 11, a modulation factor for the second inverter 12, and a modulation factor for the overall system.

TABLE 2

| R | Mi_sys | INV1 | Mi_inv1 | INV2 | Mi_inv2 |
|---|---|---|---|---|---|
| VRL1 | M < a | ASC | M = 0 | CPWM | M < 2a |
| VRL2 | a ≤ M < X | ASC | M = 0 | DPWM | 2a ≤ M < 2x |
| VRM | X ≤ M < b | DPWM | X ≤ M < b | DPWM | X ≤ M < b |
| VRH1 | b ≤ M < c | 1-Pulse | M = 0.78 | SP-CPWM | 0.78-b ≤ M < 0.78-c |
| VRH2 | c ≤ M < 0.78 | 1-Pulse | M = 0.78 | SP-DPWM | 0.78-c ≤ M < 0.78 |
| VRSH | M = 0.78 | 1-Pulse | M = 0.78 | 1-Pulse | M = 0.78 |

In the present embodiment, an inter-terminal voltage "E1" of the first direct-current power supply 61 is equal to an inter-terminal voltage "E2" of the second direct-current power supply 62. Both of the inter-terminal voltages E1 and E2 may each be referred to as a voltage "E". The modulation factor "Mi_inv1" for the first inverter 11 is expressed by Equation (1) below, where "Va_inv1" represents an effective value of the alternating-current side of the first inverter 11. The modulation factor "Mi_inv2" for the second inverter 12 is expressed by Equation (2) below, where "Va_inv2" represents an effective value of the alternating-current side of the second inverter 12. The modulation factor "Mi_sys" for the overall system is expressed by Equation (3) below.

$$Mi\_inv1 = Va\_inv1/E1 = Va\_inv1/E \quad (1)$$

$$Mi\_inv2 = Va\_inv2/E2 = Va\_inv2/E \quad (2)$$

$$Mi\_sys = (Va\_inv1 + Va\_inv2)/(E1 + E2) \quad (3)$$
$$= (Va\_inv1 + Va\_inv2)/2E$$

Instantaneous values of voltages require taking instantaneous vectors into consideration; however, simply giving consideration only to modulation factors turns out that the modulation factor "Mi_sys" for the overall system will be "(Mi_inv1+Mi_inv2)/2" on the basis of Equations (1) to (3). Table 2 gives modulation factors that are in the form of rated values and associated with the respective control regions R. Accordingly, during actual control, the modulation factors associated with the respective control regions R may include an overlapping area in consideration of, for example, hunting that occurs when control methods differ for each control region R.

A modulation factor "X" is set in accordance with a theoretical upper limit (which is approximately 0.707) to the modulation factor for continuous pulse width modulation (or space vector pulse width modulation) and in consideration of a dead time. In the low speed region VRL (which includes the first low speed region VRL1 and the second low speed region VRL2), modulation may be performed by only one of the inverters 10 as indicated in Table 2. Continuous pulse width modulation control may be performed across the entire low speed region VRL; thus, in the low speed region VRL, a maximum modulation factor "2X" for one of the inverters 10 (which is the second inverter 12 in this case) is set in the range of, for example, about 0.5 to about 0.6 in accordance with a theoretical upper limit to the modulation factor for continuous pulse width modulation control (which is approximately 0.707 for space vector pulse width modulation) and in consideration of a dead time. Accordingly, the modulation factor "X" is set to a value in the range of, for example, about 0.25 to about 0.3. Modulation factors "a, b, c" are suitably set on the basis of, for example, experiments and/or simulations.

In the following description, reference will be made to U phase voltage commands (Vu1, Vu2) and exemplary waveforms of U phase upper side switching control signals (Su1+, Su2+) for the control methods in the respective control regions R. A second U phase lower side switching control signal Su2−, a V phase, and a W phase will not be illustrated.

Figure 8:
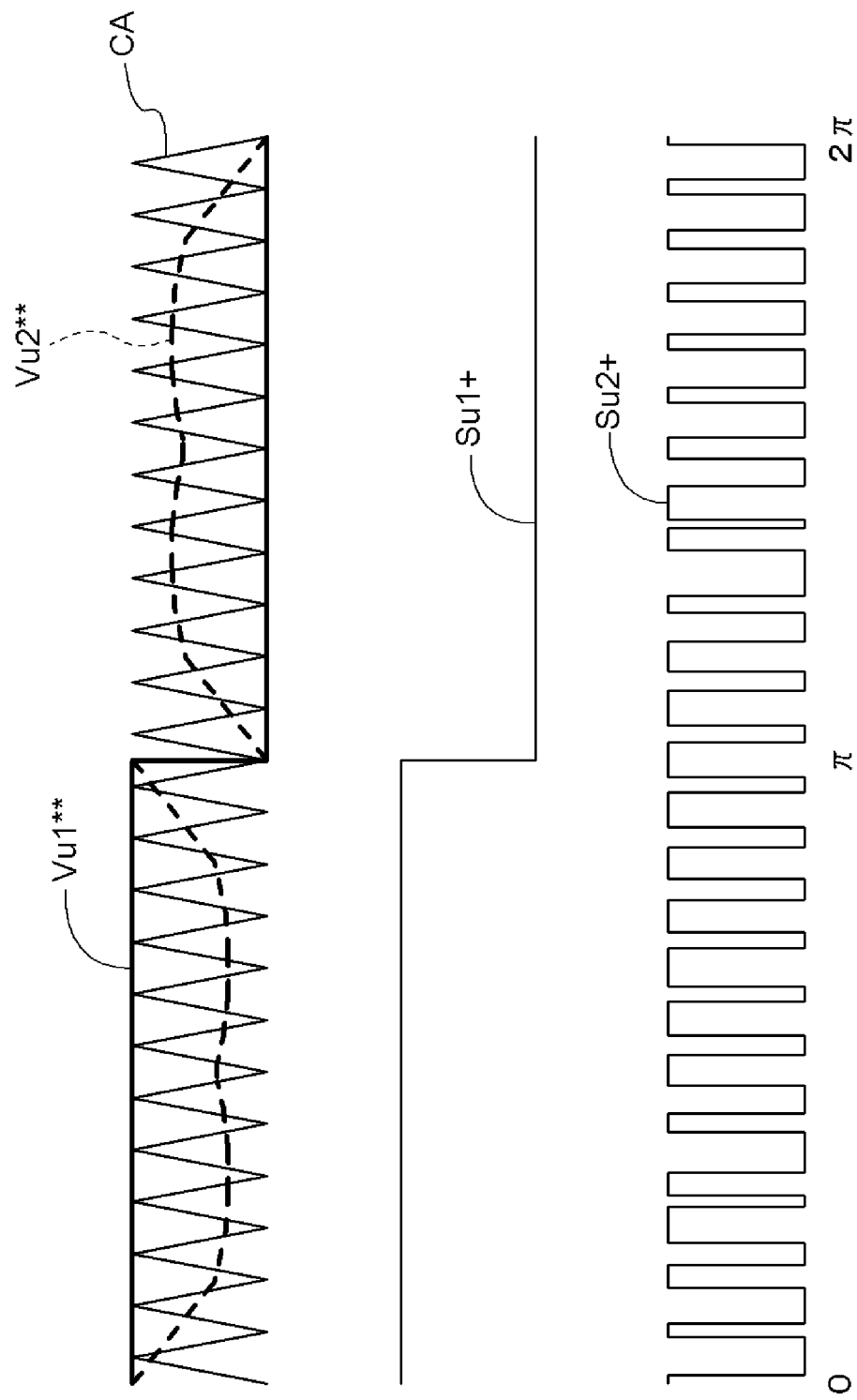
FIG. 8 is a waveform chart illustrating exemplary voltage commands and switching control signals for special pulse width modulation control (or special continuous pulse width modulation control).
Figure 9:
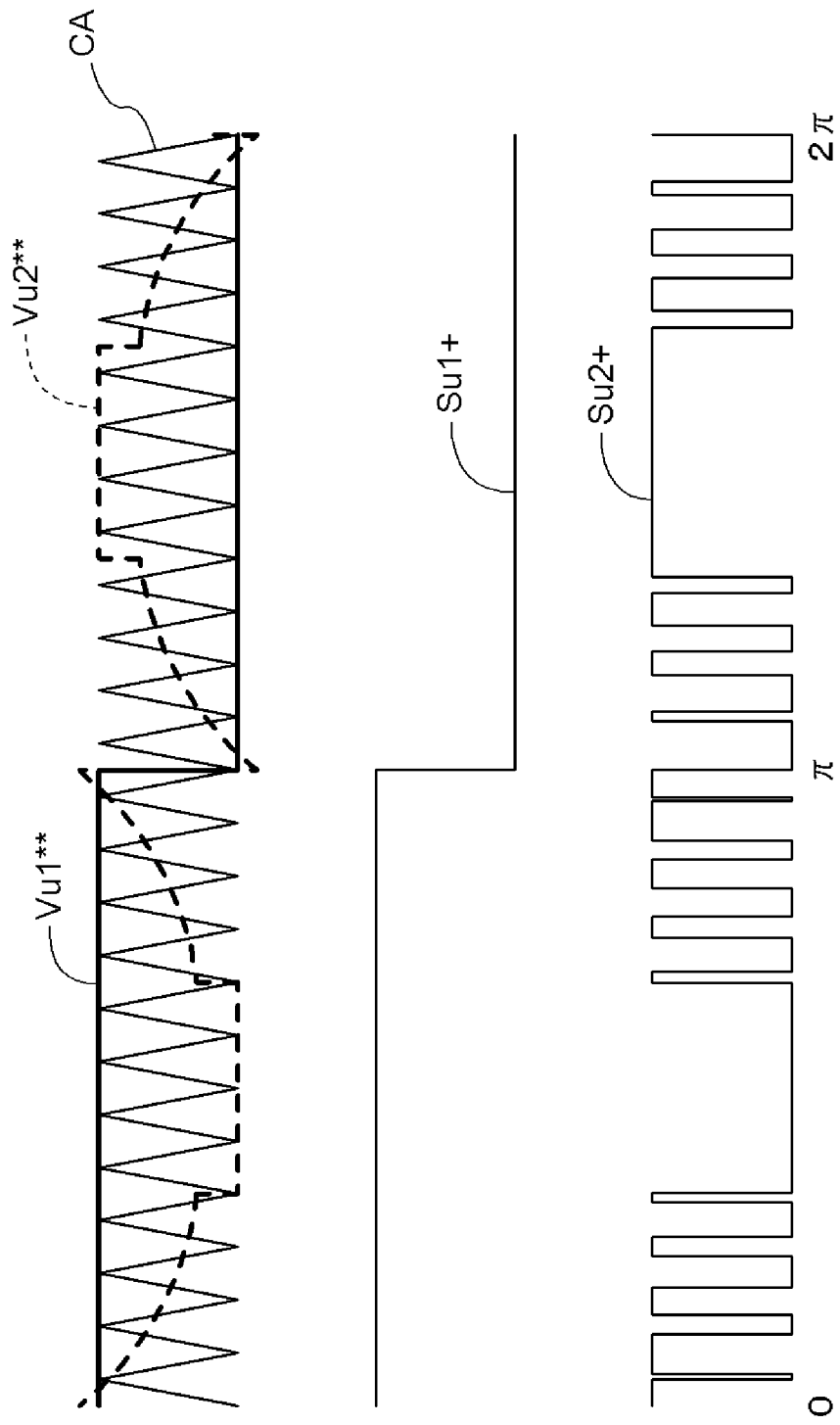
FIG. 9 is a waveform chart illustrating exemplary voltage commands and switching control signals for special discontinuous pulse width modulation control.

Special pulse width modulation control (SP-PWM), which is to be performed in the high speed region VRH and is the most characteristic feature of the present embodiment, will be described with reference to FIGS. 8 to 19. FIG. 8 illustrates special continuous pulse width modulation control (SP-CPWM). FIG. 9 illustrates special discontinuous pulse width modulation control (SP-DPWM).

FIGS. 8 and 9 each illustrate examples of a carrier CA common to the first inverter 11 and the second inverter 12; a first U phase voltage command Vu1, which is a voltage command for the first inverter 11; a second U phase voltage command Vu2, which is a voltage command for the second inverter 12; a first U phase upper side switching control signal Su1+; and a second U phase upper side switching control signal Su2+. Neither of a first U phase lower side switching control signal Su1−, a second U phase lower side switching control signal Su2−, a V phase, and a W phase will be illustrated. The same goes for the other control methods.

The carrier CA, for example, varies in the range of "0<CA<1". A voltage command (V) basically varies in the range of "0≤V≤1". On the basis of comparison between the carrier CA and the voltage command (V), the switching control signal is "1" when the voltage command is equal to or greater than the carrier CA, and the switching control signal is "0" when the voltage command is less than the carrier CA. The same logic of comparison between the carrier CA and the voltage command (V) applies to the following description.

As described above, special pulse width modulation control (SP-PWM) is a control method to produce a switching pattern that is based on a difference between a switching pattern resulting from pulse width modulation control and a switching pattern resulting from rectangular wave control when a target voltage is to be generated in the stator coils 8. Accordingly, the voltage command (V) for special pulse width modulation control (SP-PWM) is set in accordance with a difference between the voltage command (V) for pulse width modulation control and the voltage command (V) for rectangular wave control when a target voltage is to be generated in the stator coils 8. In one example, the voltage command (V) for special continuous pulse width modulation control (SP-CPWM) is set in accordance with a difference between the voltage command (V) for continuous pulse width modulation control and the voltage command (V) for rectangular wave control when a target voltage is to be generated in the stator coils 8. The voltage command (V) for special discontinuous pulse width modulation control (SP-DPWM) is set in accordance with a difference between the voltage command (V) for discontinuous pulse width modulation control and the voltage command (V) for rectangular wave control when a target voltage is to be generated in the stator coils 8**.

Referring to the block diagram of FIG. 2 and FIGS. 10 to 19, the principle and procedure of calculating the voltage command (V) for special pulse width modulation control will be described below. FIGS. 10 to 13 illustrate the principle of calculating the voltage command (V) for special continuous pulse width modulation control. FIGS. 14 to 17 illustrate the principle of calculating the voltage command (V) for special discontinuous pulse width modulation control. FIGS. 18 and 19 illustrate the procedure of calculating the voltage command (V) for special pulse width modulation control. By way of typical example, a U phase voltage command (Vu), which is included in three-phase voltage commands (V), will be described below.

Figure 10:
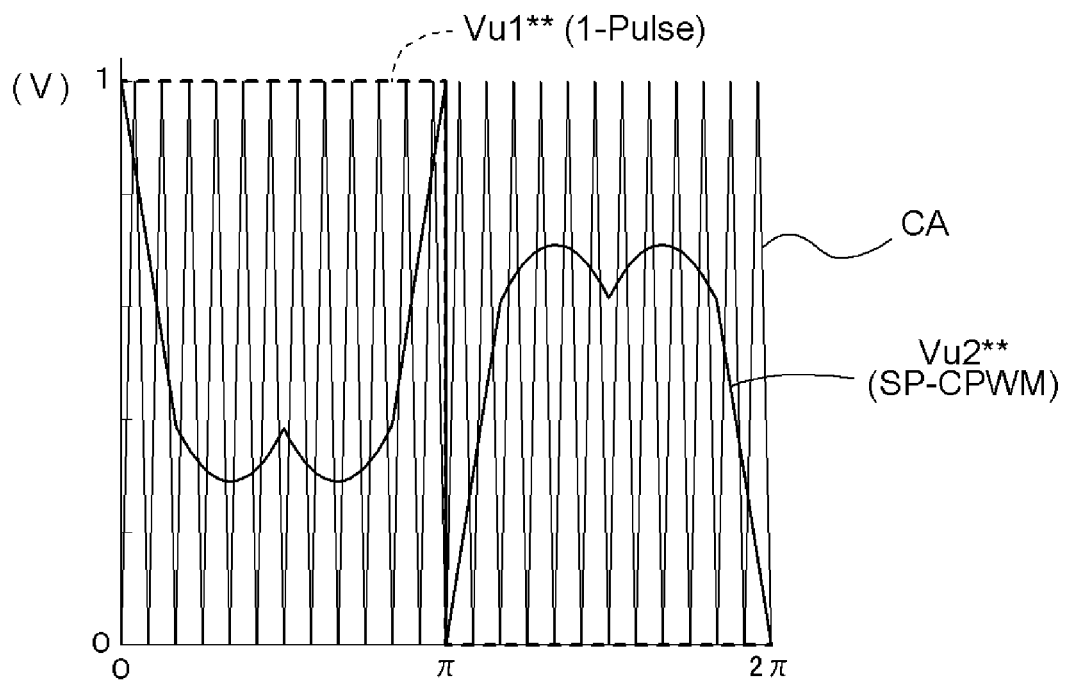
FIG. 10 is an explanatory graph illustrating the principle of voltage command calculations for special continuous pulse width modulation control (Results).

FIG. 10 illustrates a special continuous pulse width modulation control voltage command (Vu2), a rectangular wave control voltage command (Vu1), and a carrier CA such as those illustrated in FIG. 8. In other words, FIG. 10 illustrates results of calculation of the special continuous pulse width modulation control voltage command (Vu2). As previously mentioned, the carrier CA varies in the range of "0<CA<1", and the voltage commands (Vu1, Vu2**) vary between "0" and "1" inclusive.

Figure 11:
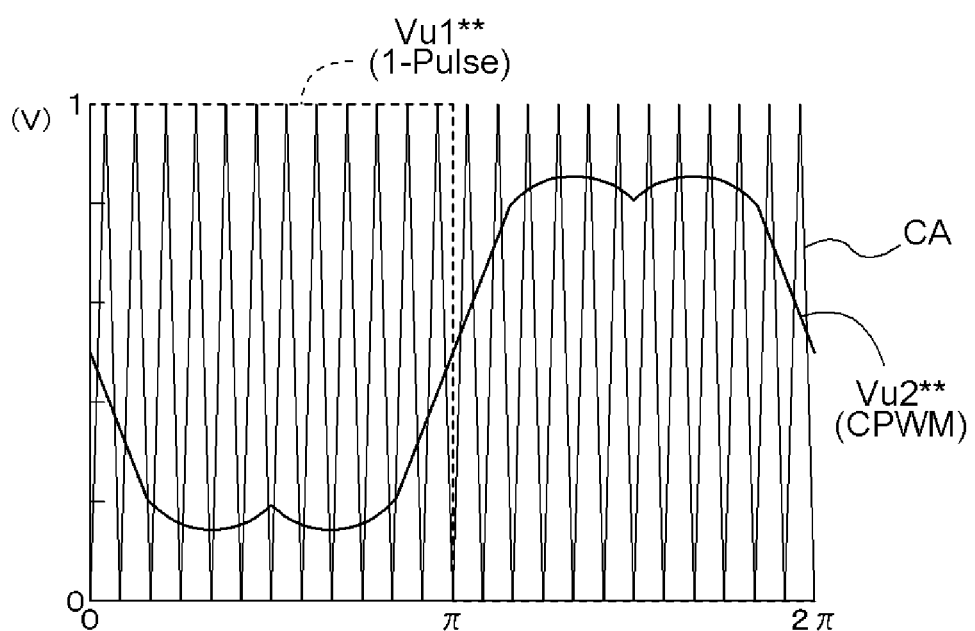
FIG. 11 is an explanatory graph illustrating the principle of voltage command calculations for special continuous pulse width modulation control (Progress 1).

FIG. 11 illustrates a continuous pulse width modulation control voltage command (Vu2), a rectangular wave control voltage command (Vu1), and a carrier CA. In one example, as illustrated in FIG. 2, the special modulation three-phase voltage command calculator 73B, which is included in the second voltage controller 72 to calculate three-phase voltage commands for the second inverter 12, calculates both of a three-phase voltage command (Vu1) for the first inverter 11 and a voltage command (Vu2) for the second inverter 12. In this example, the special modulation three-phase voltage command calculator 73B calculates a rectangular wave control (1-Pulse) voltage command in the form of the three-phase voltage command (Vu1) for the first inverter 11, and calculates a continuous pulse width modulation control (CPWM) voltage command in the form of the three-phase voltage command (Vu2) for the second inverter 12. As illustrated in First Step #1 (which is a basic voltage command acquiring step) of FIG. 18, these voltage commands are acquired in the form of basic voltage commands. "Vu_INV1_Ref" represents a basic voltage command (or a first basic voltage command) for the first inverter 11. "Vu_INV2_Ref" represents a basic voltage command (or a second basic voltage command) for the second inverter 12. The first basic voltage command corresponds to a rectangular wave voltage command. The second basic voltage command corresponds to a pulse width modulation voltage command (which is a continuous pulse width modulation voltage command in this case).

Figure 12:
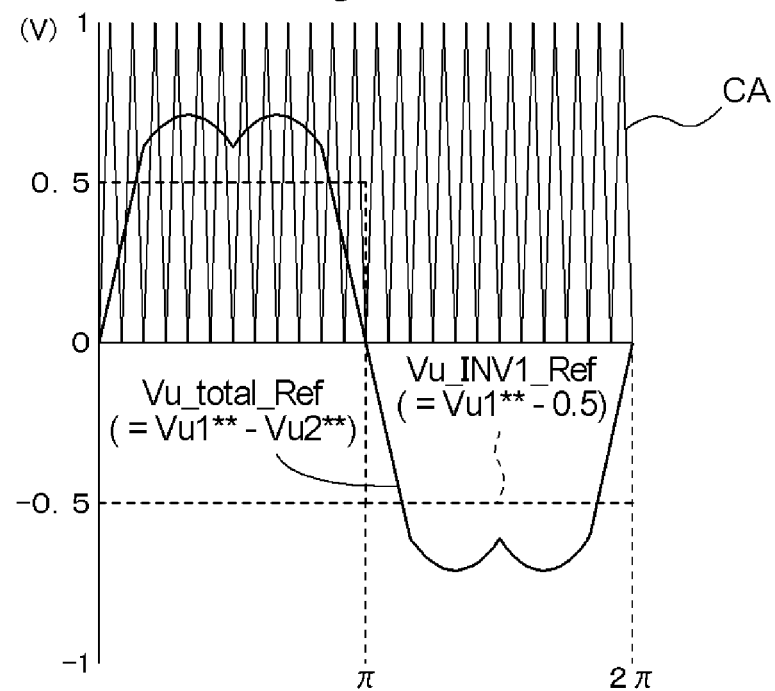
FIG. 12 is an explanatory graph illustrating the principle of voltage command calculations for special continuous pulse width modulation control (Progress 2).

FIG. 12 illustrates voltage commands after Second Step #2 and Third Step #3 of FIG. 18 have been performed. Second Step #2 (which is a system voltage command calculating step) involves calculating a total voltage command "Vu_total_Ref" (which is a system voltage command) to be output using the first inverter 11 and the second inverter 12. As described above with reference to, for example, FIG. 4, the voltage command for the first inverter 11 and the voltage command for the second inverter 12 are set to be different in phase by 180 degrees. Accordingly, as illustrated in FIGS. 12 and 18, the system voltage command "Vu_total_Ref" is calculated in the form of a difference between the first basic voltage command "Vu_INV1_Ref" and the second basic voltage command "Vu_INV2_Ref".

As illustrated in FIG. 12, the wave height of the system voltage command "Vu_total_Ref" is greater than the range of change in the carrier CA "0<CA<1". The amplitude center of the system voltage command "Vu_total_Ref" is "0". In order for the amplitude center of the system voltage command "Vu_total_Ref" to correspond to the amplitude center of the first basic voltage command "Vu_INV1_Ref", Third Step #3 involves shifting the amplitude center of the first basic voltage command "Vu_INV1_Ref" to "0" from "0.5", which is the center of the range of change in the carrier CA "0<CA<1". Third Step #3 may be referred to as a "minus shift step" in a narrow sense; however, Third Step #3 involves making a correction associated with the calculation of the system voltage command and may thus be included in the system voltage command calculating step. In the present embodiment, Second Step #2 and Third Step #3 correspond to the system voltage command calculating step. In the block diagram of FIG. 2 (which includes the special modulation three-phase voltage command calculator 73B), the difference calculation in Second Step #2 is illustrated by way of typical example for the sake of simplification.

Figure 13:
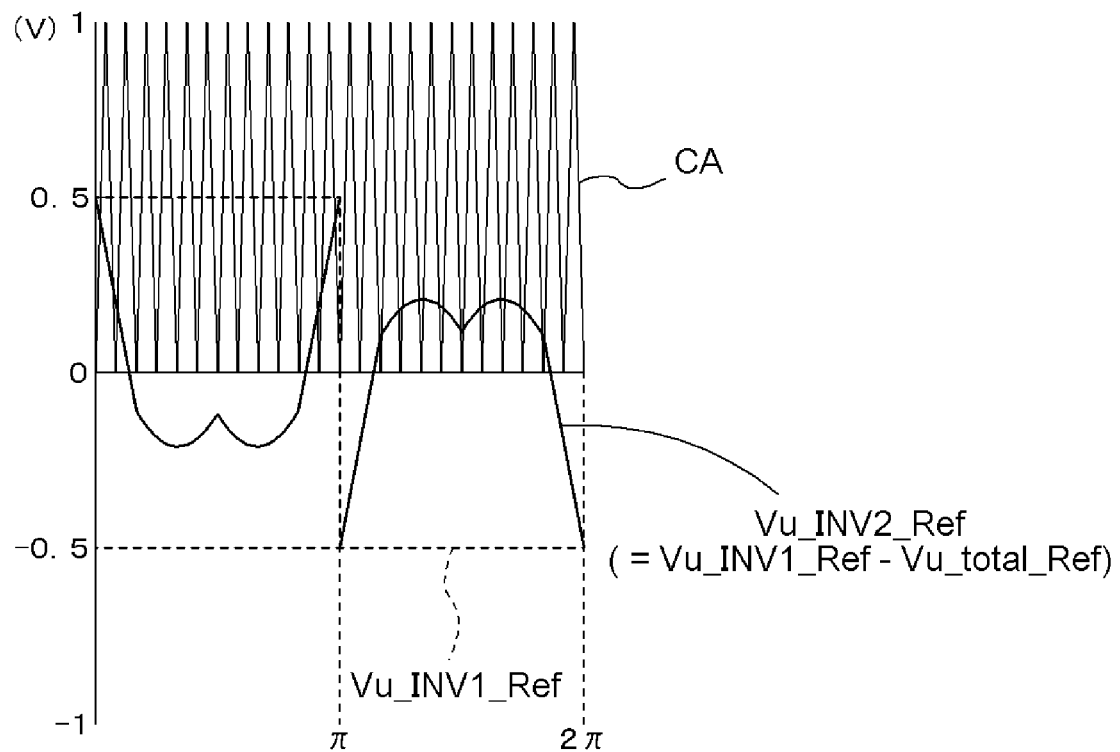
FIG. 13 is an explanatory graph illustrating the principle of voltage command calculations for special continuous pulse width modulation control (Progress 3).

FIG. 13 illustrates voltage commands after Fourth Step #4 of FIG. 18 has been performed. Fourth Step #4 (which is a voltage command optimizing step) involves optimizing, for special continuous pulse width modulation, the second basic voltage command "Vu_INV2_Ref" in accordance with the first basic voltage command "Vu_INV1_Ref" and the system voltage command "Vu_total_Ref" calculated in the system voltage command calculating step (#2, #3). As illustrated in FIGS. 13 and 18, the second basic voltage command "Vu_INV2_Ref" is calculated in the form of a difference between the first basic voltage command "Vu_INV1_Ref" and the system voltage command "Vu_total_Ref". The second basic voltage command "Vu_INV2_Ref" corresponds to a special pulse width modulation voltage command (which is a special discontinuous pulse width modulation voltage command in this case). The second basic voltage command "Vu_INV2_Ref" will eventually be a special pulse width modulation voltage command after going through Fifth Step #5 and Sixth Step #6 (which will be described below).

As illustrated in FIG. 13, the amplitude centers of the first basic voltage command "Vu_INV1_Ref" and the second basic voltage command "Vu_INV2_Ref" are "0" at the time of completion of performance of Fourth Step #4. Thus, Fifth Step #5 (which is a plus shift step) involves performing a plus shift process to return the amplitude centers from "0" to "0.5", which is the center of the range of change in the carrier CA "0<CA<1". In Sixth Step #6 (which is a voltage command setting step) subsequent to the plus shift step, the first basic voltage command "Vu_INV1_Ref" is set to be the voltage command "Vu1" for the first inverter 11, and the second basic voltage command "Vu_INV2_Ref" is set to be the voltage command "Vu2" for the second inverter 12. Fifth Step #5 involves performing correcting calculations similarly to Third Step #3 (which is the minus shift step). Accordingly, Fifth Step #5 may also be included in the voltage command setting step together with Sixth Step #6 as in the case where Third Step #3 is included in the system voltage command calculating step together with Second Step #2. In the present embodiment, Fifth Step #5 and Sixth Step #6 correspond to the voltage command setting step.

Although the block diagram of FIG. 2 is simplified, the special modulation three-phase voltage command calculator 73B performs First Step #1 to Sixth Step #6. The special modulation modulator 75 generates switching control signals for special pulse width modulation control (SP-PWM) in accordance with the voltage commands (V**) for special pulse width modulation control (SP-PWM). When special pulse width modulation control (SP-PWM) is selected as a control method, the second voltage controller 72 outputs the switching control signals for special pulse width modulation control (SP-PWM) through the selector 76. FIG. 2 illustrates a mode in which the second voltage controller 72 includes: the three-phase voltage command calculator 73 and the modulator 74 for normal modulation; the special modulation three-phase voltage command calculator 73B and the special modulation modulator 75 for special pulse width modulation; and the selector 76 to selectively output the switching control signals generated by the modulators (74, 75). Alternatively, as previously mentioned, a selector may select normal modulation three-phase voltage commands and special modulation three-phase voltage commands generated by the special modulation modulator 75, and a shared modulator may generate switching control signals in accordance with the voltage commands selected.

Figure 14:
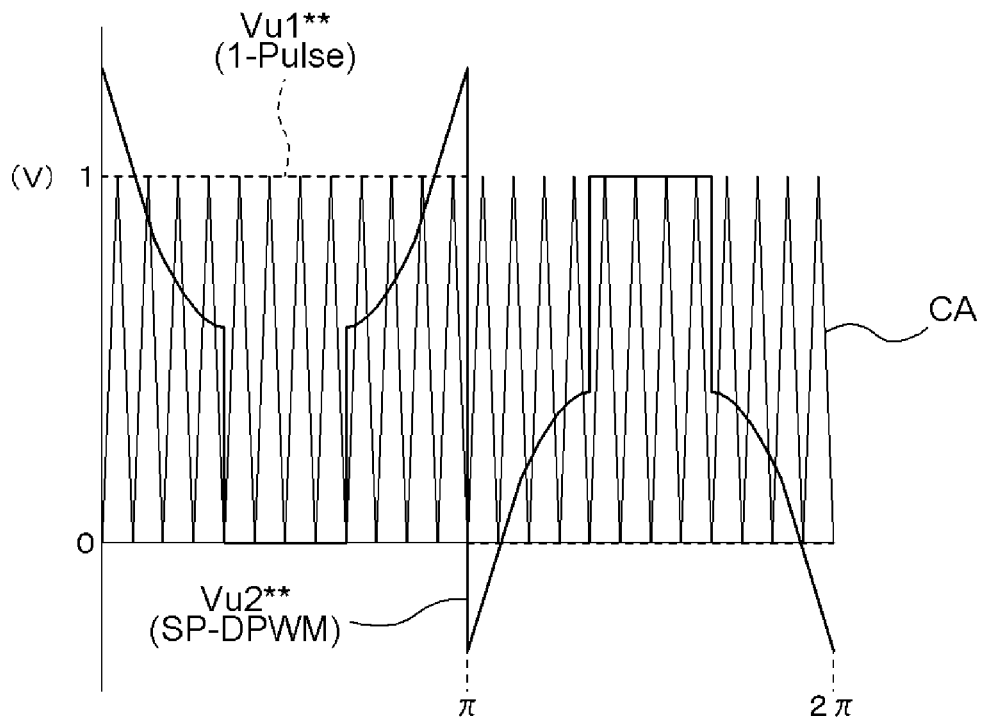
FIG. 14 is an explanatory graph illustrating the principle of voltage command calculations for special discontinuous pulse width modulation control (Results).

FIG. 14 illustrates a special discontinuous pulse width modulation control voltage command (Vu2), a rectangular wave control voltage command (Vu1), and a carrier CA such as those illustrated in FIG. 9. In other words, FIG. 14 illustrates results of calculation of the special discontinuous pulse width modulation control voltage command (Vu2). The rectangular wave control voltage command (Vu1) varies between "0" and "1" inclusive in accordance with the carrier CA that varies in the range of "0 to 1". The range of change in the special discontinuous pulse width modulation control voltage command (Vu2**), however, includes "0" or less and "1" or more, which are outside the range of change in the carrier CA.

Figure 15:
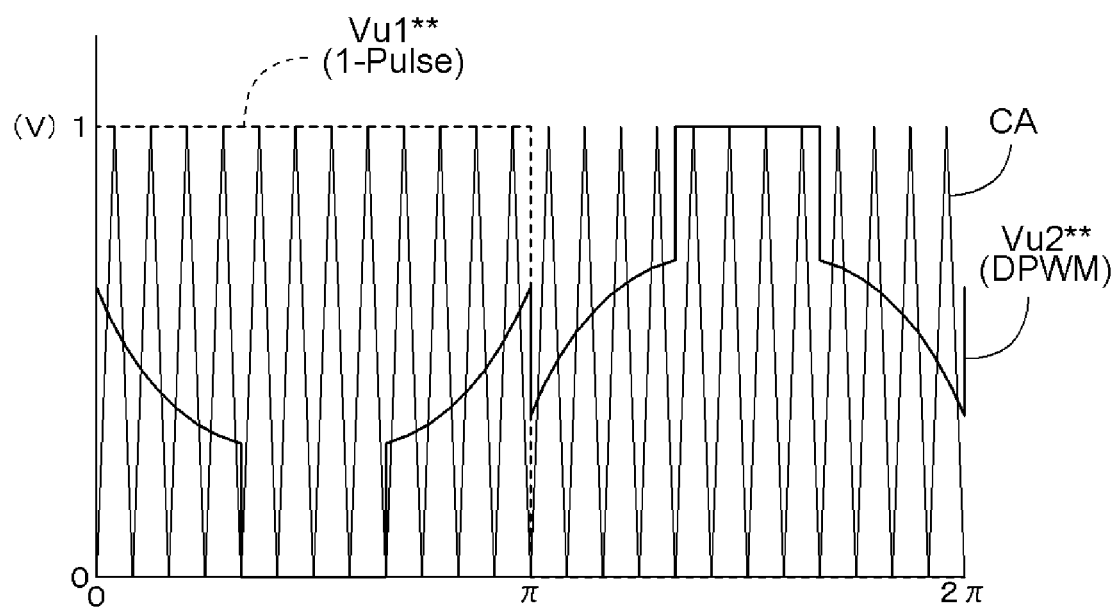
FIG. 15 is an explanatory graph illustrating the principle of voltage command calculations for special discontinuous pulse width modulation control (Progress 1).

FIG. 15 illustrates a discontinuous pulse width modulation control voltage command (Vu2), a rectangular wave control voltage command (Vu1), and a carrier CA. As previously described, the special modulation three-phase voltage command calculator 73B (see FIG. 2) calculates both of a three-phase voltage command (Vu1) for the first inverter 11 and a voltage command (Vu2) for the second inverter 12. In this case, the special modulation three-phase voltage command calculator 73B calculates a rectangular wave control (1-Pulese) voltage command in the form of the three-phase voltage command (Vu1) for the first inverter 11, and calculates a discontinuous pulse width modulation control (DPWM) voltage command in the form of the three-phase voltage command (Vu2) for the second inverter 12. As described above with reference to FIG. 18, First Step #1 (which is the basic voltage command acquiring step) involves acquiring the first basic voltage command "Vu_INV1_Ref" and the second basic voltage command "Vu_INV2_Ref". The first basic voltage command corresponds to a rectangular wave voltage command. The second basic voltage command corresponds to a pulse width modulation voltage command (which is a discontinuous pulse width modulation voltage command in this case).

Figure 16:
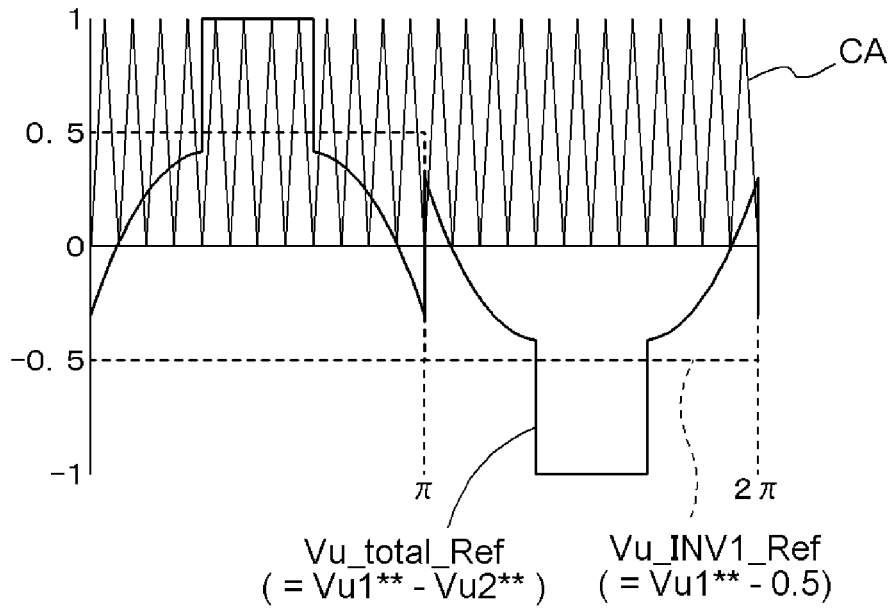
FIG. 16 is an explanatory graph illustrating the principle of voltage command calculations for special discontinuous pulse width modulation control (Progress 2).

FIG. 16 illustrates voltage commands after Second Step #2 and Third Step #3 of FIG. 18 have been performed. Second Step #2 involves calculating a total voltage command "Vu_total_Ref" (which is a system voltage command) to be output using the first inverter 11 and the second inverter 12. As illustrated in FIGS. 16 and 18, the system voltage command "Vu_total_Ref" is calculated in the form of a difference between the first basic voltage command "Vu_INV1_Ref" and the second basic voltage command "Vu_INV2_Ref".

As illustrated in FIG. 16, the wave height of the system voltage command "Vu_total_Ref" is greater than the range of change in the carrier CA "0<CA<1". The amplitude center of the system voltage command "Vu_total_Ref" is "0". In order for the amplitude center of the system voltage command "Vu_total_Ref" to correspond to the amplitude center of the first basic voltage command "Vu_INV1_Ref", Third Step #3 (which is the minus shift step) involves shifting the amplitude center of the first basic voltage command "Vu_INV1_Ref" to "0" from "0.5", which is the amplitude center of the carrier CA. As previously mentioned, Third Step #3 involves making a correction associated with the calculation of the system voltage command and may thus be included in the system voltage command calculating step. In the present embodiment, Second Step #2 and Third Step #3 correspond to the system voltage command calculating step.

Figure 17:
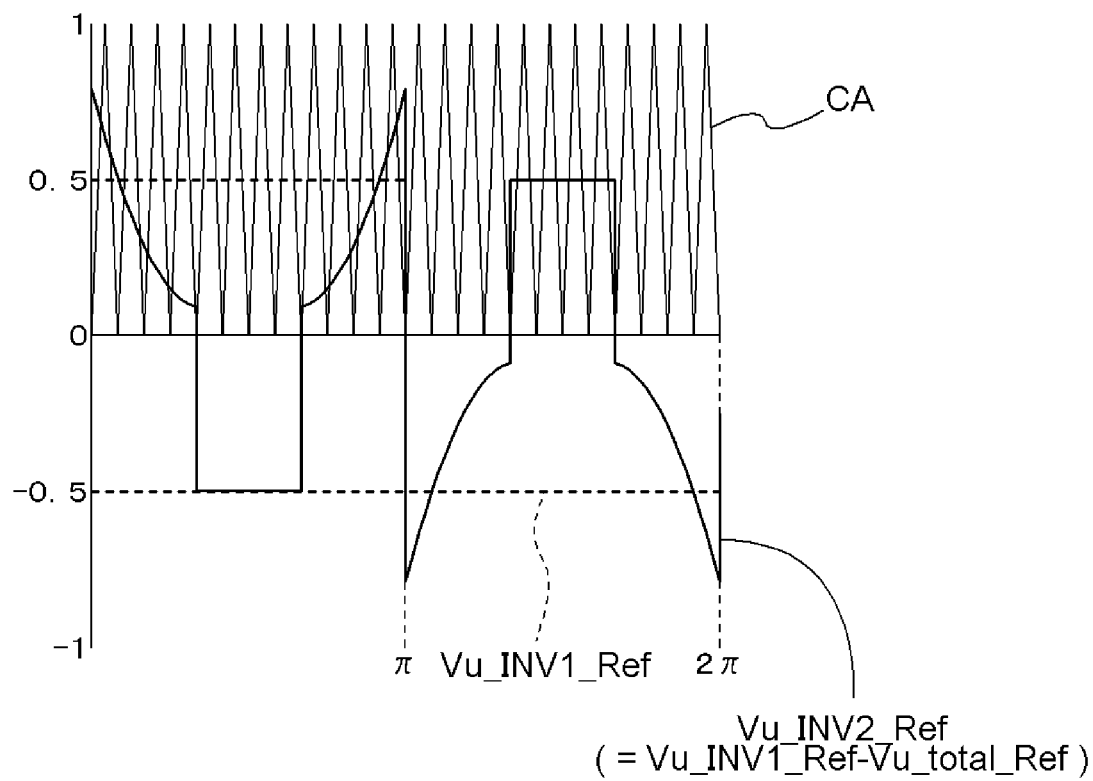
FIG. 17 is an explanatory graph illustrating the principle of voltage command calculations for special discontinuous pulse width modulation control (Progress 3).
Figure 18:
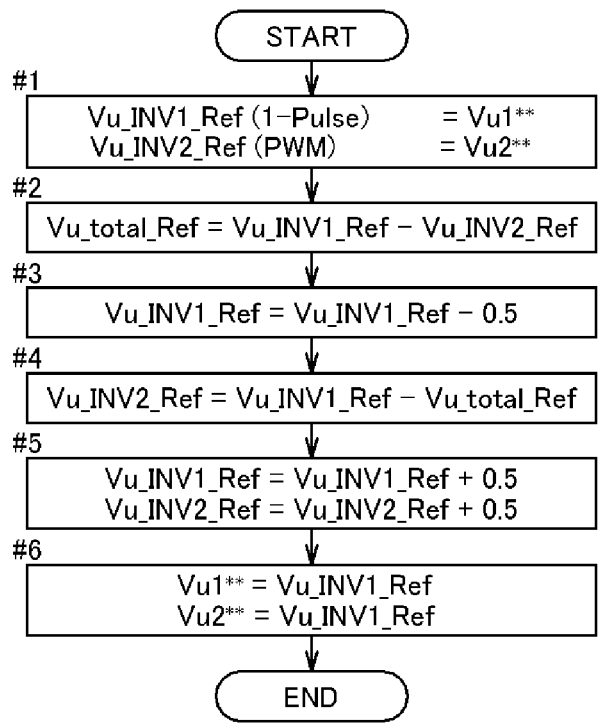
FIG. 18 is a flow chart illustrating an exemplary voltage command calculation procedure for special pulse width modulation control.
Figure 19:
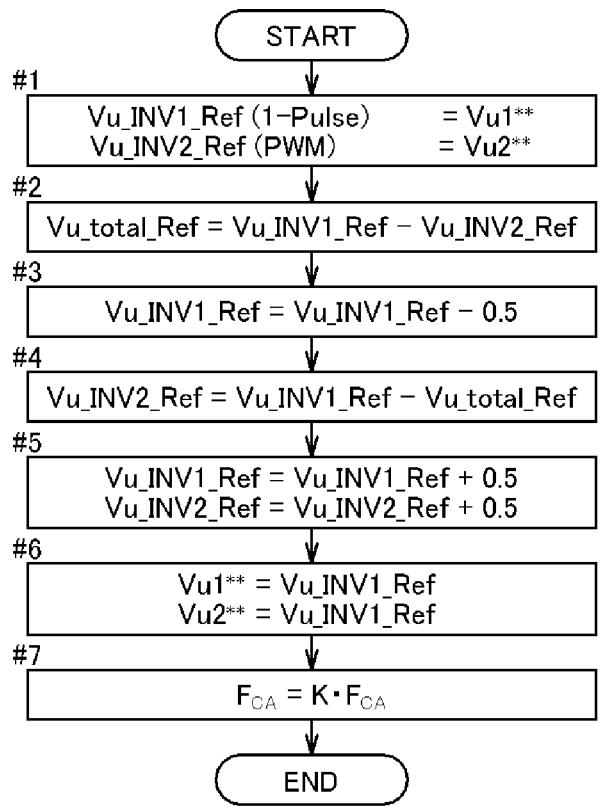
FIG. 19 is a flow chart illustrating another exemplary voltage command calculation procedure for special pulse width modulation control.

FIG. 17 illustrates voltage commands after Fourth Step #4 of FIG. 18 has been performed. Fourth Step #4 (which is the voltage command optimizing step) involves optimizing, for special continuous pulse width modulation, the second basic voltage command "Vu_INV2_Ref" in accordance with the first basic voltage command "Vu_INV1_Ref" and the system voltage command "Vu_total_Ref" calculated in the system voltage command calculating step (#2, #3). As illustrated in FIGS. 17 and 18, the second basic voltage command "Vu_INV2_Ref" is calculated in the form of a difference between the first basic voltage command "Vu_INV1_Ref" and the system voltage command "Vu_total_Ref". The second basic voltage command "Vu_INV2_Ref" corresponds to a special pulse width modulation voltage command (which is a special discontinuous pulse width modulation voltage command in this case). The second basic voltage command "Vu_INV2_Ref" will eventually be a special pulse width modulation voltage command after going through Fifth Step #5 and Sixth Step #6 (which will be described below).

As illustrated in FIG. 17, the amplitude centers of the first basic voltage command "Vu_INV1_Ref" and the second basic voltage command "Vu_INV2_Ref" are "0" at the time of completion of performance of Fourth Step #4. Thus, Fifth Step #5 (which is the plus shift step) involves performing a plus shift process to return the amplitude centers from "0" to "0.5", which is the amplitude center of the carrier CA. In Sixth Step #6 (which is the voltage command setting step) subsequent to the plus shift step, the first basic voltage command "Vu_INV1_Ref" is set to be the voltage command "Vu1" for the first inverter 11, and the second basic voltage command "Vu_INV2_Ref" is set to be the voltage command "Vu2" for the second inverter 12. Because Fifth Step #5 involves performing correcting calculations similarly to Third Step #3 (which is the minus shift step), Fifth Step #5 may also be included in the voltage command setting step together with Sixth Step #6 as in the case where Third Step #3 is included in the system voltage command calculating step. In the present embodiment, Fifth Step #5 and Sixth Step #6 correspond to the voltage command setting step. As described above, the special modulation three-phase voltage command calculator 73B performs First Step #1 to Sixth Step #6.

The flow chart of FIG. 19 illustrates a mode in which Seventh Step #7 is to be further performed. The special modulation modulator 75 performs Seventh Step #7. Suppose that a selector selects normal modulation three-phase voltage commands and special modulation three-phase voltage commands generated by the special modulation modulator 75, and a shared modulator generates switching control signals in accordance with the voltage commands selected. In this case, the shared modulator performs Seventh Step #7.

Seventh Step #7 involves setting a carrier frequency $F_{CA}$ by multiplying a frequency "$F_{CA}$" of the carrier CA (which is a carrier frequency) by "K" assuming that "K" is a factor greater than "1". In other words, Seventh Step #7 involves increasing the carrier frequency $F_{CA}$ so as to enhance modulation resolution. "K" may be, for example, "2". The resulting effects will be described below with reference to FIGS. 20 to 29 (in particular, FIGS. 26 to 29). The carrier frequency $F_{CA}$ corresponds to a modulation frequency.

As described above with reference to FIGS. 10 to 19, the term "special pulse width modulation control" may refer to a control method that produces a switching pattern in accordance with special pulse width modulation voltage commands. Specifically, the term "special pulse width modulation control" may refer to a control method that involves: determining a rectangular wave voltage command that is a voltage command to produce a switching pattern of one of the inverters, which is controlled by rectangular wave control, when a target voltage is to be generated in the stator coils 8, which are open windings; determining a pulse width modulation voltage command that is a voltage command to produce a switching pattern of the other inverter controlled by pulse width modulation control when the target voltage is to be generated, the pulse width modulation voltage command being different in phase from the rectangular wave voltage command by 180 degrees; determining a system voltage command that is a difference between the rectangular wave voltage command and the pulse width modulation voltage command and is a voltage command for an entirety of the two inverters; determining a special pulse width modulation voltage command that is a difference between the system voltage command and the rectangular wave voltage command, with amplitude centers thereof corresponding to each other; and producing a switching pattern in accordance with the special pulse width modulation voltage command.

As described above with reference to FIG. 19, when at least one of the inverters 10, i.e., at least one of the first inverter 11 and the second inverter 12, is controlled by pulse width modulation control in the low speed region VRL, special pulse width modulation control may be performed in the high speed region VRH by using a modulation frequency higher than that used in the pulse width modulation control.

As described above with reference to, for example, Table 1 and Table 2, special pulse width modulation control is performed in the high speed region VRH. In the high speed region VRH, the first inverter 11 is driven by rectangular wave control, and the second inverter 12 is driven by special pulse width modulation control. The following description discusses the advantages of driving the second inverter 12 by special pulse width modulation control in comparison with the case where the second inverter 12 is driven by normal pulse width modulation control, with the first inverter 11 driven by rectangular wave control. The following description further discusses the advantages of increasing the carrier frequency $F_{CA}$ (or increasing the modulation frequency) as described above with reference to FIG. 19.

The following description makes reference also to the waveform charts of FIGS. 20 to 29. FIGS. 20 to 29 illustrate results of "speed sweep" experiments and "speed sweep" simulations involving increasing the rotation speed of the rotary electric machine 80 with the passage of time.

Figure 20:
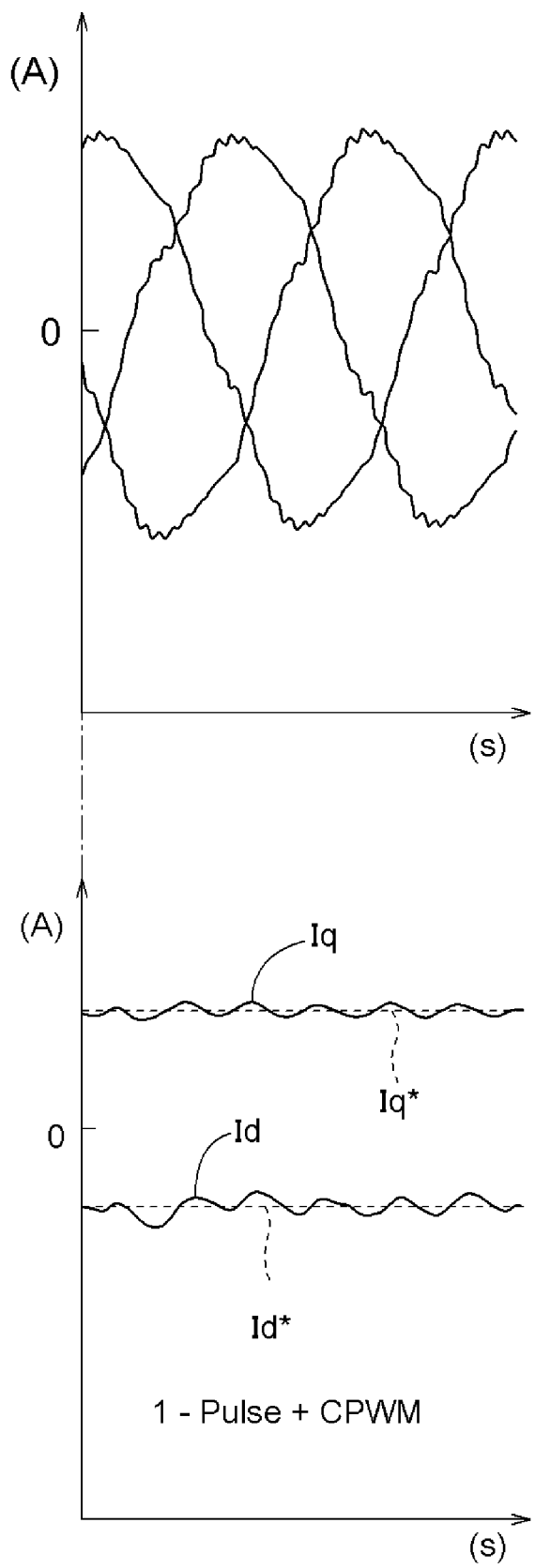
FIG. 20 is a waveform chart of three-phase currents and dq-axis currents in the case of combining rectangular wave control with normal continuous pulse width modulation control (CPWM) in a first high speed region.
Figure 21:
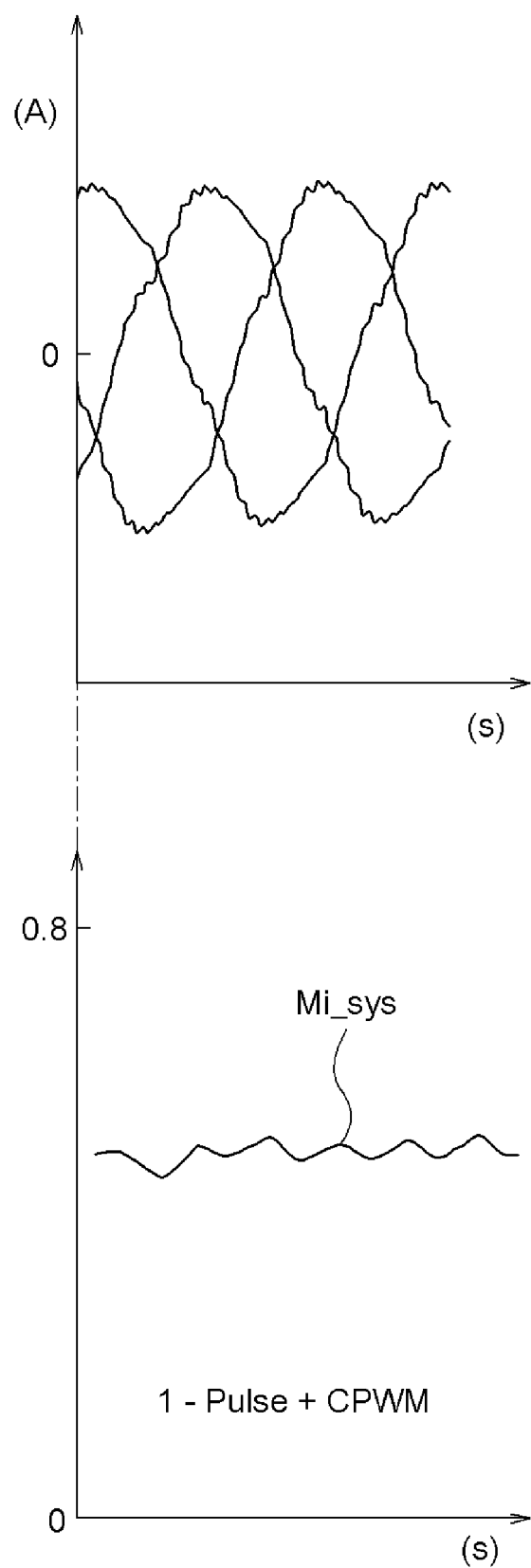
FIG. 21 is a waveform chart of three-phase currents and an actual modulation factor in the case of combining rectangular wave control with normal continuous pulse width modulation control (CPWM) in the first high speed region.
Figure 22:
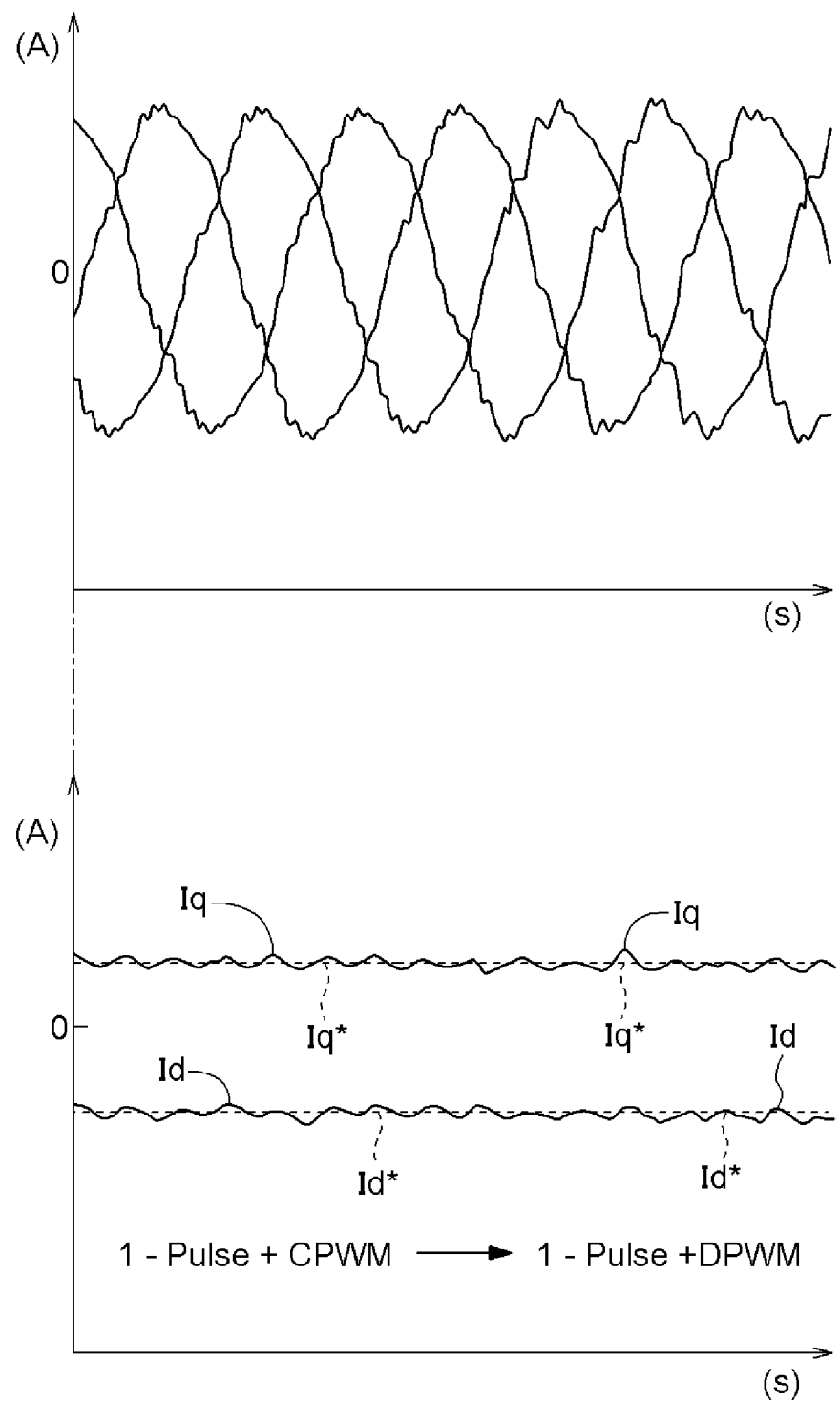
FIG. 22 is a waveform chart of three-phase currents and dq-axis currents in the case of combining rectangular wave control with normal pulse width modulation control (CPWM, DPWM) in the first and second high speed regions.
Figure 23:
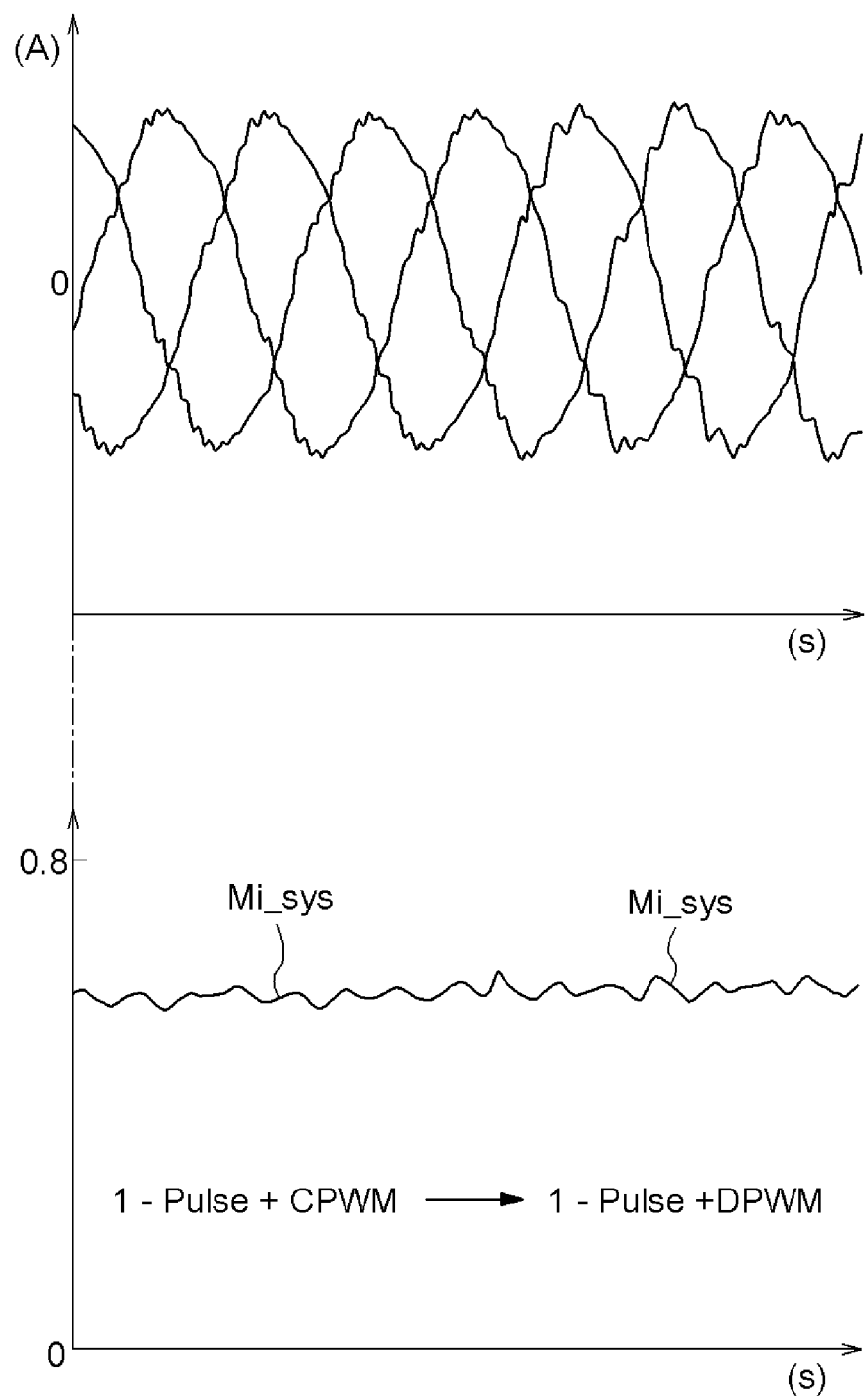
FIG. 23 is a waveform chart of three-phase currents and an actual modulation factor in the case of combining rectangular wave control with normal pulse width modulation control (CPWM, DPWM) in the first and second high speed regions.

The waveform charts of FIGS. 20 and 21 illustrate dq-axis currents (Id, Iq), an actual modulation factor (Mi_sys), and three-phase currents when rectangular wave control (1-Pulse) is combined with normal continuous pulse width modulation control (CPWM) in the first high speed region VRH1. The waveform charts of FIGS. 22 and 23 illustrate dq-axis currents (Id, Iq), an actual modulation factor (Mi_sys), and three-phase currents when rectangular wave control (1-Pulse) is combined with normal continuous pulse width modulation control (CPWM) in the first high speed region VRH1 where the speed is higher than that in FIGS. 20 and 21, and when rectangular wave control (1-Pulse) is combined with normal discontinuous pulse width modulation control (DPWM) in the second high speed region VRH2. In other words, FIGS. 22 and 23 illustrate waveforms obtained when the rotation speed of the rotary electric machine 80 increases with the passage of time and the control methods for the inverters 10 have changed upon transition from the first high speed region VRH1 to the second high speed region VRH2. The same goes for FIGS. 26 to 29. As illustrated in FIGS. 20 to 23, ripples of a frequency "6f" six times as high as a motor electric frequency f (i.e., an electric frequency of the rotary electric machine 80) appear in each of the dq-axis currents (Id, Iq) and the actual modulation factor (Mi_sys).

Figure 24:
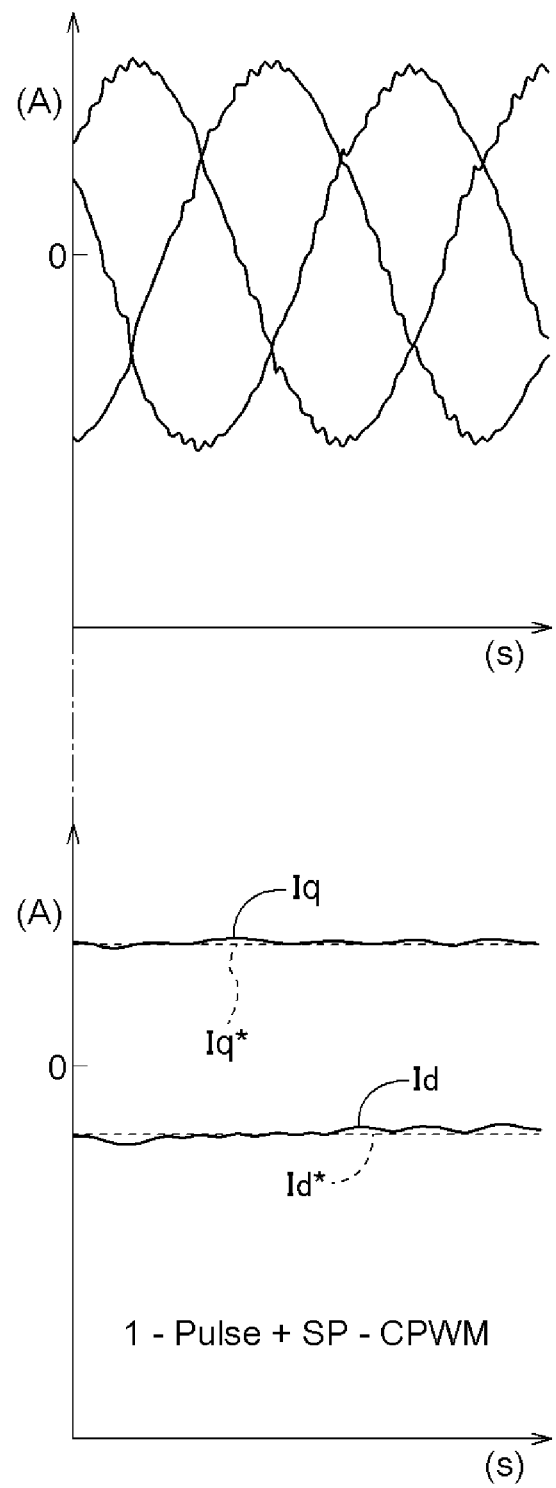
FIG. 24 is a waveform chart of three-phase currents and dq-axis currents in the case of combining rectangular wave control with special continuous pulse width modulation control (SP-CPWM) in the first high speed region.
Figure 27:
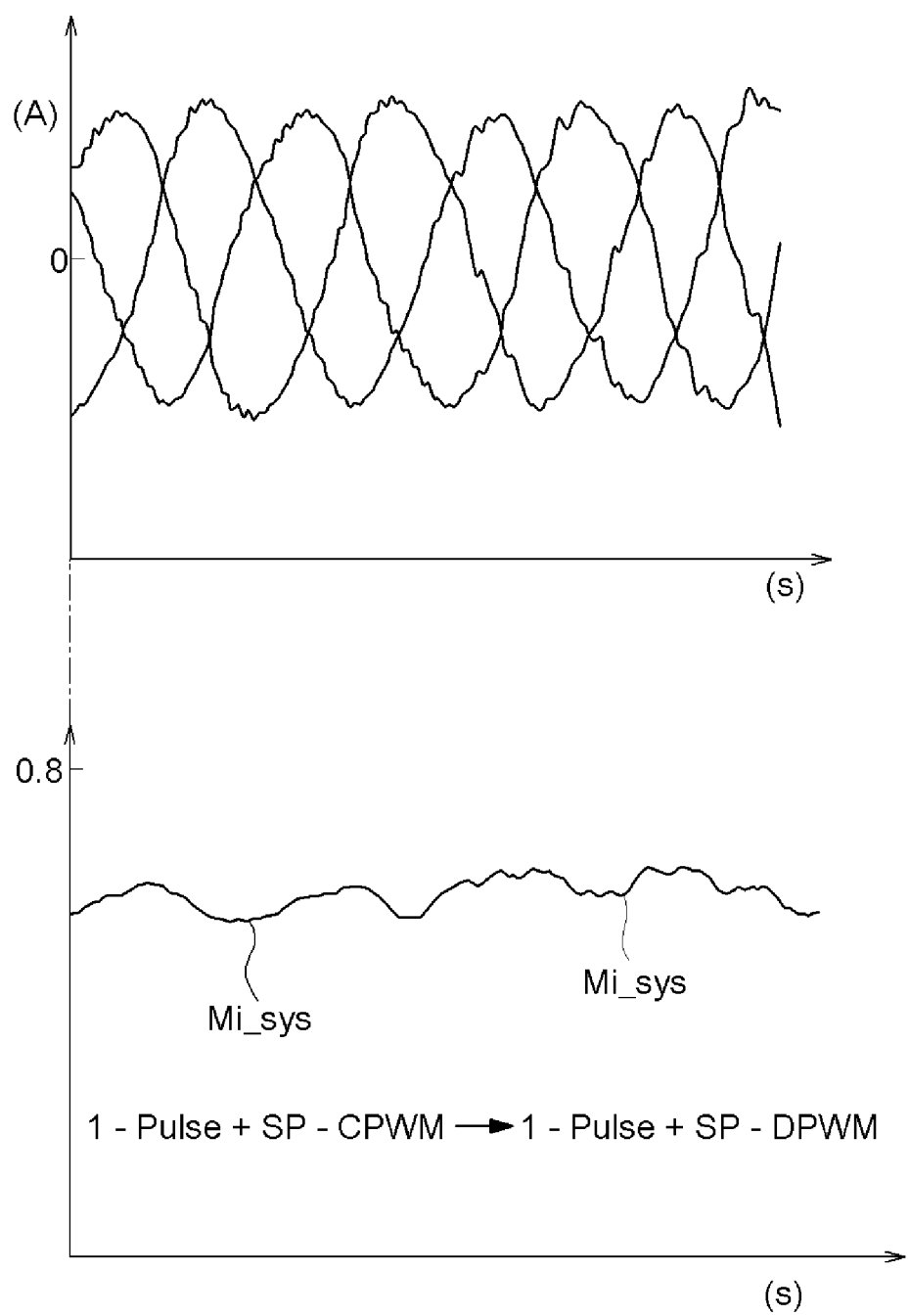
FIG. 27 is a waveform chart of three-phase currents and an actual modulation factor in the case of combining rectangular wave control with special pulse width modulation control (SP-CPWM, SP-DPWM) in the first and second high speed regions.

To smooth the ripples of the frequency "6f", the second inverter 12 is controlled by special continuous pulse width modulation control (SP-CPWM) in the first high speed region VRH1, and the second inverter 12 is controlled by special discontinuous pulse width modulation control (SP-DPWM) in the second high speed region VRH2. FIGS. 24 and 27 illustrate waveform charts in this case.

Figure 25:
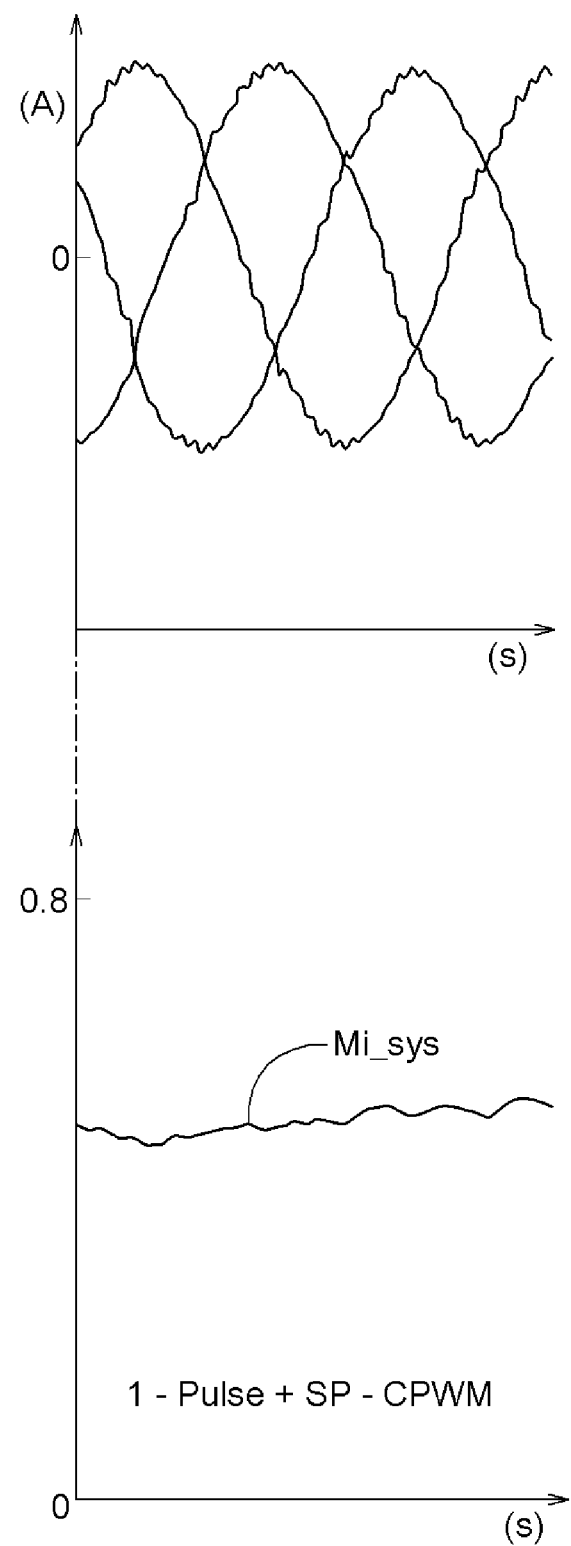
FIG. 25 is a waveform chart of three-phase currents and an actual modulation factor in the case of combining rectangular wave control with special continuous pulse width modulation control (SP-CPWM) in the first high speed region.
Figure 26:
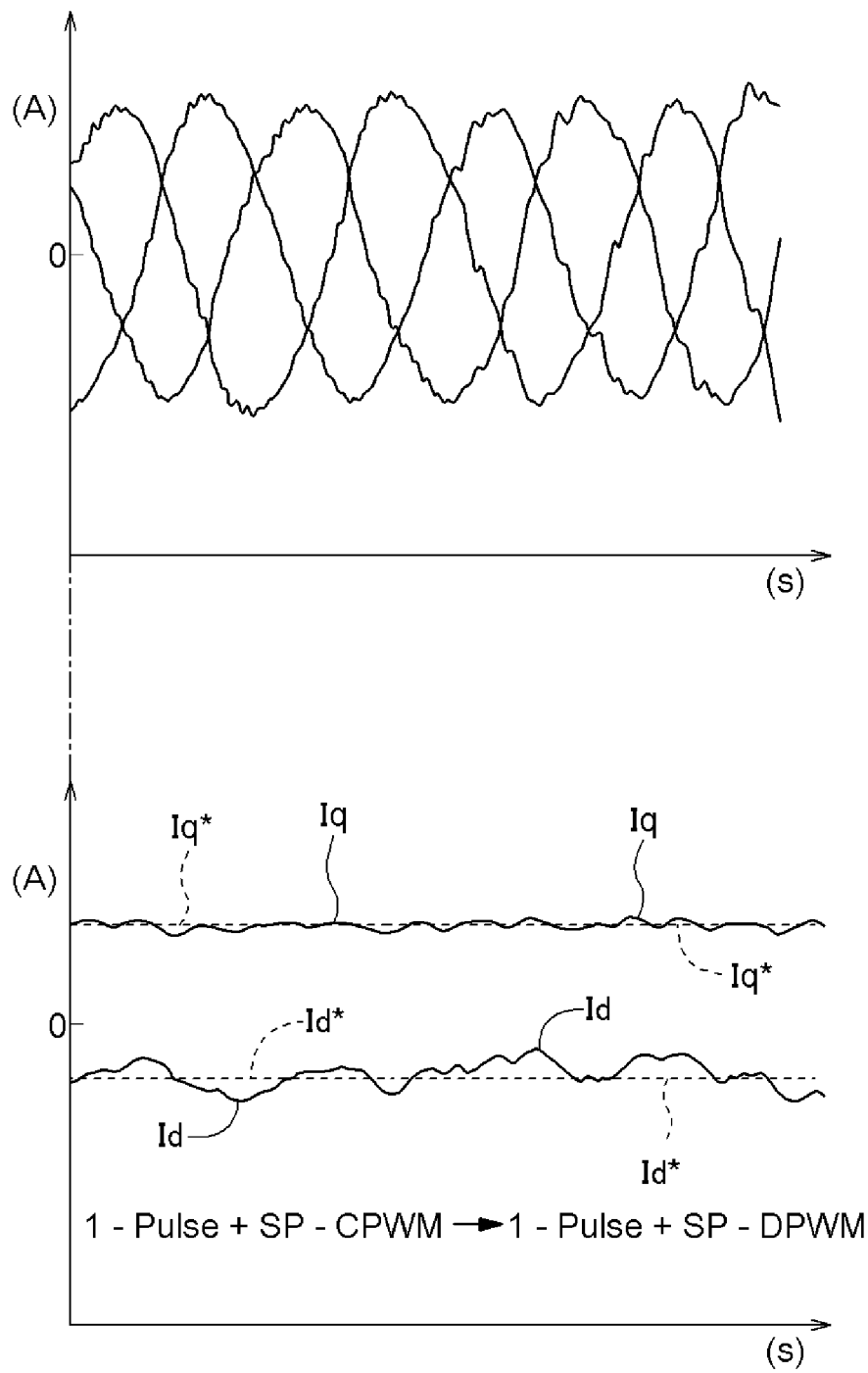
FIG. 26 is a waveform chart of three-phase currents and dq-axis currents in the case of combining rectangular wave control with special pulse width modulation control (SP-CPWM, SP-DPWM) in the first and second high speed regions.

The waveform charts of FIGS. 24 and 25 are respectively associated with the waveform charts of FIGS. 20 and 21. FIGS. 20 and 21 illustrate waveforms obtained by performing normal continuous pulse width modulation control (CPMW). FIGS. 24 and 25 illustrate waveforms obtained by performing special continuous pulse width modulation control (SP-CPWM) at a torque and a rotation speed equal to those in FIGS. 20 and 21. Similarly, the waveform charts of FIGS. 26 and 27 are respectively associated with the waveform charts of FIGS. 22 and 23. FIGS. 22 and 23 illustrate waveforms obtained by performing normal pulse width modulation control (CPMW, DPWM). FIGS. 24 and 25 illustrate waveforms obtained by performing special pulse width modulation control (SP-CPWM, SP-DPWM) at a torque and a rotation speed equal to those in FIGS. 22 and 23.

Specifically, the waveform charts of FIGS. 24 and 25 illustrate dq-axis currents (Id, Iq), an actual modulation factor (Mi_sys), and three-phase currents when rectangular wave control (1-Pulse) is combined with special continuous pulse width modulation control (SP-CPWM) in the first high speed region VRH1. The waveform charts of FIGS. 26 and 27 illustrate dq-axis currents (Id, Iq), an actual modulation factor (Mi_sys), and three-phase currents when rectangular wave control (1-Pulse) is combined with special continuous pulse width modulation control (SP-CPWM) in the first high speed region VRH1 where the speed is higher than that in FIGS. 24 and 25, and when rectangular wave control (1-Pulse) is combined with special discontinuous pulse width modulation control (SP-DPWM) in the second high speed region VRH2.

Comparisons between FIGS. 20 and 21 and FIGS. 24 and 25 indicate that the ripples of the frequency "6f" six times as high as the motor electric frequency f are reduced in each of the dq-axis currents (Id, Iq) and the actual modulation factor (Mi_sys) and thus smoothed in FIGS. 24 and 25. Comparisons between FIGS. 22 and 23 and FIGS. 26 and 27, however, indicate that ripples of a frequency "2f" twice as high as the motor electric frequency f newly appear in each of the dq-axis currents (Id, Iq) and the actual modulation factor (Mi_sys) in FIGS. 26 and 27. In other words, combining rectangular wave control with special pulse width modulation control achieves an improvement that reduces the ripples of the frequency "6f" at the relatively low speed side of the high speed region VRH, but a new problem that produces the ripples of the frequency "2f" at the relatively high speed side of the high speed region VRH occurs if the ripples of the frequency "6f" are reduced.

Figure 28:
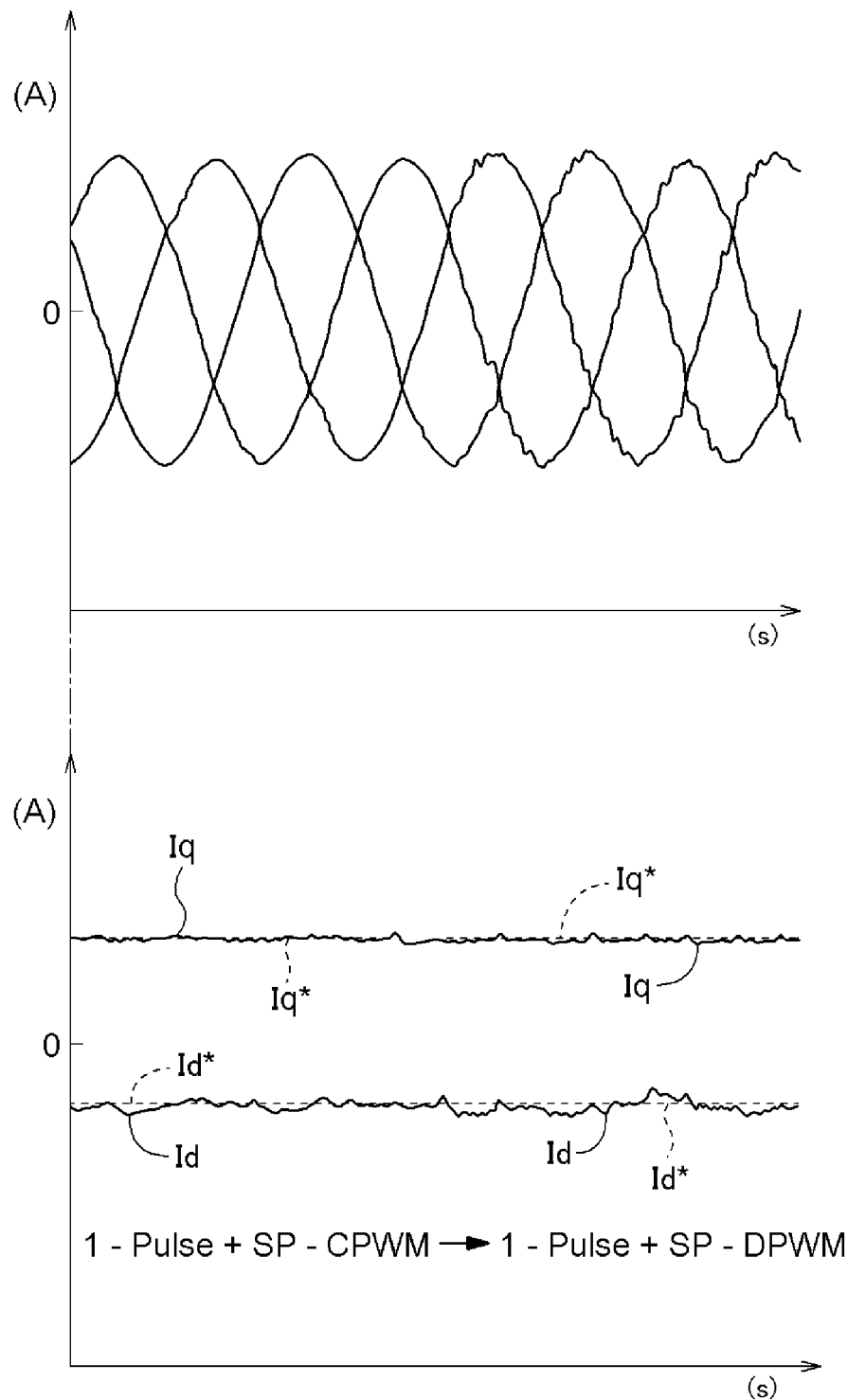
FIG. 28 is a waveform chart of three-phase currents and dq-axis currents in the case of combining rectangular wave control with special pulse width modulation control (SP-CPWM, SP-DPWM) at increased carrier frequency in the first and second high speed regions.
Figure 29:
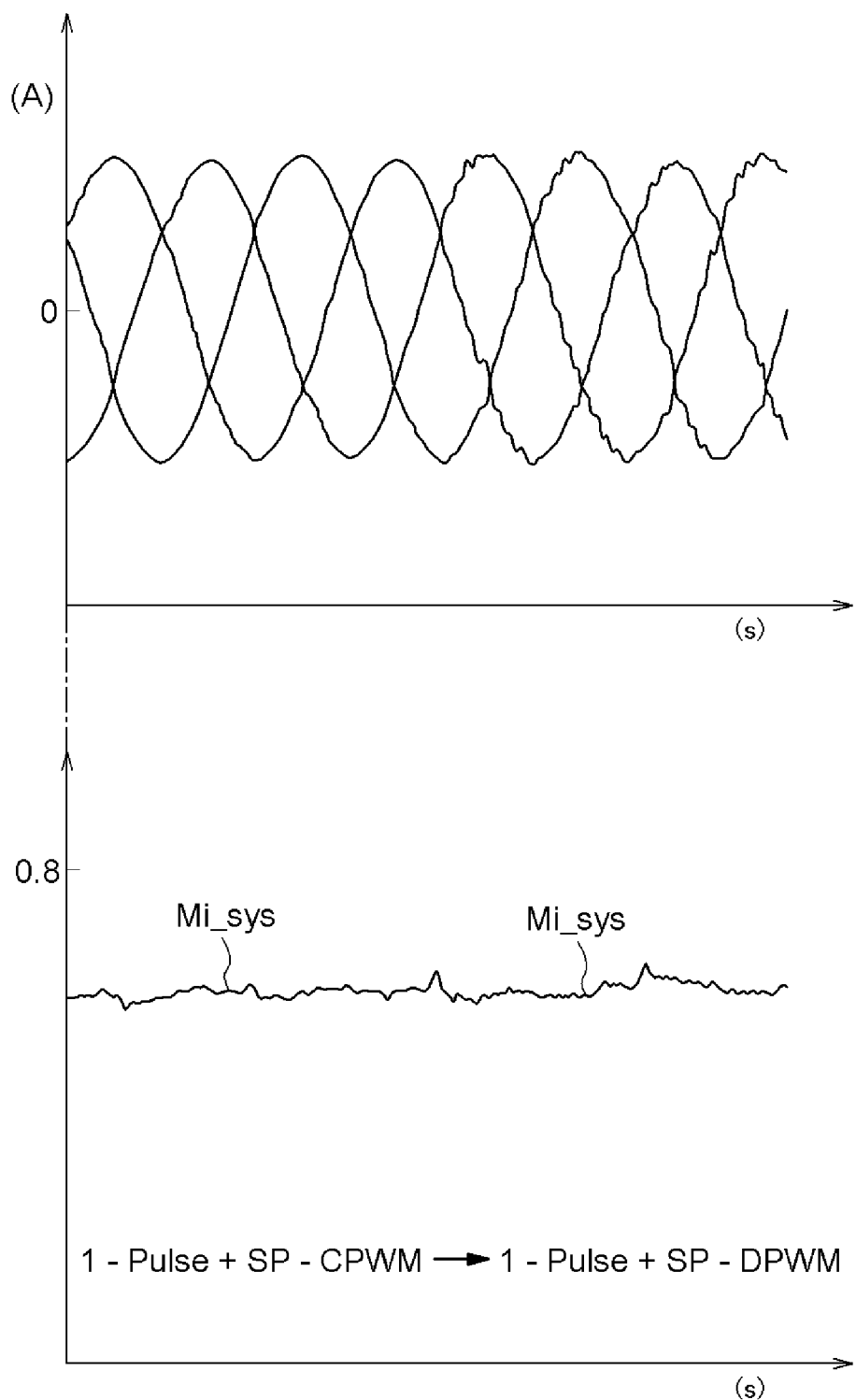
FIG. 29 is a waveform chart of three-phase currents and an actual modulation factor in the case of combining rectangular wave control with special pulse width modulation control (SP-CPWM, SP-DPWM) at increased carrier frequency in the first and second high speed regions.

As illustrated in, for example, FIGS. 10 and 14, the ripples of the frequency "2f" are believed to occur due to abrupt changes in the special pulse width modulation control voltage command (V) in phases of electrical angles of π (180 degrees) and 2π (360 degrees), which are phases at inflection points of the voltage command. In the phases of electrical angles of π and 2π, the amount of increase and the amount of decrease in the voltage command (V) are considerably larger than those during normal pulse width modulation control. Thus, if the carrier frequency $F_{CA}$ has sufficient resolution for normal pulse width modulation control, the resolution may be insufficient for special pulse width modulation control, which may make it impossible to suitably generate switching control signal pulses. A solution to this problem involves increasing the carrier frequency $F_{CA}$ so as to enhance modulation resolution as described above with reference to FIG. 19. FIGS. 28 and 29 illustrate waveform charts when the carrier frequency $F_{CA}$ is twice as high as that in FIGS. 26 and 27.

The waveform charts of FIGS. 28 and 29 are respectively associated with the waveform charts of FIGS. 26 and 27. FIGS. 26 and 27 illustrate waveforms obtained by performing special pulse width modulation control (SP-CPWM, SP-DPWM) involving modulation with the carrier frequency $F_{CA}$ similar to that used in normal pulse width modulation control. FIGS. 28 and 29 illustrate waveforms obtained by performing special pulse width modulation control (SP-CPWM, SP-DPWM) involving modulation with the carrier frequency $F_{CA}$ twice as high as that used in normal pulse width modulation control at a torque and a rotation speed equal to those in FIGS. 26 and 27. Specifically, the waveform charts of FIGS. 28 and 29 illustrate dq-axis currents (Id, Iq), an actual modulation factor (Mi_sys), and three-phase currents when rectangular wave control (1-Pulse) is combined with special continuous pulse width modulation control (SP-CPWM) using the carrier frequency $F_{AC}$, which is twice as high as that in FIGS. 26 and 27, for the first high speed region VRH1 where the speed is equal to that in FIGS. 26 and 27, and when rectangular wave control (1-Pulse) is combined with special discontinuous pulse width modulation control (SP-DPWM) using the carrier frequency $F_{AC}$, which is twice as high as that in FIGS. 26 and 27, for the second high speed region VRH2.

Comparisons between FIGS. 26 and 27 and FIGS. 28 and 29 indicate that the ripples of the frequency "2f" twice as high as the motor electric frequency f are reduced in each of the dq-axis currents (Id, Iq) and the actual modulation factor (Mi_sys) and thus smoothed in FIGS. 28 and 29. This reveals that special pulse width modulation control is preferably performed in the high speed region VRH with a modulation frequency higher than that in pulse width modulation control performed in the low speed region VRL.

In the present embodiment, special pulse width modulation control is performed on the second inverter 12. As previously mentioned, the second switching elements 32 included in the second inverter 12 are smaller in switching loss than the first switching elements 31 included in the first inverter 11. Accordingly, if the carrier frequency $F_{CA}$ is increased, an increase in switching loss would be reduced or prevented. Consequently, providing one of the two inverters 10 by using the switching elements 3 smaller in switching loss than the switching elements 3 included in the other inverter 10 facilitates using special pulse width modulation control as a control method and thus facilitates enhancing the efficiency of the overall system while reducing or preventing an increase in switching loss.

For example, when the carrier frequency $F_{CA}$ for normal pulse width modulation control is high enough for special pulse width modulation control to be suitably performed even at the inflection points of the phases of π and 2π, the carrier frequency $F_{CA}$ naturally does not need to be increased in performing special pulse width modulation control. Accordingly, the use of special pulse width modulation control does not necessarily require the switching elements 3 included in one of the inverters 10 to be smaller in switching loss than the switching elements 3 included in the other inverter 10 as illustrated in FIG. 1. As illustrated in FIGS. 36 and 37, both of the inverters 10 may be provided using the switching elements 3 having similar physical properties.

Figure 30:
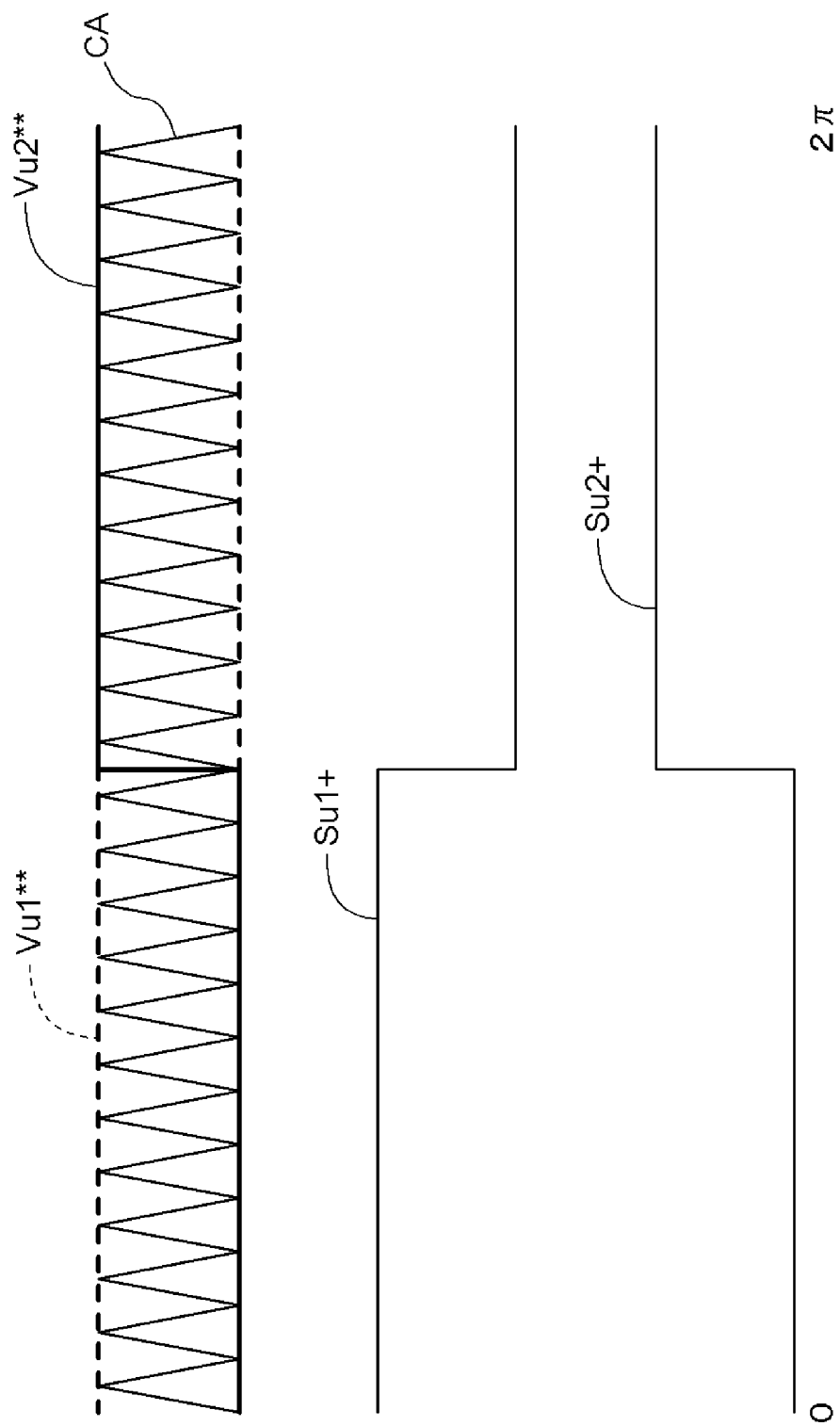
FIG. 30 is a waveform chart illustrating exemplary voltage commands and switching control signals in an ultrahigh speed region.

The waveform chart of FIG. 30 illustrates examples of the first U phase voltage command Vu1, the second U phase voltage command Vu2, the carrier CA, the first U phase upper side switching control signal Su1+, and the second U phase upper side switching control signal Su2+ in the ultrahigh speed region VRSH. In the ultrahigh speed region VRSH, the first inverter 11 and the second inverter 12 are both controlled by rectangular wave control as previously described. When the inverters 10 are controlled by rectangular wave modulation control, no carrier CA is necessary, but the carrier CA is illustrated in FIG. 30 so as to facilitate comparisons with other control methods.

The waveform chart of FIG. 31 illustrates examples of the first U phase voltage command Vu1 (which is a U phase voltage command for the first inverter 11), the second U phase voltage command Vu2 (which is a U phase voltage command for the second inverter 12), the carrier CA, the first U phase upper side switching control signal Su1+, and the second U phase upper side switching control signal Su2+ in the first low speed region VRL1. In the first low speed region VRL1, the second inverter 12 is controlled by continuous pulse width modulation control. As illustrated in FIG. 31, the pulsed second U phase upper side switching control signal Su2+ is generated in accordance with the carrier CA and the second U phase voltage command Vu2**.

Because the first inverter 11 is controlled by active short circuit control, the first U phase voltage command Vu1 is kept at "0", for example, and the first U phase upper side switching control signal Su1+ is always "0". Although not illustrated, the first U phase lower side switching control signal Su1− is always "1". The first inverter 11 is thus controlled such that the upper side switching element 3H (31H) of the U phase arm 3A is placed in an OFF state, and the lower side switching element 3L (31L) of the U phase arm 3A is placed in an ON state. The same goes for the V phase and the W phase. Accordingly, the first inverter 11 is controlled by lower side active short circuit control. Alternatively, no first U phase voltage command Vu1 may be set, and the first U phase switching control signal Su1 may be set at a fixed value.

The waveform chart of FIG. 32 illustrates examples of the first U phase voltage command Vu1, the second U phase voltage command Vu2, the carrier CA, the first U phase upper side switching control signal Su1+, and the second U phase upper side switching control signal Su2+ in the second low speed region VRL2. In the second low speed region VRL2, the first inverter 11 is controlled by active short circuit control as in the first low speed region VRL1. Thus, the first U phase voltage command Vu1 is a fixed value. In the second low speed region VRL2, the second inverter 12 is controlled by discontinuous pulse width modulation control. In a section in which the second U phase voltage command Vu2 is "0" or "1", the first U phase upper side switching control signal Su1+ is a fixed value, so that the switching elements 3 (which are the second switching elements 32 in this case) are kept in an ON state or an OFF state.

Figure 33:
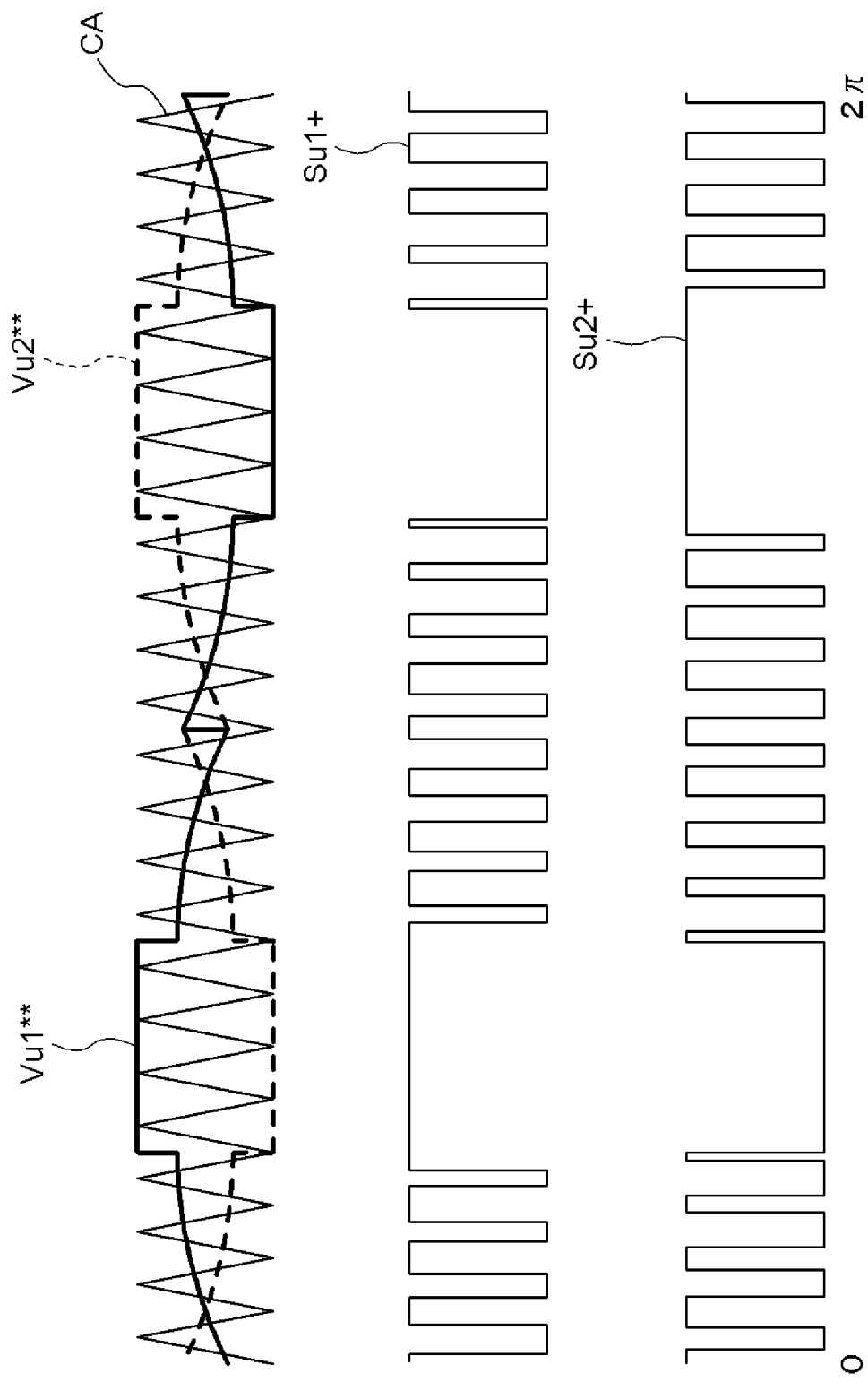
FIG. 33 is a waveform chart illustrating another exemplary voltage commands and switching control signals in an intermediate speed region.

The waveform chart of FIG. 33 illustrates examples of the first U phase voltage command Vu1, the second U phase voltage command Vu2, the carrier CA, the first U phase upper side switching control signal Su1+, and the second U phase upper side switching control signal Su2+ in the intermediate speed region VRM. In the third speed region VR3, the first inverter 11 and the second inverter 12 are both controlled by discontinuous pulse width modulation control as previously mentioned.

As indicated by Table 3 below, in the intermediate speed region VRM, the rotary electric machine control apparatus 1 may control both of the first inverter 11 and the second inverter 12 by mixed pulse width modulation control (MX-PWM) instead of discontinuous pulse width modulation control. Mixed pulse width modulation control is one of control methods to control the inverters 10. Mixed pulse width modulation control is a control method to perform control involving: outputting a plurality of pulses different in pattern during a first period T1 (see FIGS. 33 and 34) corresponding to a ½ electrical angle cycle; and continuing an ineffective state during a second period T2 (see FIGS. 33 and 34) corresponding to the remaining ½ cycle.

32 or 33 may be used. When a continuous pulse width modulation (CPWM) voltage command is used, mixed pulse width modulation control (MX-PWM) may be referred to as "mixed continuous pulse width modulation control (MX-CPWM)". When a discontinuous pulse width modulation (DPWM) voltage command is used, mixed pulse width modulation control (MX-PWM) may be referred to as "mixed continuous pulse width modulation control (MX-DPWM)". Mixed continuous pulse width modulation control (MX-CPWM) will now be described by way of example.

In one example, the first carrier CA1 varies in the range of "0.5<CA1<1", the second carrier CA2 varies in the range of "0<CA2<0.5", and the voltage command (V) is variable in the range of "0≤V≤1". On the basis of comparison between the carrier CA (which includes the first carrier CA1 and the second carrier VA2) and the voltage command (V**), the switching control signal is "1" when the voltage command is equal to or greater than the carrier CA, and the switching control signal is "0" when the voltage command is less than the carrier CA.

Figure 34:
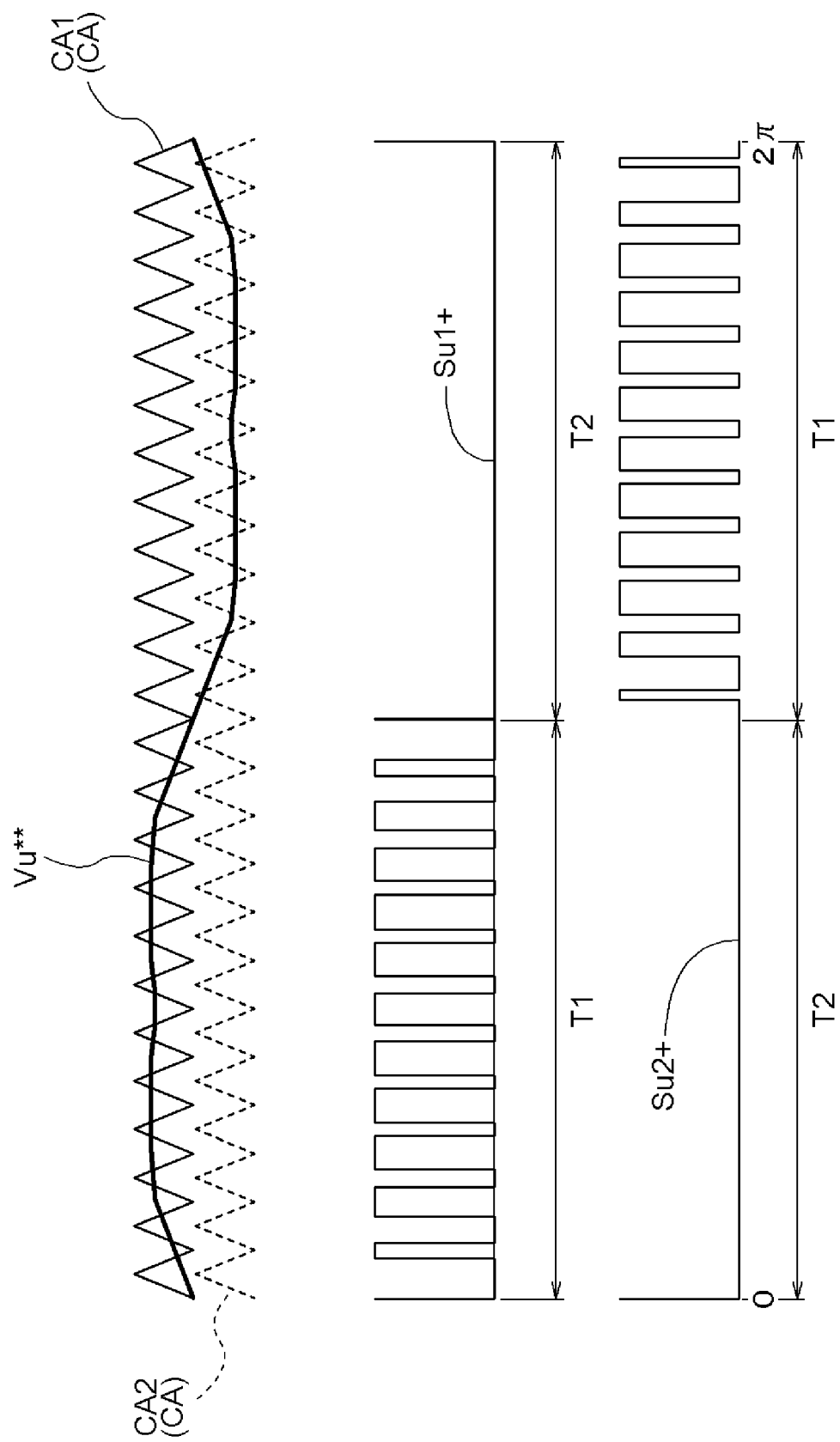
FIG. 34 is a waveform chart illustrating exemplary voltage commands and switching control signals for mixed pulse width modulation control.

As illustrated in FIG. 34, the amplitude of each of the first carrier CA1 and the second carrier CA2 is one-half of an allowable amplitude of the voltage command (V). During typical pulse width modulation (see, for example, FIG. 33), the amplitude of the carrier CA is similar to the allowable amplitude of the voltage command, and the carrier CA during mixed pulse width modulation may thus be referred to as a "half carrier". The use of such a half carrier causes the half carrier to intersect with the voltage command (V) during the first period T1 corresponding to a ½ electrical angle cycle, resulting in output of a plurality of different-pattern pulses in the form of the switching control signal. During the second period T2 corresponding to the remaining ½ cycle, the half carrier does not intersect with the

TABLE 3

| R | Mi_sys | INV1 | Mi_inv1 | INV2 | Mi_inv2 |
|---|---|---|---|---|---|
| VRL1 | M < a | ASC | M = 0 | CPWM | M < 2a |
| VRL2 | a ≤ M < X | ASC | M = 0 | DPWM | 2a ≤ M < 2x |
| VRM | X ≤ M < b | MX-PWM | X ≤ M < b | MX-PWM | X ≤ M < b |
| VRH1 | b ≤ M < c | 1-Pulse | M = 0.78 | SP-CPWM | 0.78-b ≤ M < 0.78-c |
| VRH2 | c ≤ M < 0.78 | 1-Pulse | M = 0.78 | SP-DPWM | 0.78-c ≤ M < 0.78 |
| VRSH | M = 0.78 | 1-Pulse | M = 0.78 | 1-Pulse | M = 0.78 |

Mixed pulse width modulation control involves placing the switching control signals in an ineffective state during the second period T2. This reduces loss of the inverters 10 and reduces harmonic current caused by switching, resulting in a decrease in loss (or iron loss) of the rotary electric machine 80. Consequently, performing mixed pulse width modulation control enables a reduction in system loss.

FIG. 34 illustrates examples of: a first carrier CA1, which is the carrier CA for the first inverter 11; a second carrier CA2, which is the carrier CA for the second inverter 12; a common U phase voltage command Vu, which is a U phase voltage command common to the first inverter 11 and the second inverter 12; the first U phase upper side switching control signal Su1+; and the second U phase upper side switching control signal Su2+. FIG. 34 illustrates a mode in which a continuous pulse width modulation (or space vector pulse width modulation) voltage command such as one illustrated in FIG. 31 is used as the common U phase voltage command Vu. Alternatively, a discontinuous pulse width modulation voltage command such as one illustrated in FIG.

voltage command (V**), resulting in output of the switching control signal such that an ineffective state continues.

Although not illustrated, a partially effective pulse may be output in the form of the switching control signal also during the second period T2 depending on the waveform of the voltage command. In the case of using a discontinuous pulse width modulation voltage command (V), for example, a pulse in an effective state may be output also during the second period T2 in the vicinity of the center of the amplitude of the voltage command (V) or in the vicinity of an inflection point of the voltage command (V). An ineffective state, however, continues during the second period T2 except the vicinity of the amplitude center of the voltage command (V). Suppose that the second period T2 (which is a period shorter than a ½ cycle) is set to be a period during which the switching control signal is in an ineffective state, and the first period T1 (which is a period equal to or longer than a ½ cycle) is set to be a period other than the second period T2 during one cycle. In this case, mixed pulse width modulation control may be defined as follows. The term "mixed pulse width modulation control" may refer to control that involves: outputting a plurality of different-pattern pulses during the first period T1 equal to or longer than a ½ electrical angle cycle; and continuing an ineffective state during the second period T2 corresponding to the remaining time of one electrical angle cycle.

Figure 35:
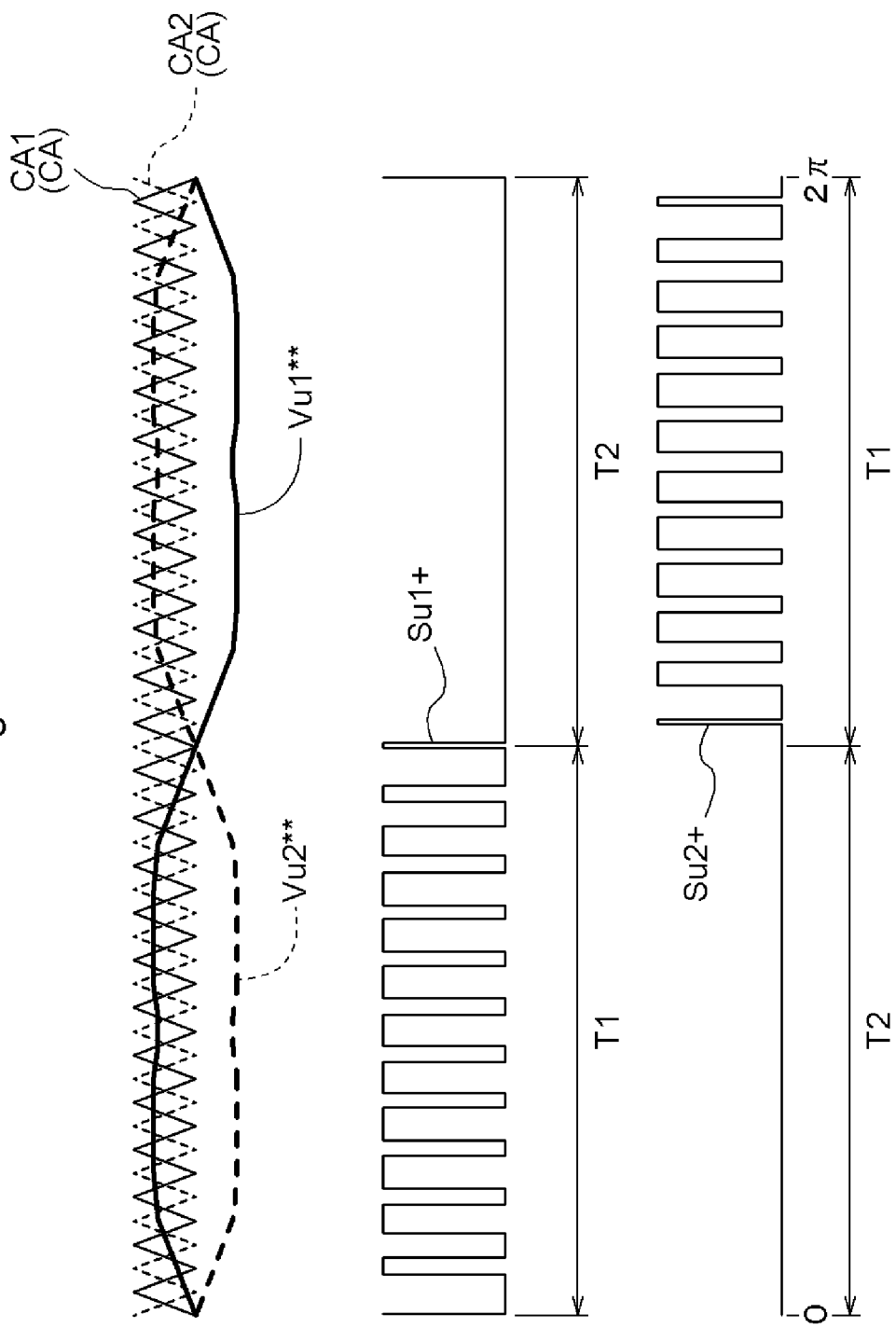
FIG. 35 is a waveform chart illustrating another exemplary voltage commands and switching control signals for mixed pulse width modulation control.

FIG. 35 illustrates mixed pulse width modulation control (or mixed continuous pulse width modulation control) different in mode from that illustrated in FIG. 34. Switching control signals generated in the mode illustrated in FIG. 35 are similar to those generated in the mode illustrated in FIG. 34. FIG. 35 illustrates examples of: the first cater CA1, which is the carrier CA for the first inverter 11; the second carrier CA2, which is the carrier CA for the second inverter 12; the first U phase voltage command Vu1, which is a U phase voltage command for the first inverter 11; the second U phase voltage command Vu2, which is a U phase voltage command for the second inverter 12; the first U phase upper side switching control signal Su1+; and the second U phase upper side switching control signal Su2+. In one example, the first carrier CA1 and the second carrier CA2 vary in the range of "0.5<CA1<1", and the voltage command (V) is variable in the range of "0≤V≤1". The first carrier CA1 is different in phase from the second carrier CA2 by 180 degrees (π). The first U phase voltage command Vu1 is also different in phase from the second U phase voltage command Vu2 by 180 degrees (π).

As illustrated in FIG. 35, the amplitude of each of the first carrier CA1 and the second carrier CA2 is one-half of an allowable amplitude of the voltage command (V). Accordingly, the carrier CA in the mode illustrated in FIG. 35 is also a half carrier. The use of such a half carrier causes the half carrier to intersect with the voltage command (V) during the first period T1 corresponding to a ½ electrical angle cycle (or equal to or longer than the ½ cycle), resulting in output of a plurality of different-pattern pulses in the form of the switching control signal. During the second period T2 corresponding the remaining period of the cycle, the half carrier does not intersect with the voltage command (V**), resulting in output of the switching control signal such that an ineffective state continues.

The mode illustrated in FIG. 34 is a method for performing modulation using the two half carriers and the voltage command (V) serving as a single common reference. This method may thus be referred to as a "double half carrier/single reference method". The mode illustrated in FIG. 35 is a method for performing modulation using the two half carriers and the two voltage commands (V). This method may thus be referred to as a "double half carrier/double reference method".

As illustrated in FIGS. 8 and 9, FIG. 30, and FIGS. 33 to 35, the first U phase voltage command Vu1 differs in phase from the second U phase voltage command Vu2 by about 180 degrees when switching control is performed on both of the first inverter 11 and the second inverter 12. In one example, a U phase voltage has a maximum amplitude of "(4/3) E", and a line voltage has a maximum amplitude of "2E" (see also the vector diagrams of FIGS. 3 and 4). The first direct-current power supply 61 and the second direct-current power supply 62 are independent of each other. The first direct-current voltage E1 of the first direct-current power supply 61 and the second direct-current voltage E2 of the second direct-current power supply 62 may be different values. To be precise, the maximum amplitude of the U phase voltage is, for example, "((⅔) E1)+(⅔) E2" but is described as "E1=E2=E" in this specification for the sake of facilitating understanding.

In the low speed region VRL where the modulation factor and the rotation speed are relatively low and electric power is relatively low, all of electric power is supplied from one of the inverters 10 as mentioned above. In this case, the voltage command (V) for active short circuit control is provided to one of the inverters 10, and the normal voltage command (V) is provided to the other inverter 10. In the intermediate speed region VRM, the high speed region VRH, and the ultrahigh speed region VRSH where the modulation factor and the rotation speed are higher than those in the low speed region VRL and electric power is higher than that in the low speed region VRL, similar levels of electric power are supplied from the two inverters 10. In this case, equal voltage commands (V**) different in phase by 180 degrees (π) are provided to both of the inverters 10.

Performing switching control on the inverters 10 may cause a pulsating component superimposed on a fundamental wave of an alternating current to produce audio frequency band noise. Controlling the two inverters 10 by different control methods may cause pulsations responsive to the control methods, which may result in an increase in audio frequency band noise. In particular, when the rotation speed of the rotary electric machine 80 is low, a frequency of a pulsating component (or a side band frequency thereof) is highly likely to be included in an audio frequency band. A control method for the rotary electric machine 80 or control methods for the inverters 10 is/are preferably suitably set in accordance with operating conditions such that the rotary electric machine 80 is operable not only with high system efficiency but also with reduced audio noise.

In one example, the rotary electric machine control apparatus 1 may include control modes for the rotary electric machine 80, such as a loss reduction prioritized mode and a noise reduction prioritized mode, in such a manner as to enable switching between the modes. In the low speed region VRL, the rotary electric machine control apparatus 1 in the noise reduction prioritized mode controls both of the inverters 10, i.e., both of the first inverter 11 and the second inverter 12, by pulse width modulation. In the first low speed region VRL1, the rotary electric machine control apparatus 1 in the noise reduction prioritized mode may control both of the inverters 10, i.e., both of the first inverter 11 and the second inverter 12, by continuous pulse width modulation control. In the second low speed region VRL2, the rotary electric machine control apparatus 1 in the noise reduction prioritized mode may control both of the inverters 10, i.e., both of the first inverter 11 and the second inverter 12, by discontinuous pulse width modulation control.

In the loss reduction prioritized mode, only one of the inverters 10 is driven in the low speed region VRL where the rotation speed of the rotary electric machine 80 is relatively low, so that the two inverters 10 do not produce noise of different frequency bands. The loss reduction prioritized mode, however, increases an output from one of the inverters 10, which is driven, and thus increases the energy of noise. In the low speed region VRL, sounds caused by travel of the vehicle (e.g., travelling sounds, such as sounds caused by contact between tires and a road surface) are low. Thus, when noise output from one of the inverters 10, which is driven, is audio frequency band noise, the noise may be easily audible to the user.

For example, when the vehicle starts or when the vehicle decelerates to a stop, the noise reduction prioritized mode is preferably selected in consideration of the fact that audio frequency band noise is easily audible to the user. During steady operation in which the vehicle travels steadily, the loss reduction prioritized mode is preferably selected. These modes may each be selected in response to an operation performed by the user (e.g., an operation performed on a setting switch, which includes an input through, for example, a touch screen).

In the noise reduction prioritized mode, the first inverter 11 and the second inverter 12 are controlled by the same control method in the low speed region VRL where the rotation speed of the rotary electric machine 80 is relatively low. Currents passed through the stator coils 8 by the two inverters 10 differ in phase by about 180 degrees. When the two inverters 10 are controlled by the same control method, the phases of currents, including pulsating components, differ by about 180 degrees. Accordingly, the two inverters 10 are able to mutually cancel at least portions of pulsating components, resulting in a reduction in audio frequency band noise.

Figure 38:
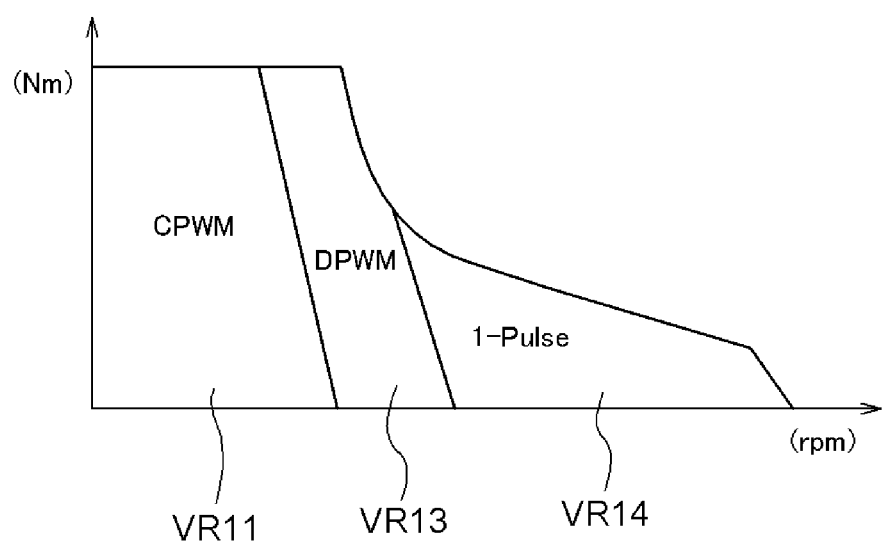
FIG. 38 is a graph illustrating exemplary control regions for a rotary electric machine in a single-inverter system.

By way of comparative example, FIG. 38 illustrates exemplary control regions of a rotary electric machine in a single-inverter system in which three-phase stator coils 8 are connected at a neutral point. In one example, an inverter in this system is controlled by continuous pulse width modulation control in a first region VR11, controlled by discontinuous pulse width modulation control in a second region VR13, and controlled by rectangular wave control in a third region VR14 as indicated by Table 4 below.

TABLE 4

| R | Mi_sys | INV1 | Mi_inv |
|---|---|---|---|
| VR11 | M < Y, where Y > X | CPWM | M < Y, where Y > X |
| VR13 | Y ≤ M < 0.78 | DPWM | Y ≤ M < 0.78 |
| VR14 | M = 0.78 | 1-Pulse | M = 0.78 |

A modulation factor "Y" is greater than the modulation factor "X" illustrated in Table 2 and Table 3. The modulation factor "Y" is set to be between about 0.5 and about 0.6 in accordance with a theoretical upper limit (which is approximately 0.707) to the modulation factor for continuous pulse width modulation (or space vector pulse width modulation) and in consideration of a dead time.

As described above, the present embodiment involves setting the intermediate speed region VRM at the low speed side of a region equivalent to the second region VR13 and setting the high speed region VRH at the high speed side of the region equivalent to the second region VR13, thus performing characteristic special pulse width modulation control. Performing such special pulse width modulation control reduces loss of the inverters 10 in an operating region that requires a high output and also reduces harmonic current caused by switching, resulting in a decrease in loss (or iron loss) of the rotary electric machine 80. Consequently, performing such special pulse width modulation control enables a reduction in system loss. The present embodiment also involves setting the low speed region VRL in a region equivalent to the first region VR11, thus enabling a reduction in system loss also in an operating region that requires a low output. In the low speed region VR1, the loss reduction prioritized mode and the noise reduction prioritized mode may be switched when deemed appropriate as mentioned above. The loss reduction prioritized mode is able to reduce loss in overall system. The noise reduction prioritized mode enables both of loss reduction and noise reduction.

SUMMARY OF EMBODIMENT

A brief summary of the rotary electric machine control apparatus (1) described above will be given below.

One aspect of the present invention provides a rotary electric machine control apparatus (1) to control, through a first inverter (11) and a second inverter (12), driving of a rotary electric machine (80) including multiphase open windings (8) independent of each other. The first inverter (11) is connected to first ends of the multiphase open windings (8) so as to perform conversion of electric power between a direct current and a multiphase alternating current. The second inverter (12) is connected to second ends of the multiphase open windings (8) so as to perform conversion of electric power between a direct current and a multiphase alternating current. The rotary electric machine control apparatus (1) is able to control the first inverter (11) and the second inverter (12) by different control methods that produce different switching patterns and are independent of each other. The control methods include: pulse width modulation control involving outputting a plurality of pulses different in pattern in each electrical angle cycle; and rectangular wave control involving outputting a single pulse in each electrical angle cycle. The rotary electric machine control apparatus (1) performs target control involving: controlling a first one of the inverters (10), which is selected from the first inverter (11) and the second inverter (12), by the rectangular wave control; and controlling a second one of the inverters (10) by special pulse width modulation control that is one type of the pulse width modulation control. The special pulse width modulation control is the control method to produce a switching pattern that is based on a difference between a switching pattern resulting from the pulse width modulation control and a switching pattern resulting from the rectangular wave control when a target voltage is to be generated in the open windings (8).

In this aspect, rectangular wave control is performed on the first one of the inverters (10), which is selected from the two inverters (10). This enables a reduction in the number of times switching is performed by the first one of the inverters (10), leading to a reduction in switching loss. The second one of the inverters (10), on which no rectangular wave control is to be performed, is controlled by special pulse width modulation control. Special pulse width modulation control involves controlling the second one of the inverters (10) in accordance with a switching pattern that is based on a difference between a switching pattern resulting from pulse width modulation control and a switching pattern resulting from rectangular wave control when a target voltage is to be generated in the open windings (8). Accordingly, if the first one of the inverters (10) is controlled by rectangular wave control, the rotary electric machine (80) would be driven smoothly by performing pulse width modulation control on the second one of the inverters concurrently. This typically enables a reduction in system loss and smooth control of the rotary electric machine (80) in a relatively high rotation operating region for which rectangular wave control is to be used. Consequently, the rotary electric machine control apparatus (1) according to this aspect is able to suitably control the two inverters connected to the associated ends of the open windings.

The special pulse width modulation control is preferably the control method that involves: determining a rectangular wave voltage command that is a voltage command to produce a switching pattern of the first one of the inverters (10) that is controlled by the rectangular wave control when the target voltage is to be generated in the open windings (8); determining a pulse width modulation voltage command that is a voltage command to produce a switching pattern of the second one of the inverters (10) that is controlled by the pulse width modulation control when the target voltage is to be generated, the pulse width modulation voltage command being different in phase from the rectangular wave voltage command by 180 degrees; determining a system voltage command that is a difference between the rectangular wave voltage command and the pulse width modulation voltage command and is a voltage command for an entirety of the two inverters (10); determining a special pulse width modulation voltage command that is a difference between the system voltage command and the rectangular wave voltage command, with amplitude centers thereof corresponding to each other; and producing a switching pattern in accordance with the special pulse width modulation voltage command.

This aspect enables optimization of the voltage command for pulse width modulation control when the rotary electric machine (80) is driven smoothly by combining rectangular wave control with pulse width modulation control. Experiments and simulations conducted by the inventors have confirmed that simply combining rectangular wave control with pulse width modulation control causes ripples in, for example, currents flowing through the open windings (8). The experiments and simulations, however, have also confirmed that special pulse width modulation control reduces or prevents such ripples. A voltage command to produce a switching pattern for such special pulse width modulation control is a difference between a system voltage command, which is an overall voltage command when rectangular wave control is combined with pulse width modulation control, and a rectangular wave voltage command for rectangular wave control. Accordingly, the rotary electric machine control apparatus (1) is also able to reduce the ripples mentioned above while generating the target voltage in the open windings (8) as in the case where rectangular wave control is combined with pulse width modulation control.

Control regions (R) set for the rotary electric machine (80) preferably include a low speed region (VRL) and a high speed region (VRH) where a rotation speed of the rotary electric machine (80) is higher than that in the low speed region (VRL) at an equal torque (T). The rotary electric machine control apparatus (1) preferably performs the target control in the high speed region (VRH).

In the high speed region (VRH) described above, the inverters (10) are usually controlled by a control method involving performing pulse width modulation in a modulation mode with a high modulation factor. The target control involves performing rectangular wave control on the first one of the inverters (10) selected from the two inverters (10), thus enabling a reduction in switching loss caused by the first one of the inverters (10). This aspect is able to enhance system efficiency in the high speed region (VRH) that requires the inverters (10) to produce a relatively high output.

The first inverter (11) and the second inverter (12) preferably each include arms (3A) each associated with one of alternating-current phases. The arms (3A) preferably each include a series circuit of an upper side switching element (3H) and a lower side switching element (3L). The pulse width modulation control used as the control method preferably includes: continuous pulse width modulation control to continuously perform pulse width modulation on all of the multiphase arms (3A); and discontinuous pulse width modulation control to perform pulse width modulation on at least one of the multiphase arms (3A) such that a period during which the switching elements (3) are kept in an ON state or an OFF state is included. A first high speed region (VRH1) and a second high speed region (VRH2) are preferably set within the high speed region (VRH). The second high speed region (VRH2) is preferably a region where the rotation speed of the rotary electric machine (80) is higher than that in the first high speed region (VRH1) at the equal torque (T). The target control to be performed in the first high speed region (VRH1) by the rotary electric machine control apparatus (1) is preferably first target control involving: controlling the first one of the inverters (10), which is selected from the first inverter (11) and the second inverter (12), by the rectangular wave control; and controlling the second one of the inverters (12) by special continuous pulse width modulation that is the special pulse width modulation control based on the continuous pulse width modulation control. The target control to be performed in the second high speed region (VRH2) by the rotary electric machine control apparatus (1) is preferably second target control involving: controlling the first one of the inverters (10), which is selected from the first inverter (11) and the second inverter (12), by the rectangular wave control; and controlling the second one of the inverters (10) by special discontinuous pulse width modulation that is the special pulse width modulation control based on the discontinuous pulse width modulation control.

A maximum modulation factor for discontinuous pulse width modulation control is larger than a maximum modulation factor for continuous pulse width modulation control. The second high speed region (VRH2) is preferably the control region (R) where the rotation speed of the rotary electric machine (80) is higher than that in the first high speed region (VRH1) at the equal torque (T). In terms of system efficiency, modulation is preferably performed in the second high speed region (VRH2) using a modulation factor higher than that used in the first high speed region (VRH1). Performing special continuous pulse width modulation control based on continuous pulse width modulation in the first high speed region (VRH1) and performing special continuous pulse width modulation control based on discontinuous pulse width modulation in the second high speed region (VRH2) makes it possible to suitably drive the rotary electric machine (80) across the entire high speed region (VRH).

Control regions (R) set for the rotary electric machine (80) preferably include a low speed region (VRL) and a high speed region (VRH) where a rotation speed of the rotary electric machine (80) is higher than that in the low speed region (VRL) at an equal torque (T). In high speed region (VRH), when at least one of the first inverter and the second inverter is controlled by the pulse width modulation control in the low speed region where the target control is performed, the rotary electric machine control apparatus (1) preferably performs the special pulse width modulation control in the high speed region (VRH) by using a modulation frequency ($F_{CA}$) higher than a modulation frequency ($F_{CA}$) used in the pulse width modulation control.

Studies conducted by the inventors reveal that a voltage command for special pulse width modulation control has a large inflection point at which the value of the voltage command increases or decreases abruptly for each half of an electrical angle cycle. Experiments and simulations conducted by the inventors have confirmed that in a phase adjacent to the inflection point, ripples occur in, for example, currents flowing through the open windings (8). This is because the modulation frequency ($F_{CA}$) does not have resolution that is able to respond to an abrupt increase or decrease in the value of the voltage command in the phase adjacent to the inflection point. In this aspect, special pulse width modulation control is performed using the modulation frequency ($F_{CA}$) higher than the modulation frequency ($F_{CA}$)

used in pulse width modulation control. This accordingly enables the modulation frequency ($F_{CA}$) to respond to an abrupt increase or decrease in the value of the voltage command in the phase adjacent to the inflection point, making it possible to reduce the ripples described above.

The control regions (R) preferably further include an ultrahigh speed region (VRSH) where the rotation speed of the rotary electric machine (80) is higher than that in the high speed region (VRH) at the equal torque (T). In the ultrahigh speed region, the rotary electric machine control apparatus (1) preferably controls both of the inverters (10), which are the first inverter (11) and the second inverter (12), by the rectangular wave control.

In the high speed region (VRH), the first one of the inverters (10) is controlled by rectangular wave control, and the second one of the inverters (10) is controlled by special pulse width modulation. Changing the control method for the second one of the inverters (10) to rectangular wave control makes it possible to smoothly change the control method from target control for the high speed region (VRH) to rectangular wave control for the ultrahigh speed region (VRSH). Consequently, this aspect enables the rotary electric machine 80 to be suitably driven across the high speed region VRH and the ultrahigh speed region VRSH.

The first inverter (11) and the second inverter (12) preferably each include arms (3A) each associated with one of alternating-current phases. The arms (3A) preferably each include a series circuit of an upper side switching element (3H) and a lower side switching element (3L). The control methods preferably further include active short circuit control involving causing the upper side switching elements (3H) of all of the multiphase arms (3A) to enter an ON state or causing the lower side switching elements (3L) of all of the multiphase arms (3A) to enter an ON state. The rotary electric machine control apparatus (1) preferably performs target low speed region control in the low speed region (VRL). The target low speed region control preferably involves: controlling the first one of the inverters (10), which is selected from the first inverter (10) and the second inverter (12), by the active short circuit control; and controlling the second one of the inverters (10) by the pulse width modulation control.

Performing the target low speed region control drives the rotary electric machine (80) by substantially only one of the inverters (10) selected from the two inverters (10). Because one of the inverters (10) performs no switching operation, this aspect makes it possible to drive the rotary electric machine (80) while reducing or preventing loss in overall system.

The first inverter (11) and the second inverter (12) preferably each include arms (3A) each associated with one of alternating-current phases. The arms (3A) preferably each include a series circuit of an upper side switching element (3H) and a lower side switching element (3L). The pulse width modulation control used as the control method preferably includes: continuous pulse width modulation control to continuously perform pulse width modulation on all of the multiphase arms (3A); and discontinuous pulse width modulation control to perform pulse width modulation on at least one of the multiphase arms (3A) such that a period during which the switching elements (3) are kept in an ON state or an OFF state is included. A first low speed region (VRL1) and a second low speed region (VRL2) are preferably set within the low speed region (VRL). The second low speed region (VRL2) is preferably a region where the rotation speed of the rotary electric machine (80) is higher than that in the first low speed region (VRL1) at the equal torque (T).

The target low speed region control to be performed in the first low speed region (VRL1) by the rotary electric machine control apparatus (1) is preferably first target low speed region control involving: controlling the first one of the inverters (10), which is selected from the first inverter (11) and the second inverter (12), by the active short circuit control; and controlling the second one of the inverters (10) by the continuous pulse width modulation control. The target low speed region control to be performed in the second low speed region (VRL2) by the rotary electric machine control apparatus (1) is preferably second target low speed region control involving: controlling the first one of the inverters (10), which is selected from the first inverter (11) and the second inverter (12), by the active short circuit control; and controlling the second one of the inverters (10) by the discontinuous pulse width modulation control.

A maximum modulation factor for discontinuous pulse width modulation control is larger than a maximum modulation factor for continuous pulse width modulation control. The second low speed region (VRL2) is preferably the control region (R) where the rotation speed of the rotary electric machine (80) is higher than that in the first low speed region (VRL1) at the equal torque (T). In terms of system efficiency, modulation is preferably performed in the second low speed region (VRL2) using a modulation factor higher than that used in the first low speed region (VRL1). Performing the first target low speed region control using continuous pulse width modulation control in the first low speed region (VRL1) and performing the second target low speed region control using discontinuous pulse width modulation in the second low speed region (VRL2) makes it possible to suitably drive the rotary electric machine (80) across the entire low speed region (VRL).

When the target low speed region control involving controlling the first one of the inverters (10), which is selected from the first inverter (10) and the second inverter (12), by the active short circuit control and controlling the second one of the inverters (10) by the pulse width modulation control is performed in the low speed region (VRL), the rotary electric machine control apparatus (1) preferably interchanges, in accordance with a predetermined condition, the control method for controlling the first inverter (11) and the control method for controlling the second inverter (12).

Interchanging the control methods prevents either one of the first inverter (11) and the second inverter (12) from wearing out. When the first inverter (11) and the second inverter (12) are connected to direct-current power supplies (6) independent of each other, interchanging the control methods makes it possible to prevent an increase in the amount of electric power consumption in either one of a direct-current power supply (61) connected with the first inverter (11) and a direct-current power supply (62) connected with the second inverter (12). Examples of the predetermined condition preferably include a certain period of time and the amount of electric power consumed by the direct-current power supplies (6).

The first inverter (11) and the second inverter (12) preferably each include arms (3A) each associated with one of alternating-current phases. The arms (3A) preferably each include a series circuit of an upper side switching element (3H) and a lower side switching element (3L). The pulse width modulation control used as the control method preferably includes discontinuous pulse width modulation control to perform pulse width modulation on at least one of the multiphase arms (3A) such that a period during which the switching elements (3) are kept in an ON state or an OFF state is included. The control regions (R) preferably further include an intermediate speed region (VRM) where the rotation speed of the rotary electric machine (80) is higher than that in the low speed region (VRL) and lower than that in the high speed region (VRH) at the equal torque (T). In the intermediate speed region (VRM), the rotary electric machine control apparatus (1) preferably controls both of the inverters (10), which are the first inverter (11) and the second inverter (12), by the discontinuous pulse width modulation control.

In this aspect, both of the inverters (10) are controlled by discontinuous pulse width modulation control in the control region (R) located between: the low speed region (VRL) where low speed target control is performed using active short circuit control and pulse width modulation control; and the high speed region (VRH) where target control is performed using rectangular wave control and special pulse width modulation control. This makes it possible to smoothly drive the rotary electric machine (80) across a wide control region including the low speed region (VRL), the intermediate speed region (VRM), and the high speed region (VRH).

The control methods preferably include mixed pulse width modulation control to perform control involving: outputting a plurality of pulses different in pattern during a first period (T1) corresponding to a ½ electrical angle cycle; and continuing an ineffective state during a second period (T2) corresponding to a remaining ½ cycle. In the intermediate speed region (VRM), the rotary electric machine control apparatus (1) preferably controls both of the first inverter (11) and the second inverter (12) by the mixed pulse width modulation control instead of the discontinuous pulse width modulation control.

The mixed pulse width modulation control is a control method combining a pulse width modulation period and a non-modulation (or fixed state) period each corresponding to about half an electrical angle cycle. Accordingly, each inverter (10) performs no switching operation for about a ½ period of its driven time, resulting in a reduction in switching loss and a reduction in system loss.

A boundary or boundaries between the control regions (R) is/are preferably defined in accordance with at least one of: a rotation speed of the rotary electric machine (80) responsive to a torque of the rotary electric machine (80); and a ratio of an effective value of a line voltage of a multiphase alternating-current voltage to a direct-current voltage.

Operating conditions of the rotary electric machine (80) are often defined based on the relationship between its rotation speed and torque. Changing the control methods for controlling the first inverter (11) and the second inverter (12) in accordance with the rotation speed, which is one of parameters, enables the rotary electric machine control apparatus (1) to control driving of the rotary electric machine (80) at high efficiency in accordance with the operating conditions of the rotary electric machine (80). For example, when the rotary electric machine (80) is required to produce a high output (e.g., a high rotation speed and/or a high torque), voltage type inverters satisfy the requirement by increasing a direct-current voltage and/or increasing the ratio of conversion from a direct-current voltage into an alternating-current voltage. When a direct-current voltage is constant, the requirement is satisfiable by increasing the ratio of conversion from a direct-current voltage into an alternating-current voltage. This ratio may be the ratio of an effective value of three-phase alternating-current electric power to direct-current electric power (which is equivalent to the ratio of an effective value of a line voltage of a three-phase alternating-current voltage to a direct-current voltage in the case of using voltage type inverters). The control methods for controlling the inverters (10) include various methods, such as a method in which the ratio is low and a method in which the ratio is high. The rotary electric machine control apparatus (1) is able to control driving of the rotary electric machine (80) at high efficiency in accordance with the operating conditions of the rotary electric machine (80) by changing the control methods in accordance with the ratio of an effective value of a line voltage of a multiphase alternating-current voltage to a direct-current voltage, which is determined in accordance with requirements for the rotary electric machine (80).

The first one of the inverters (10), which is selected from the first inverter (11) and the second inverter (12), preferably includes a first switching element (31). The second one of the inverters (10) preferably includes a second switching element (32) smaller in switching loss than the first switching element (31) during transition between an OFF state and an ON state. The inverter (10) to be controlled by the special pulse width modulation control preferably includes the second switching element (32).

The number of times switching is performed by the inverter (10) controlled by rectangular wave control is fewer than the number of times switching is performed by the inverter (10) controlled by special pulse width modulation control. This aspect involves causing the inverter (10) including the second switching element (32) relatively smaller in switching loss to perform switching more often, thus making it possible to reduce or prevent loss in overall system in the high speed region (VRH) for which a high output is required.

When the rotary electric machine control apparatus (1) performs target low speed region control involving: controlling the first one of the inverters (10), which is selected from the first inverter (10) and the second inverter (12), by the active short circuit control; and controlling the second one of the inverters (10) by the pulse width modulation control, the first one of the inverters (10), which is selected from the first inverter (11) and the second inverter (12), preferably includes the first switching element (31), the second one of the inverters (10) preferably includes the second switching element (32) smaller in switching loss than the first switching element (31) during transition between an OFF state and an ON state, and the inverter to be controlled by the pulse width modulation control preferably includes the second switching element.

In the low speed region VRL, the rotary electric machine control apparatus 1 performs target low speed region control involving: controlling the first one of the inverters 10 (i.e., the first inverter 11 in this case), which is selected from the first inverter 11 and the second inverter 12, by active short circuit control; and controlling the second one of the inverters 10 (i.e., the second inverter 12 in this case) by pulse width modulation control. The rotary electric machine 80 will thus be driven by substantially only one of the inverters 10 (which is, for example, the second inverter 12) selected from the two inverters 10. Because the first one of the inverters 10 performs no switching operation, the rotary electric machine control apparatus 1 is able to drive the rotary electric machine 80 while reducing or preventing loss in overall system.

The first switching element (31) is preferably a Si-IGBT or a Si-MOSFET. The second switching element (32) is preferably a SiC-MOSFET or a GaN-MOSFET.

For example, providing a high-withstand-voltage power device using silicon carbide (SiC) makes it possible to form a drift layer high in impurity concentration and thin in thickness because silicon carbide (SiC) is higher in breakdown field strength than silicon (Si). Most of resistance components of the high-withstand-voltage power device will be resistance of the drift layer. Thus, a SiC device is lower in per-unit-area ON resistance than a Si device. In other words, a SiC device is allowed to be smaller in switching loss than a Si device. The same goes for a device made of gallium nitride (GaN). Accordingly, when the first switching element (31) is a Si device, using a SiC device or a GaN device as the second switching element (32) makes it possible to provide the inverter (10) including the second switching element (32) relatively smaller in switching loss than the first switching element (31).

DESCRIPTION OF THE REFERENCE NUMERALS 1 rotary electric machine control apparatus
3 switching element
3A arm
3H upper side switching element
3L lower side switching element
8 stator coil (open winding) inverter
11 first inverter
12 second inverter
80 rotary electric machine
R control region
T torque
T1 first period
T2 second period
VRH high speed region
VRH1 first high speed region
VRH2 second high speed region
VRL low speed region
VRL1 first low speed region
VRL2 second low speed region
VRM intermediate speed region
VRSH ultrahigh speed region

The invention claimed is:

1. A rotary electric machine control apparatus to control, through a first inverter and a second inverter, driving of a rotary electric machine including multiphase open windings independent of each other, wherein
the first inverter is connected to first ends of the multiphase open windings so as to perform conversion of electric power between a direct current and a multiphase alternating current,
the second inverter is connected to second ends of the multiphase open windings so as to perform conversion of electric power between a direct current and a multiphase alternating current,
the rotary electric machine control apparatus is able to control the first inverter and the second inverter by different control methods that produce different switching patterns and are independent of each other,
the control methods include
pulse width modulation control involving outputting a plurality of pulses different in pattern in each electrical angle cycle, and
rectangular wave control involving outputting a single pulse in each electrical angle cycle,
the rotary electric machine control apparatus performs target control involving
controlling a first one of the inverters, which is selected from the first inverter and the second inverter, by the rectangular wave control, and
controlling a second one of the inverters by special pulse width modulation control that is one type of the pulse width modulation control, and
the special pulse width modulation control is the control method to produce a switching pattern that is based on a difference between a switching pattern resulting from the pulse width modulation control and a switching pattern resulting from the rectangular wave control when a target voltage is to be generated in the open windings.

2. The rotary electric machine control apparatus according to claim 1, wherein
the special pulse width modulation control is the control method that involves
determining a rectangular wave voltage command that is a voltage command to produce a switching pattern of the first one of the inverters that is controlled by the rectangular wave control when the target voltage is to be generated in the open windings,
determining a pulse width modulation voltage command that is a voltage command to produce a switching pattern of the second one of the inverters that is controlled by the pulse width modulation control when the target voltage is to be generated, the pulse width modulation voltage command being different in phase from the rectangular wave voltage command by 180 degrees,
determining a system voltage command that is a difference between the rectangular wave voltage command and the pulse width modulation voltage command and is a voltage command for an entirety of the two inverters,
determining a special pulse width modulation voltage command that is a difference between the system voltage command and the rectangular wave voltage command, with amplitude centers thereof corresponding to each other, and
producing a switching pattern in accordance with the special pulse width modulation voltage command.

3. The rotary electric machine control apparatus according to claim 1, wherein
control regions set for the rotary electric machine include
a low speed region, and
a high speed region where a rotation speed of the rotary electric machine is higher than that in the low speed region at an equal torque, and
the rotary electric machine control apparatus performs the target control in the high speed region.

4. The rotary electric machine control apparatus according to claim 3, wherein
the first inverter and the second inverter each include arms each associated with one of alternating-current phases, and the arms each include a series circuit of an upper side switching element and a lower side switching element,
the pulse width modulation control used as the control method includes
continuous pulse width modulation control to continuously perform pulse width modulation on all of the multiphase arms, and
discontinuous pulse width modulation control to perform pulse width modulation on at least one of the multiphase arms such that a period during which the switching elements are kept in an ON state or an OFF state is included,
a first high speed region and a second high speed region are set within the high speed region, the second high speed region being a region where the rotation speed of the rotary electric machine is higher than that in the first high speed region at the equal torque, the target control to be performed in the first high speed region is first target control involving controlling the first one of the inverters, which is selected from the first inverter and the second inverter, by the rectangular wave control, and controlling the second one of the inverters by special continuous pulse width modulation that is the special pulse width modulation control based on the continuous pulse width modulation control, and the target control to be performed in the second high speed region is second target control involving controlling the first one of the inverters, which is selected from the first inverter and the second inverter, by the rectangular wave control, and controlling the second one of the inverters by special discontinuous pulse width modulation that is the special pulse width modulation control based on the discontinuous pulse width modulation control.

5. The rotary electric machine control apparatus according to claim 3, wherein
in the low speed region, at least one of the first inverter and the second inverter is controlled by the pulse width modulation control, and
in the high speed region, the special pulse width modulation control is performed using a modulation frequency higher than a modulation frequency used in the pulse width modulation control.

6. The rotary electric machine control apparatus according to claim 3, wherein
the control regions further include an ultrahigh speed region where the rotation speed of the rotary electric machine is higher than that in the high speed region at the equal torque, and
in the ultrahigh speed region, both of the inverters, which are the first inverter and the second inverter, are controlled by the rectangular wave control.

7. The rotary electric machine control apparatus according to claim 3, wherein
the first inverter and the second inverter each include arms each associated with one of alternating-current phases, and the arms each include a series circuit of an upper side switching element and a lower side switching element,
the control methods further include active short circuit control involving causing the upper side switching elements of all of the multiphase arms to enter an ON state or causing the lower side switching elements of all of the multiphase arms to enter an ON state, and
the rotary electric machine control apparatus performs target low speed region control in the low speed region, the target low speed region control involving
controlling the first one of the inverters, which is selected from the first inverter and the second inverter, by the active short circuit control, and
controlling the second one of the inverters by the pulse width modulation control.

8. The rotary electric machine control apparatus according to claim 7, wherein
the first inverter and the second inverter each include arms each associated with one of alternating-current phases, and the arms each include a series circuit of an upper side switching element and a lower side switching element,
the pulse width modulation control used as the control method includes
continuous pulse width modulation control to continuously perform pulse width modulation on all of the multiphase arms, and
discontinuous pulse width modulation control to perform pulse width modulation on at least one of the multiphase arms such that a period during which the switching elements are kept in an ON state or an OFF state is included,
a first low speed region and a second low speed region are set within the low speed region, the second low speed region being a region where the rotation speed of the rotary electric machine is higher than that in the first low speed region at the equal torque,
the target low speed region control to be performed in the first low speed region is first target low speed region control involving
controlling the first one of the inverters, which is selected from the first inverter and the second inverter, by the active short circuit control, and
controlling the second one of the inverters by the continuous pulse width modulation control, and
the target low speed region control to be performed in the second low speed region is second target low speed region control involving
controlling the first one of the inverters, which is selected from the first inverter and the second inverter, by the active short circuit control, and
controlling the second one of the inverters by the discontinuous pulse width modulation control.

9. The rotary electric machine control apparatus according to claim 7, wherein
in the low speed region, the control method for controlling the first inverter and the control method for controlling the second inverter are interchanged in accordance with a predetermined condition.

10. The rotary electric machine control apparatus according to claim 3, wherein
the first inverter and the second inverter each include arms each associated with one of alternating-current phases, and the arms each include a series circuit of an upper side switching element and a lower side switching element,
the pulse width modulation control used as the control method includes discontinuous pulse width modulation control to perform pulse width modulation on at least one of the multiphase arms such that a period during which the switching elements are kept in an ON state or an OFF state is included,
the control regions further include an intermediate speed region where the rotation speed of the rotary electric machine is higher than that in the low speed region and lower than that in the high speed region at the equal torque, and
in the intermediate speed region, both of the inverters, which are the first inverter and the second inverter, are controlled by the discontinuous pulse width modulation control.

11. The rotary electric machine control apparatus according to claim 10, wherein
the control methods include mixed pulse width modulation control to perform control involving outputting a plurality of pulses different in pattern during a first period corresponding to a ½ electrical angle cycle, and continuing an ineffective state during a second period corresponding to a remaining ½ cycle, and in the intermediate speed region, both of the first inverter and the second inverter are controlled by the mixed pulse width modulation control instead of the discontinuous pulse width modulation control.

12. The rotary electric machine control apparatus according to claim 3, wherein
a boundary or boundaries between the control regions is/are set in accordance with at least one of
a rotation speed of the rotary electric machine responsive to a torque of the rotary electric machine, and
a ratio of an effective value of a line voltage of a multiphase alternating-current voltage to a direct-current voltage.

13. The rotary electric machine control apparatus according to claim 1, wherein
the first one of the inverters, which is selected from the first inverter and the second inverter, includes a first switching element, and the second one of the inverters includes a second switching element smaller in switching loss than the first switching element during transition between an OFF state and an ON state, and
the inverter to be controlled by the special pulse width modulation control includes the second switching element.

14. The rotary electric machine control apparatus according to claim 7, wherein
the first one of the inverters, which is selected from the first inverter and the second inverter, includes a first switching element, and the second one of the inverters includes a second switching element smaller in switching loss than the first switching element during transition between an OFF state and an ON state, and
the inverter to be controlled by the pulse width modulation control includes the second switching element.

15. The rotary electric machine control apparatus according to claim 13, wherein,
the first switching element is a Si-IGBT or a Si-MOSFET, and the second switching element is a SiC-MOSFET or a GaN-MOSFET.

* * * * *